(12) United States Patent
Abileah

(10) Patent No.: US 6,359,671 B1
(45) Date of Patent: Mar. 19, 2002

(54) HIGH CONTRAST LIQUID CRYSTAL DEVICE

(75) Inventor: Adiel Abileah, Portland, OR (US)

(73) Assignee: Planar Systems, Inc., Beaverton, OR (US)

( * ) Notice: Subject to any disclaimer, the term of this patent is extended or adjusted under 35 U.S.C. 154(b) by 0 days.

(21) Appl. No.: 09/511,533

(22) Filed: Feb. 23, 2000

(51) Int. Cl.$^7$ .............................................. G02F 1/1335
(52) U.S. Cl. ........................ 349/119; 349/118; 349/121
(58) Field of Search ................................ 349/117, 118, 349/119, 121, 120

(56) References Cited

U.S. PATENT DOCUMENTS

| | | |
|---|---|---|
| 5,128,783 A | 7/1992 | Abileah et al. |
| 5,161,041 A | 11/1992 | Abileah et al. |
| 5,184,236 A | 2/1993 | Miyoshita et al. |
| 5,262,880 A | 11/1993 | Abileah et al. |
| 5,479,275 A | 12/1995 | Abileah |
| 5,499,126 A | 3/1996 | Abileah et al. |
| 5,570,214 A | 10/1996 | Abileah et al. |
| 5,576,861 A | 11/1996 | Abileah et al. |
| 5,579,139 A | 11/1996 | Abileah et al. |
| 5,583,679 A | * 12/1996 | Ito et al. ..................... 349/118 |
| 5,594,568 A | 1/1997 | Abileah et al. |
| 5,621,556 A | 4/1997 | Fulks et al. |
| 5,629,784 A | 5/1997 | Abileah et al. |
| 5,641,974 A | 6/1997 | DenBoer et al. |
| 5,694,187 A | 12/1997 | Abileah et al. |
| 5,706,068 A | 1/1998 | Abileah et al. |
| 5,715,028 A | 2/1998 | Abileah et al. |

(List continued on next page.)

OTHER PUBLICATIONS

Ohgawara, M. et al., "A Color STN Display with Two Retardation Compensating Films," SID 1989 Digest of Technical Papers XX, p. 390–393.

Ong, H.L., "P58: Negative–Birefringence Film–Compensated Multi–Domain TN–LCDs with Improved Symmetrical Optical Performance," SID 1993 Digest, p. 658–661.
New normally white negative birefringence film compensation twisted nematic LCDs with the largest viewing angle performance. H.L. Ong, Japan Display 1992, PP 247–310.
A single–cell high–quality black & white ST liquid crystal Display, Matsumoto et al. Proc. ID vol. 30 pp. 111–115 (1989).
5. Optical Properties of Retardation Films, Fujimura et al. SID Technical Digest paper 22.2, 1992, pp. 397–400.

*Primary Examiner*—Toan Ton
(74) *Attorney, Agent, or Firm*—Chernoff, Vilhauer, McClung and Stenze

(57) ABSTRACT

A normally white twisted nematic liquid crystal display (LCD) includes a liquid crystal layer for twisting at least one normally incident wavelength of visible light when in the off-state. Front and rear orientation layers sandwich the liquid crystal layer therebetween with the front orientation layer causing a front liquid crystal tilt sense direction $A_F$ and the rear orientation layer causing a rear liquid crystal tilt sense direction $A_R$ different than the direction $A_F$. Rear and front tilted retardation layers are located on opposite sides of said liquid crystal layer. Each of the rear and front tilted retardation layers has an optical axis defining an azimuthal angle $\phi$, and a tilt angle $\theta$, where at least the tilt angle $\theta$ varies through the thickness of the layer. The azimuthal angle aspect $\phi$ of an optical axis of the rear tilted retardation layer is oriented substantially anti-parallel relative to the rear tilt sense direction $A_R$ of liquid crystal molecules proximate the rear orientation layer, and the azimuthal angle aspect $\phi$ of an optical axis of the front tilted retardation layer is oriented substantially parallel relative to the front tilt sense direction $A_F$ of liquid crystal molecules proximate the front orientation layer. At least one of the rear and front tilted retardation layers includes a tilt angle $\theta$ which is substantially greater on the side of the tilted retardation layer closest to the liquid crystal layer than on the side furthest from the liquid crystal layer.

66 Claims, 44 Drawing Sheets

U.S. PATENT DOCUMENTS

| | | |
|---|---|---|
| 5,737,045 A | 4/1998 | Abileah |
| 5,737,048 A | 4/1998 | Abileah et al. |
| 5,780,871 A | 7/1998 | DenBoer et al. |
| 5,818,615 A | 10/1998 | Abileah et al. |
| 5,859,681 A | 1/1999 | VanderPloeg et al. |
| 5,895,106 A | 4/1999 | VanderPloeg et al. |
| 5,907,378 A | 5/1999 | Abileah et al. |
| 5,978,055 A * | 11/1999 | van de witte et al. ...... 349/119 |
| 5,990,997 A | 11/1999 | Jones et al. |
| 6,028,651 A | 2/2000 | Abileah et al. |
| 6,034,756 A * | 3/2000 | Yuan et al. .................. 349/119 |
| 6,111,622 A | 8/2000 | Abileah et al. |
| 6,169,590 B1 | 1/2001 | Abileah et al. |

\* cited by examiner

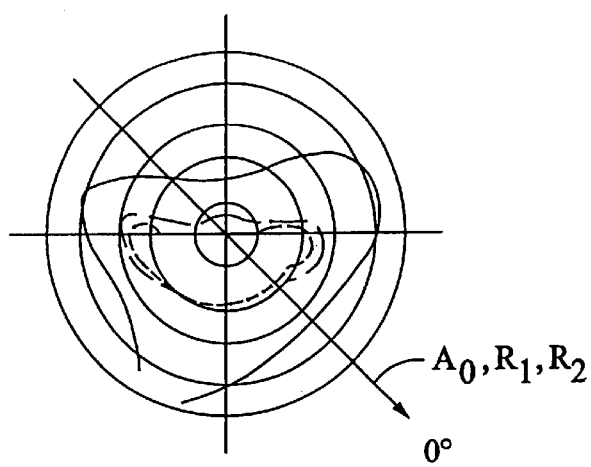
FIG. 5A
(PRIOR ART)
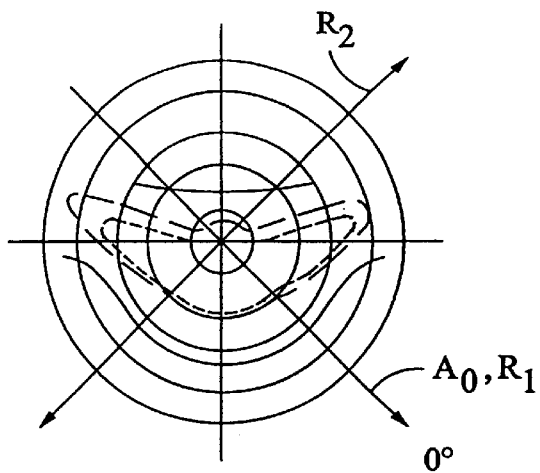
FIG. 5B
(PRIOR ART)
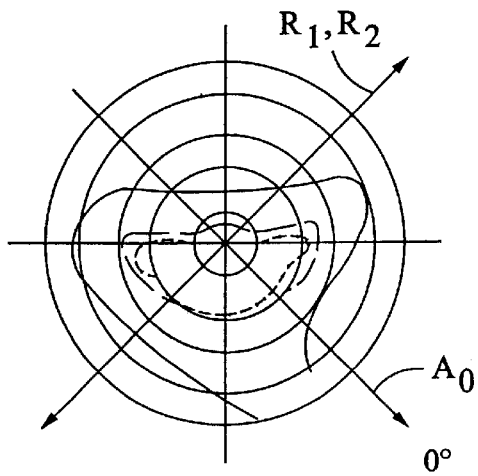
FIG. 5C
(PRIOR ART)
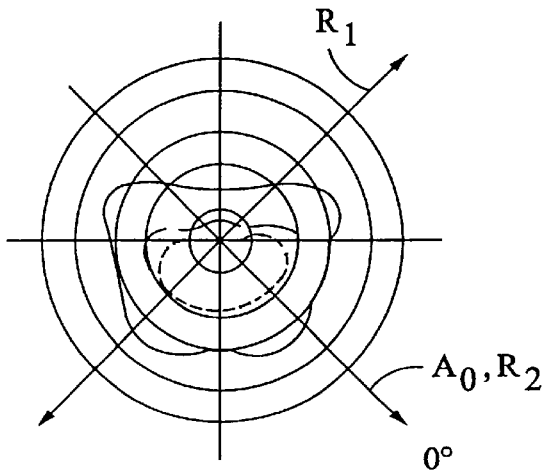
FIG. 5D
(PRIOR ART)
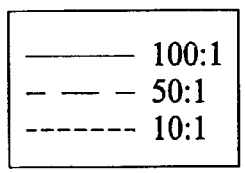

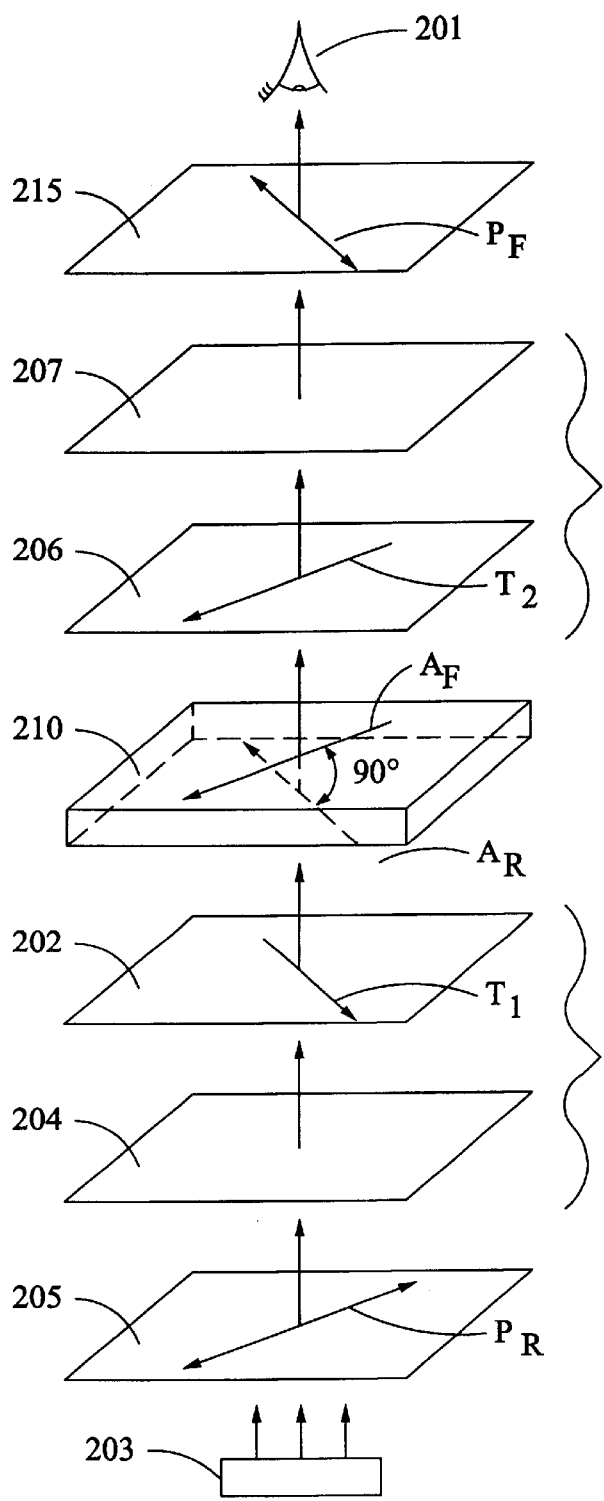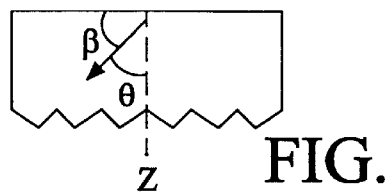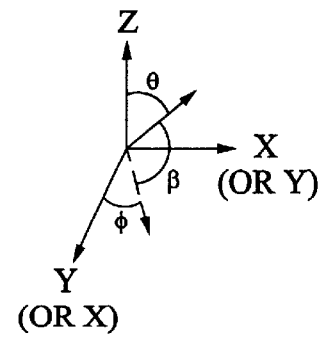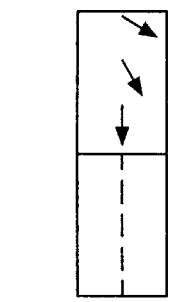
FIG. 12E
FIG. 12D
FIG. 12B
FIG. 12C
FIG. 12A

HIGH CONTRAST LIQUID CRYSTAL DEVICE

BACKGROUND OF THE INVENTION

The present invention relates to a liquid crystal display having at least two retardation film layers.

Liquid crystal materials are useful for electronic displays because the light traveling through a layer of liquid crystal (LC) material is affected by the anisotropic or birefringent value ($\Delta N$) of the material, which in turn can be controlled by the application of a voltage across the liquid crystal material. Liquid crystal displays are desirable because the transmission or reflection of light from an external source, including ambient light and backlighting schemes, can be controlled with much less power than is typically required for illuminating displays. Liquid crystal displays (LCDs) are now commonly used in such applications as digital watches, calculators, portable computers, desktop computers, avionic cockpit displays, car navigation systems, and many other types of electronic devices which utilize the liquid crystal display advantages of long-life and operation with low voltage/power consumption.

The information in many liquid crystal displays is presented in the form of a matrix array of rows and columns of numerals or characters which are generated by a number of segmented electrodes arranged in such a matrix pattern. The segments are connected by individual leads to driving electronics which apply a voltage to the appropriate combination of segments in order to display the desired data and information by controlling the light transmitted through the liquid crystal material.

Graphic information in, for example, avionic cockpit applications or television displays may be achieved by a matrix array of pixels which are connected by an X-Y sequential addressing scheme between two conventional sets of perpendicular conductor lines (i.e. row and column lines). More advanced addressing schemes typically use arrays of thin film transistors, diodes, MIMS, etc. which act as switches to control the drive voltage at the individual pixels.

Contrast ratio is one of the most important attributes determining the quality of both normally white (NW) and normally black (NB) liquid crystal displays. The contrast ratio in a NW display is determined in low ambient conditions by dividing the "off state" light transmission (high intensity white light) by the "on state" or darkened intensity. For example, if the "off state" transmission is 200 fL at a particular viewing angle and the "on state" transmission is 5 fL at the same viewing angle, then the display's contrast ratio at that particular viewing angle is 40 or 40:1 for the particular driving voltage utilized.

Accordingly, in normally white (NW) LCDs, the primary factor adversely limiting the contrast ratio is the amount of light which leaks through the display in the darkened or "on state". In normally black (NB) liquid displays, the primary factor limiting the contrast is the amount of light which leaks through the display in the darkened or "off state". The higher and more uniform the contrast ratio of a display over a wide range of viewing angles, the better the LCD.

The contrast ratio problems are compounded in bright environments such as sunlight and other high intensity ambient conditions where there is a considerable amount of reflected and scattered ambient light adjacent the display. The lesser the amount of ambient light reflected from the display panel, the better the viewing characteristics of the display. Therefore, it is desirable to have a LCD reflect as little ambient light as possible. The amount of ambient light reflected by a display panel is typically measured via conventional specular and diffused reflection tests. In color liquid crystal displays, light leakage causes severe color shifts for both saturated and gray scale colors. These limitations are particularly important for avionic applications, where the copilot's viewing of the pilot's displays is important.

The legibility of the image generated by both normally black (NB) and normally white (NW) liquid crystal display devices depends on viewing angle, especially in matrix addressed devices with a large number of scanning electrodes. Absent a retardation film, the contrast ratio of a typically NW (and sometimes NB) liquid crystal display is usually at a maximum only within a narrow viewing or observing envelope centered about normal (0 degrees horizontal viewing angle, 0 degrees vertical viewing angle) and drops off as the angle of view increases.

It would be a significant improvement to provide a liquid crystal display capable of presenting a uniform high quality, high contrast ratio image over a wide field of view with little or no ambient light reflection.

Normally black (NB) twisted nematic displays typically have better contrast ratio contour curves or characteristics than do their counterpart NW displays in that the NB displayed image can be better seen at larger viewing angles. However, NB displays are much harder to manufacture than NW displays due to their high dependence on the cell gap "d" of the liquid crystal material, as well as on the temperature of the liquid crystal material itself. Accordingly, a long felt need in the art has been the ability to construct a NW display with high contrast ratios over a large range of viewing angles, rather than having to resort to the more difficult to manufacture NB display to achieve these characteristics.

What is generally needed in normally white displays is an optical compensating or retarding element(s), i.e. retardation film, which introduces a phase delay that restores the original polarization state of the light, thus allowing the light to be blocked by the output polarizer in the on state. Optical compensating elements or retarders are known in the art. It is known that the polyimides and copolyimides can be used as negative birefringent retarding elements in normally white liquid crystal displays and are said to be custom tailorable to the desired negative birefringent values without the use of stretching. The polyimide retardation films may be uniaxial but with an optical axis oriented in the Z direction, i.e. perpendicular to the plane defined by the film.

The type and orientation of optical compensation or retardation normally used depends in part upon the type of display, normally black or normally white.

In a normally black (NB) twisted nematic display, the twisted nematic liquid crystal material is placed between polarizers whose transmission axes are parallel to one another. In the un-energized OFF state (no voltage above the threshold voltage Vth is applied across the liquid crystal material), normally incident light from the backlight is first polarized by the rear polarizer and in passing through the pixel or cell has its polarization direction rotated by the twist angle of the liquid crystal material dictated by the buffing zones. This effect is known as the twisting effect. The twist angle is set, for example, to be about 90 degrees so that the light is blocked or absorbed by the front or output polarizer when the pixel is in the OFF state. When a voltage is applied via electrodes across the normally black pixel, the liquid crystal molecules are forced to more nearly align with the electric field, eliminating the twisted nematic optical effect of the LC material. In this orientation, the optical molecular axes of the liquid crystal layer molecules are perpendicular to the cell walls. The liquid crystal layer then appears isotropic to normally incident light, eliminating the twist effect such that the light polarization state is unchanged by propagation through the liquid crystal layer so that light can pass through the output polarizer. Patterns can be written in a normally black display by selectively applying a variable voltage to the portions of the display which are to appear illuminated.

Turning again to normally white (NW) LCD cells, in a normally white liquid crystal display configuration, a twisted nematic cell preferably having a twist angle of about 80 degrees to 100 degrees (most preferably about 90 degrees), is placed between polarizers which have substantially crossed or perpendicular transmission axes, such that the transmission axis of each polarizer is either parallel (P-buffed) or perpendicular (X-buffed) to the buffing direction or orientation of the liquid crystal molecules in the interface region of the liquid crystal material adjacent each polarizer. In other words, normally white cells can be either P-buffed where both polarizer axes are substantially parallel to their respective adjacent buffing zones, or X-buffed where both polarizer axes are substantially perpendicular to their respective adjacent buffing zones.

This NW orientation of the polarizers reverses the sense of light and dark from that of the normally black displays previously discussed. The OFF or un-energized (no applied voltage above Vth across the liquid crystal material) areas appear light in a normally white display, while those which are energized appear dark.

The problem of ostensibly dark areas appearing light or colored when viewed at large angles still occurs, however, thereby creating the aforesaid lowered contrast ratios at reasonably large viewing angles. The reason for the reduced contrast ratios at large viewing angles in normally white displays is different than the reason for the problem in normally black displays. In the normally white energized darkened areas, the liquid crystal molecules tend to align with the applied electric field. If this alignment were perfect, all of the liquid crystal molecules in the cell would have their long axes normal to the glass substrate or cell wall. In the energized state, the normal white display appears isotropic to normally incident light, which is blocked by the crossed polarizers, thus, resulting in a darkened pixel or sub-pixel.

The loss of contrast with increased viewing angles in normally white pixels or displays occurs primarily because the homeotropic liquid crystal layer does not appear isotropic to OFF axis or OFF normal light. Light directed at OFF normal angles through the liquid crystal material propagates in two modes due to the anisotropy or birefringence ($\Delta N$) of the liquid crystal layer, with a phase delay between these modes which increases with the incident angle of light. This phase dependence on the incident angle introduces an ellipticity to the polarization state which is then incompletely extinguished by the front or exit polarizer in the normally white cell, giving rise to light leakage. Because of the normally white symmetry the birefringence has no significant azimuthal dependence.

FIG. 1 is a contrast ratio curve graph of a prior art normally white twisted nematic light valve. The light value for which the contrast ratio curves are illustrated in FIG. 1 included a rear linear polarizer having a transmission axis defining a first direction, a front or light-exit linear polarizer having a transmission axis defining a second direction wherein the first and second directions were substantially perpendicular to one another, a liquid crystal material having a call gap "d" of about 4.20 um, a rear buffing zone (i.e. orientation film) oriented in the second direction, and a front buffing zone oriented in the first direction. The LC material was Model No. MLC-6256 available from Merck. The temperature was about 25.0 degrees C for the graph illustrated in FIG. 1. The light valve did not include a retarder. The above lighted parameters with respect to FIG. 1 are also applicable to FIGS. 2 and 3.

The contrast ratio of FIG. 1 illustrates a driving voltage of 5.0 volts, i.e. Von, a 0.0 volt "OFF state" Voff voltage, and a backlighting with white light. As shown in FIG. 1, at least about 10:1 contrast ratios extend along the 0 degree vertical viewing axis only to angle of about −40 degrees horizontal and about +40 degrees horizontal. Likewise, at least about 30:1 contrast ratios extend along the 0 degree vertical viewing axis only to horizontal angles of about ±30 degrees. FIG. 1 illustrates the common problems associated with typical normally white liquid crystal displays in that their contrast ratios at large horizontal and vertical viewing angles are limited.

FIG. 2 is a contrast ratio curve plot of the same normally white light valve described above with respect to FIG. 1. However, the FIG. 2 plot was formulated utilizing a Von of about 4.5 volts and a Voff of about 0.0 volts. Again, the temperature was about 25.0 degrees C and white light was used. As can be observed by comparing the graphs of FIGS. 1 and 2, as the "on state" voltage applied to the liquid crystal material decreased, as in FIG. 2, the contrast ratio curves expanded horizontally and contracted vertically. If the voltage is decreased to about 4.0 volts or less both the horizontal and vertical contrast ratios contract.

The 10:1 contrast ratio area of FIG. 2 along the 0 degree vertical viewing axis extends a total of about 85 degrees (from about −45 degrees to +40 degrees horizontal) as opposed to only about 80 degrees in FIG. 1. Also, the 30:1 contrast ratio area of FIG. 2 along the 0 degree vertical viewing axis extended horizontally about 70 degrees as opposed to only about 60 degrees in FIG. 1, the 30:1 ratio being, of course, represented by the contour lines. With respect to vertical viewing angles, the contrast ratio areas of 10:1 and 30:1 in FIG. 2 did not extend along the 0 degree horizontal viewing axis to the negative vertical extent that they did in FIG. 1. In sum, the normally white light valve of FIGS. 1 and 2, with the parameters specified, had less than desirable contrast ratios at large viewing angles, these contrast ratios expanding horizontally and contracting vertically as the "ON state" or driving voltage across the liquid crystal material decreased.

FIG. 3A is a grey level intensity (fL) versus vertical viewing angle plot of the prior art light valve described above with respect to FIGS. 1–2, this plot illustrating the gray level behavior of the prior art light valve. The various curves represent horizontal viewing angles from about −60 degrees to +60 degrees along the 0 degree vertical viewing axis. FIG. 3B illustrates the same data as FIG. 3A for vertical viewing angles using a driving voltage versus intensity (fL) plot.

Gray level performance and the corresponding amount of inversion are important in determining the quality of a LCD. Conventional liquid crystal displays typically utilize anywhere from about eight to 256 different driving voltages. These different driving voltages are generally referred to as "gray level" voltages. The intensity of light transmitted through the pixel or display depends upon the driving voltage. Accordingly, gray level voltages are used to generate dissimilar shades of color so as to create different colors when, for example, these shades are mixed with one another.

Preferably, the higher the driving voltage in a NW display, the lower the intensity (fL) of light transmitted therethrough. Likewise then, the lower the driving voltage, the higher the intensity of light reaching the viewer. The opposite is true in normally black displays. Thus, by utilizing multiple gray level driving voltages, one can manipulate either a NW or NB liquid crystal display to emit desired intensities and shades of light. A gray level Von is generally known as any driving voltage greater than Vth (threshold voltage) up to about 4.0–6.5 volts.

Gray level intensity in LCDs is dependent upon the displays' driving voltage. It is desirable in NW displays to have an intensity versus driving voltage curve wherein the intensity of light emitted from the display or pixel continually and monotomically decreases as the driving voltage increases. In other words, it is desirable to have gray level performance in a NW pixel such that the intensity (fL) at 6.0 volts is less than that at 3.0 volts, which is in turn less than that at 2.0 volts, etc. Such good gray level curves across wide ranges of viewing angles allow the intensity of light reaching the viewer via the pixel or display to be easily and consistently controlled.

Referring again to FIG. 3A, the grey level intensity versus viewing angle plot illustrated therein of the prior art light valve of FIGS. 1–2 having no retardation film(s) are undesirable because of the curves cross each other. At the same viewing angles, the crossing results in increases in the intensity as the voltage increases within particular voltage ranges, which are known as inversions.

A theoretically perfect driving voltage versus intensity curve with respect to a NW display would have decreased intensity (fL) for each increase in gray level driving voltage at all viewing angles. In contrast, FIG. 3 illustrates the inversion in intensity of radiation emitted from the light valve for each corresponding increase in gray level driving voltage in a range of voltages dependent upon viewing angle. Accordingly, it would satisfy a long felt need in the art, if such a liquid crystal display could be provided with little or no inversion.

FIG. 4 is a schematic illustration showing an optic arrangement of a normally white liquid crystal display device disclosed in U.S. Pat. No. 5,570,214. As illustrated, the LCD includes a rear polarizer 111, a rear retardation plate or film 113, a liquid crystal cell 119 including a liquid crystal material sandwiched between a rear orientation or buffing zone oriented in direction $A_0$ and a front orientation or buffing zone oriented in direction $A_1$, a front retardation film 114, and a front polarizer 112.

The rear polarizer 111 is provided at the light incident side of the liquid crystal layer 119, a front or exit polarizer 112 is provided at the light exit side of the liquid crystal layer 119, a rear retardation film 113 is provided between the liquid crystal layer and the polarizer 111, and a front retardation film 114 is provided between the liquid crystal layer and the front polarizer 112. This prior art NW display may be referred to as "P-buffed" or parallel buffed because the rear polarizer transmission axis $P_1$ is parallel to the rear orientation direction $A_0$, and the front polarizer transmission axis $P_2$ is parallel to the front orientation direction $A_1$.

The product of parameters "$\Delta N$–d" of the liquid crystal layer 119 is set in the range of 450–550 nm. The liquid crystal material of U.S. Pat. No. 5,570,214 is left handed as defined in the art. The aligning direction of the rear orientation film on the light incident side of the liquid crystal layer 119 is a rubbing direction Ao inclined at approximately 45° with respect to the horizontal x-direction of the liquid crystal cell. The aligning direction of the orientation or buffing film on the front side of the liquid crystal layer is oriented in direction $A_1$ which is rotated about 90° in a counterclockwise direction from the orientation direction $A_0$ of the orientation film on the rear side of the liquid crystal material. Therefore, the liquid crystal layer 119 sandwiched between the opposing orientation films is twisted substantially 90°. The pretilting angle of the liquid crystal molecules is approximately 1°.

The rear linear polarizer 111 has a transmission axis $P_1$ which is parallel to the orientation direction $A_0$, while the front polarizer 112 has a transmission axis direction $P_2$ which is parallel to the front orientation direction $A_1$. The transmission axes of the front and rear polarizers 112 and 111 are perpendicular to one another thereby defining a normally white liquid crystal display. The rear retardation plate or film 113 is so arranged that its optical axis $R_1$ is either parallel to or crosses at 90° to the rear rubbing direction $A_0$. The front retardation film 114 is so arranged that its optical axis $R_2$ is either parallel to or crosses at 90° to the rubbing direction $A_1$. These retardation films 113 and 114 are formed to have equal retardation values (d–$\Delta N$) where "d" is the thickness of the retardation film and "$\Delta N$" is the anisotropic or birefringent value of the retardation film. The retardation values of the retardation films 113 and 114 are set in the range of 300–400 nm. The front and rear retardation films are formed of the same material such as, for example, a polycarbonate or polyvinyl alcohol, and the outer surfaces thereof are preferably covered with a protective film made of triacetyl cellulose or the like.

The orientation or buffing directions of prior art FIG. 4 are "six o'clock buffed." The term "six o'clock buffed" means that the rear and front orientation directions $A_0$ and $A_1$ are oriented in directions so as to provide a viewing zone having an extended region in the six o'clock area of the graphs shown in FIGS. 5A–5D. In other words, because the orientation direction $A_0$ goes from the upper left to the lower right as shown in FIG. 4, and orientation direction $A_1$ goes from lower left to upper right, the resulting viewing zone has better contrast as shown in FIGS. 5A–5D in the negative vertical region below the 0° vertical viewing axis. This is what is meant by the phrase "six o'clock buffed."

Alternatively, if the orientation direction $A_0$ went from the lower right to the upper left, and the orientation direction $A_1$ was directed from the upper right to the lower left, then the display of FIG. 4 would have been "twelve o'clock buffed" and would have provided a viewing zone having better contrast ratios in the positive vertical viewing angles instead of the negative vertical viewing angles. The six o'clock buffed LCDs of FIGS. 4 and 5A–5D illustrate viewing zones with better contrast ratios in the negative vertical area below the 0° vertical viewing axis as opposed to the positive vertical viewing area above the 0° vertical viewing axis.

In the prior art liquid crystal display of FIG. 4, the contrast ratios are measured in FIGS. 5A–5D for the four possible cases of retardation film orientation, when the value of d–$\Delta N$ of a liquid crystal layer 119 is set to 510 nm and the retardation value of both retardation films 113 and 114 is set to 350 nm (the value measured by the light having a wavelength of 589 nm). The four cases are as follows.

FIG. 5A shows contrast ratio curves for the case where the optical axes of the rear and front retardation films 113 and 114 are disposed together in parallel to the rear rubbing direction $A_0$. The solid or outer contrast ratio curve in FIGS. 5A–5D represents a contrast ratio of 10:1. The inner or equally broken contrast curve in FIGS. 5A–5D represents a contrast ratio of 100:1. The intermediate contrast ratio in FIGS. 5A–5D represents a contrast ratio of 50:1. Furthermore, in the graphs of FIGS. 5A–5D, each circle represents a 10° shift in viewing angle. In other words, the center of the graph represents a 0° vertical and 0° horizontal viewing angle, the first circle represents 10°, the second circle 20°, etc. As can be seen in FIG. 5A, the 10:1 contrast ratio curve extends horizontally along the vertical 0° viewing axis to about −37° and +40°, and extends upwardly along the 0° horizontal viewing axis to about 15° vertical.

FIG. 5B shows contrast ratio curves for the case where the optical axis $R_1$ of the rear retardation film 113 is disposed in parallel to the orientation direction $A_0$, and the optical axis $R_2$ of the front retardation film 114 is disposed perpendicular to the rubbing direction $A_0$. The direction $R_1$ is parallel to the rear polarizer axis $P_1$, and $R_2$ is parallel to the front polarizer axis $P_2$. As can be seen in FIG. 5B, the 10:1 contrast ratio curve extends along the 0° horizontal viewing axis only to about 15° vertical. Also, the 50:1 contrast ratio curve extends along the 0° horizontal viewing axis only to about 5° vertical.

FIG. 5C shows contrast ratio curves for the case where the optical axes of the rear and front retardation films 113 and 114 are arranged in parallel with one another and cross at 90° to the rear buffing direction $A_0$. In FIG. 5C, the 10:1 contrast ratio curve extends upward along the 0° horizontal viewing axis only to about 15° vertical. Also, the 10:1 contrast ratio curve extends along the 0° vertical viewing axis a total of about 75°–80°.

FIG. 5D shows contrast ratio curves for the case where the optical axis $R_1$ of the rear retardation film 113 is arranged to cross at 90° to the rubbing direction $A_0$, and the optical axis $R_2$ of the front retardation film 114 is arranged in parallel to rear orientation direction $A_0$. In FIG. 5D, the 10:1 contrast ratio curve extends horizontally along the 0° vertical viewing axis a total of about 60°–65°. Also, the 10:1 contrast ratio curve in FIG. 5D extends upward along the 0° horizontal viewing axis only to about +15° vertical.

It is important to note that FIGS. 4 and 5 only teach techniques suitable for retardation films that are uniaxial, and do not suggest any applicability to non-uniform films, as discussed below. Uniaxial films have 180 degree symmetry in the plane and therefore are illustrated by a double arrow in the figures. However, non-uniform films are not suitable to be reversed by 180 degrees while necessarily providing the same optical properties. Moreover, the direction of a non-uniform film in relation to the respective buffing direction is not necessarily simply reversible, as in uniaxial films. Non-uniform films have significantly different optical properties than uniaxial films.

The rotation of uniaxial retardation films adjusts the viewing zones of LCDs. For example, U.S. Pat. No. 5,184,236 teaches rotating the optical axes of retardation films ±15° or less when two such films are disposed on a single side of the liquid crystal material. The axes of the uniaxial retardation films are rotated either in the clockwise or counterclockwise direction for the purpose of adjusting the viewing zone. However, when the uniaxial retardation films of the '236 patent are rotated, the symmetry of the viewing zone is substantially distorted thereby creating viewing zones which are not substantially symmetrical about the 0° horizontal viewing axis.

FIG. 6 illustrates the angular relationship between the horizontal and vertical viewing axes and angles described herein relative to a liquid crystal display and conventional LCD angles $\phi$ and $\theta$. The +X, +Y, and +Z axes shown in FIG. 6 are also defined in other figures herein. Furthermore, the "horizontal viewing angles" (or $X_{ANG}$) and "vertical viewing angles" (or $Y_{ANG}$) illustrated and described herein may be transformed to conventional LCD angles: azimuthal angle $\phi$, and polar tilt angle $\theta$, by the following equations:

$$TAN(X_{ANG})=COS(\phi)*TAN(\theta)$$

$$SIN(Y_{ANG})=SIN(\theta)*SIN(\phi)$$

or $$COS(\theta)=COS(Y_{ANG})*COS(X_{ANG})$$

$$TAN(\phi)=TAN(Y_{ANG})/SIN(X_{ANG})$$

It is noted that $X_{ANG}$ and $Y_{ANG}$ may be referred to as horizontal (H) and vertical (V) angles in the east pole coordinates.

Referring to FIG. 7, Sharp Corporation has developed a liquid crystal configuration, generally referred to as the O-mode, using wide view retardation films (described in detail later) made by Fuji-Film, Japan. The wide view retardation films from Fuji-Film, Japan include discotic layers with variable orientation of tilt angle of the uni-axial optical vector. The optical axis $R_1$ of the rear retardation film 150 is disposed in a parallel orientation to the orientation direction $A_0$, and the optical axis $R_2$ of the front retardation film 152 is disposed in an opposite direction to the rubbing direction $A_1$. The direction of $R_1$ is perpendicular to the rear polarizer axis $P_1$, and $R_2$ is perpendicular to the front polarizer axis $P_2$. It is noted that $P_1$ and $P_2$ are the transmission axis the O-mode liquid crystal display was primarily developed for laptop display panels and has reasonably good vertical and horizontal contrast ratios, operating in a binary operation, for its intended market. For example, a typical display includes a horizontally ±45 degrees and vertically (+30 degrees, −40 degrees) having a contrast ratio of about 30:1. One example of an O-mode performance is shown in FIGS. 8–10. In particular, FIG. 8 illustrates the display angular intensity distribution when driven in the black mode, FIG. 9 illustrates the display angular intensity distribution when driven in the white mode, while FIG. 10 illustrates the resulting contrast ratio as a function of viewing angles.

While such a contrast ratio range is acceptable for laptop displays, the avionic industry generally regards such liquid crystal devices as non-acceptable. The grey level separation near black for O-mode liquid crystal displays at above normal viewing angles is poor. This is undesirable for applications where accurate grey levels are important for the full range of operation, such as avionics where the pilot observes the display from a raised position, such as the second seat. The reason for the poor grey level performance, at least in part, is that the compensation provided by the retardation films for the molecule alignments of the liquid crystal material is designed for one particular driving voltage. When driving at different voltage levels the particular retardation films do not compensate adequately for the changed characteristics of the liquid crystal material. In addition when viewing at angles below normal, the contrast ratio of the O-mode display decreases significantly. Moreover, when viewing the display at extreme angles below normal there is a tendency for inversion, namely, the white becomes black, and black becomes white. Significant inversion characteristics are simply unacceptable for mission critical application, such as avionics. Also, the O-mode display has a tendency to change "whites" to "yellow" because the cell gap is normally optimized for the green wavelength to provide approximately 90 degrees of polarization rotation, with the cell gap normally providing less than 90 degrees of rotation for red wavelengths and providing greater than 90 degrees of rotation for the blue wavelengths. Accordingly, the polarizer and retardation films do not adequately compensate for the different wavelengths, especially when the colors include grey-levels mainly at wide horizontal angles.

FIG. 11 is an exploded schematic view of the optical components, and their respective azimuthal φ orientations of an existing twisted nematic (TN) NW LCD, this LCD being either a light valve (LV) or an active matrix liquid crystal display (AMLCD) having a matrix array of pixels and colored (e.g. RGB, RGBG, RGGB, or RGBW) sub-pixels therein. As shown, this display includes from the rear forward toward viewer 180, conventional backlight 181 rear or light-entrance linear polarizer 182, rear tilted negative retarder 183, rear negative retarder 184 (which may be either uniaxial or biaxial, including indices of refraction $n_x$, $n_y$, and $n_z$), rear tilt sense or direction $A_R$ which shows the tilt sense of the liquid crystal molecules adjacent the rear LC orientation layer, twisted nematic (TN) liquid crystal (LC) layer 185, front tilt sense or direction $A_F$ which shows the tilt sense of the LC molecules of layer 185 adjacent the front LC orientation film, front negative retarder 186 which may be uniaxial or biaxial, front tilted negative retarder 187, and a front or light-exit linear polarizer (analyzer) 188. The LCD or LV of FIG. 11 is viewed by viewer 180. Such a device is disclosed in U.S. Pat. No. 5,990,997, incorporated by reference herein. However, the size and shape of the contrast region disclosed by U.S. Pat. No. 5,990,997 is not ideal for many applications. Accordingly, a desire still exists for devices with different configurations that provide optimized viewing angles and grey level separation for particular applications.

What is desired, therefore, is a liquid crystal device having wider horizontal viewing angles with increased vertical viewing angles. In addition, the device should provide better gray level separation with no inversion in the upper hemisphere. Also, the device should have significantly reduced yellow effect at wide horizontal viewing angles. Further, the device should have increased left to right symmetry of the contrast ratio contours with little yellow effect at wide viewing angles, such as ±60 degrees.

SUMMARY OF THE INVENTION

The present invention overcomes, at least in part, the aforementioned drawbacks of the prior art by providing, in one embodiment, normally white twisted nematic liquid crystal display (LCD) that includes front and rear orientation layers sandwiching the liquid crystal layer therebetween. The front orientation layer causing a front liquid crystal tilt sense direction $A_F$ and the rear orientation layer causing a rear liquid crystal tilt sense direction $A_R$ different than the direction $A_F$. The rear and front tilted retardation layers are located on opposite sides of the liquid crystal layer. Each of the rear and front tilted retardation layers has an optical axis defining an azimuthal angle φ, and a tilt angle θ, where at least said tilt angle θ varies through the thickness of the layer. The azimuthal angle aspect φ of an optical axis of the rear tilted retardation layer is oriented substantially anti-parallel relative to the rear tilt sense direction $A_R$ of liquid crystal molecules proximate said rear orientation layer, and the azimuthal angle aspect φ of an optical axis of the front tilted retardation layer is oriented substantially parallel relative to the front tilt sense direction $A_F$ of liquid crystal molecules proximate the front orientation layer. Each of the rear and front tilted retardation layers includes a tilt angle θ which is substantially greater on the side of the tilted retardation layer closest to the liquid crystal layer than on the side furthest from the liquid crystal layer. The rear and front polarizing elements, each of which has an optical axis, located on opposite sides of the liquid crystal layer, and the optical axes of the rear and front polarizing elements being substantially perpendicular to one another.

The present invention overcomes the aforementioned drawbacks of the prior by providing, in one embodiment of the present invention, a normally white twisted nematic liquid crystal display (LCD) that includes a liquid crystal layer for twisting at least one normally incident wavelength of visible light when in the off-state. Front and rear orientation layers sandwich the liquid crystal layer therebetween with the front orientation layer causing a front liquid crystal tilt sense direction $A_F$ and the rear orientation layer causing a rear liquid crystal tilt sense direction $A_R$ different than the direction $A_F$. Rear and front tilted retardation layers are located on opposite sides of said liquid crystal layer. Each of the rear and front tilted retardation layers has an optical axis defining an azimuthal angle φ, and a tilt angle θ, where at least the tilt angle θ varies through the thickness of the layer. The azimuthal angle aspect φ of an optical axis of the rear tilted retardation layer is oriented substantially anti-parallel relative to the rear tilt sense direction $A_R$ of liquid crystal molecules proximate the rear orientation layer, and the azimuthal angle aspect φ of an optical axis of the front tilted retardation layer is oriented substantially parallel relative to the front tilt sense direction $A_F$ of liquid crystal molecules proximate the front orientation layer. At least one of the rear and front tilted retardation layers includes a tilt angle θ which is substantially greater on the side of the tilted retardation layer closest to the liquid crystal layer than on the side farthest from the liquid crystal layer.

In another embodiment of the present invention, at least one of the azimuthal angle aspect φ of an optical axis of the rear tilted retardation layer is oriented substantially perpendicular relative to the rear tilt sense direction $A_R$ of liquid crystal molecules proximate the rear orientation layer, and at least one of the azimuthal angle aspect φ of an optical axis of the front tilted retardation layer is oriented substantially perpendicular relative to the front tilt sense direction $A_F$ of liquid crystal molecules proximate the front orientation layer.

In another aspect of the present invention, the front and rear orientation layers sandwich the liquid crystal layer therebetween, with the front orientation layer causing a front liquid crystal tilt sense direction $A_F$ and the rear orientation layer causing a rear liquid crystal tilt sense direction $A_R$ different than the direction $A_F$. The first and second tilted retardation layers are located on the same side of the liquid crystal layer. Each of said first and second tilted retardation layers has an optical axis defining an azimuthal angle φ and a tilt angle θ, where at least the tilt angle θ varies through the thickness of the layer. The azimuthal angle aspect φ of an optical axis of the first tilted retardation layer is oriented substantially anti-parallel relative to the rear tilt sense direction $A_R$ of liquid crystal molecules proximate the rear orientation layer.

BRIEF DESCRIPTION OF THE DRAWINGS

FIGS. 5a–5d illustrate the contrast ratios of different retardation film orientations of FIG. 4.

FIG. 12(a) is an exploded schematic view of an exemplary embodiment of the optical components and their respective azimuthal orientation of a liquid crystal display device having non-uniform films.

FIGS. 12(b)–12(e) illustrate the directional orientation of the films of FIG. 12(a).

DETAILED DESCRIPTION OF THE PREFERRED EMBODIMENT

Figure 1:
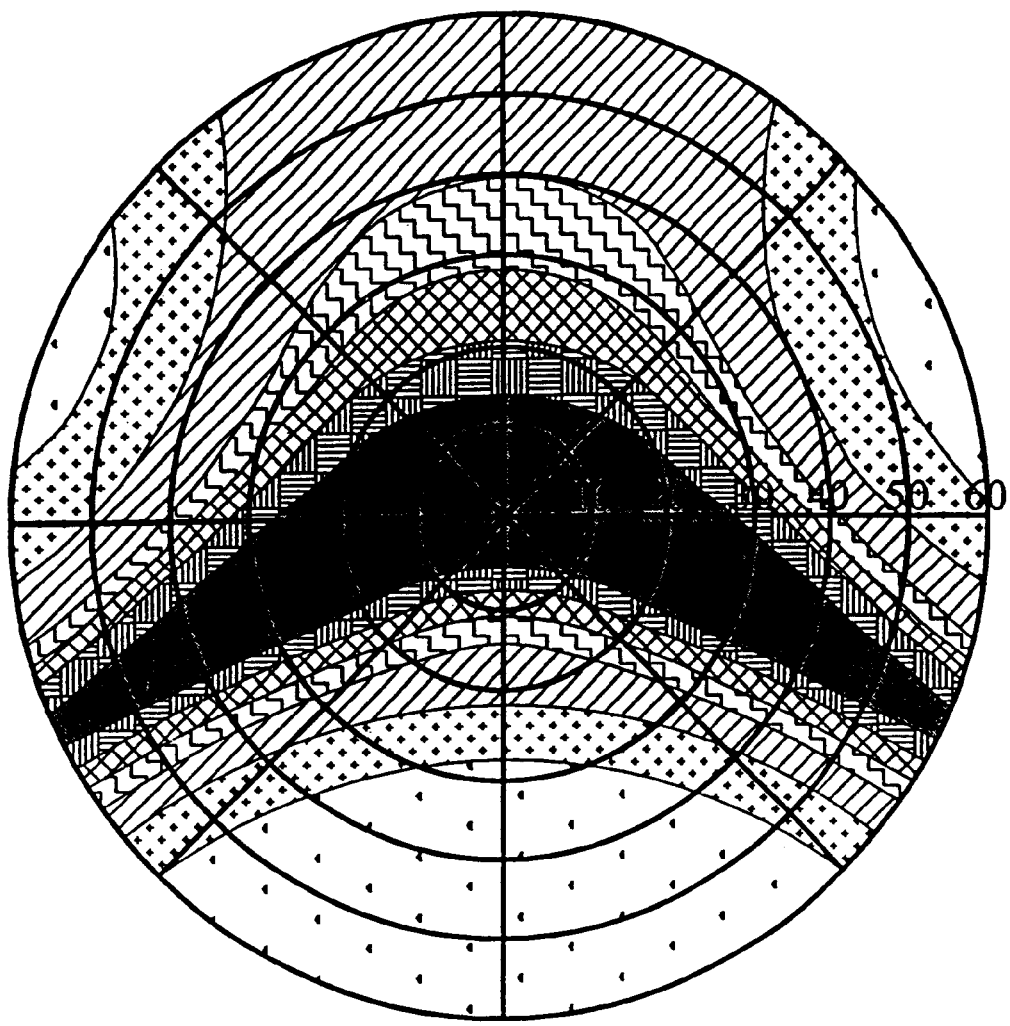
FIG. 1 is a contrast ratio curve graph of a normally white twisted nematic light valve with an operating voltage of 5.0 volts.
Figure 2:
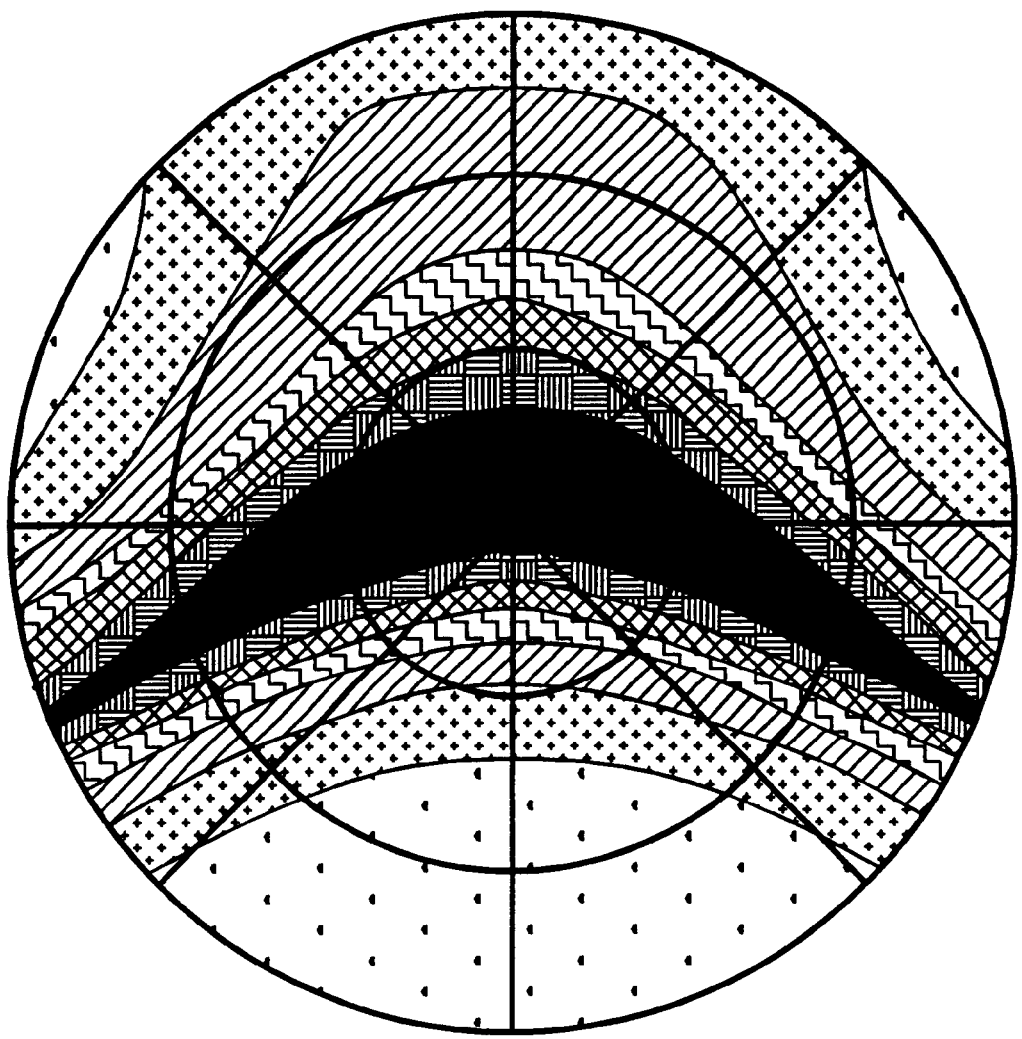
FIG. 2 is a contrast ratio curve graph of a normally white twisted nematic light valve of FIG. 1 with a lower operating voltage (4.5 volts).
Figure 3A:
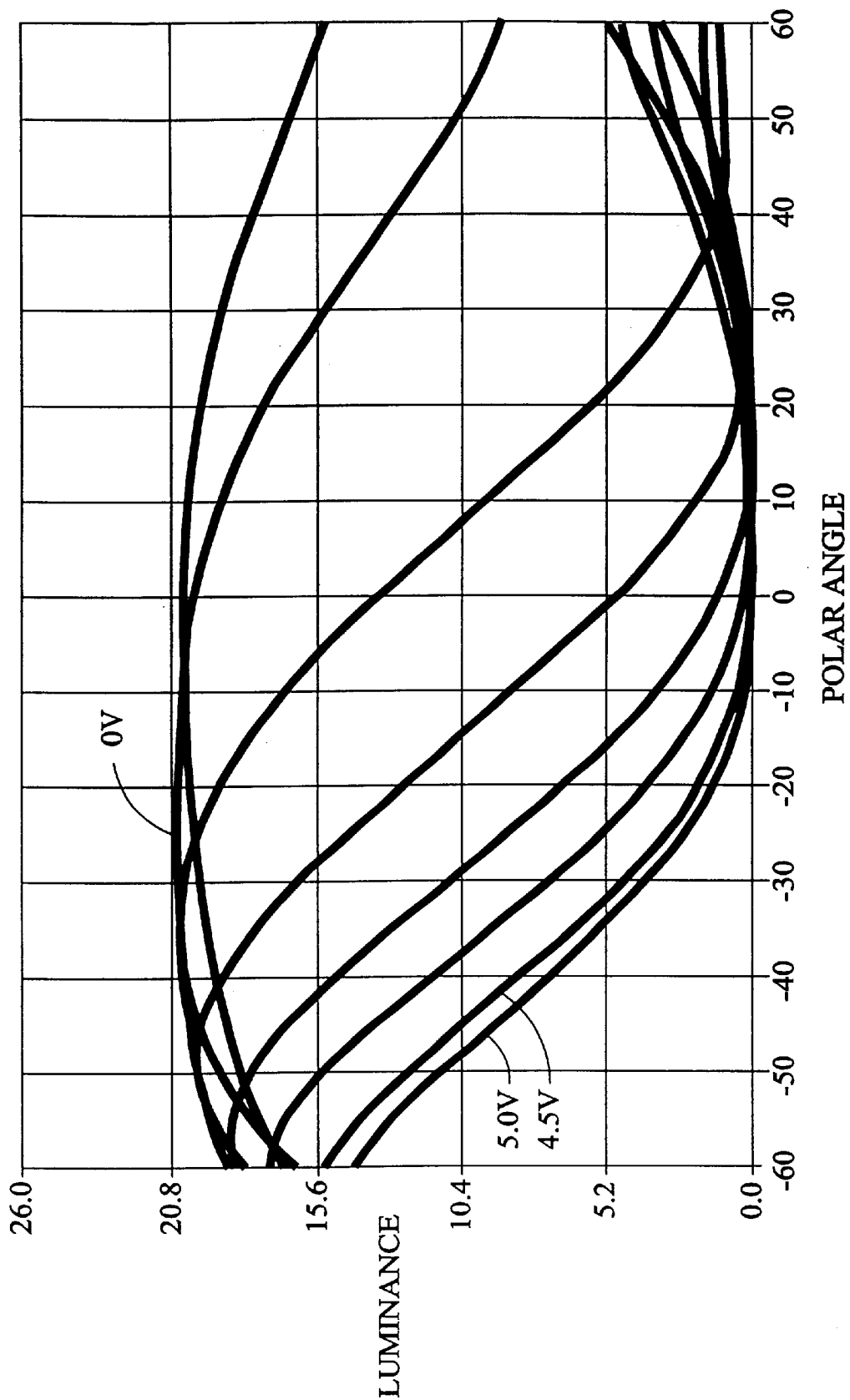
FIG. 3a is a grey level intensity versus vertical viewing angle plot of the light valve of FIG. 1 along the horizontal zero degree axis.
Figure 3B:
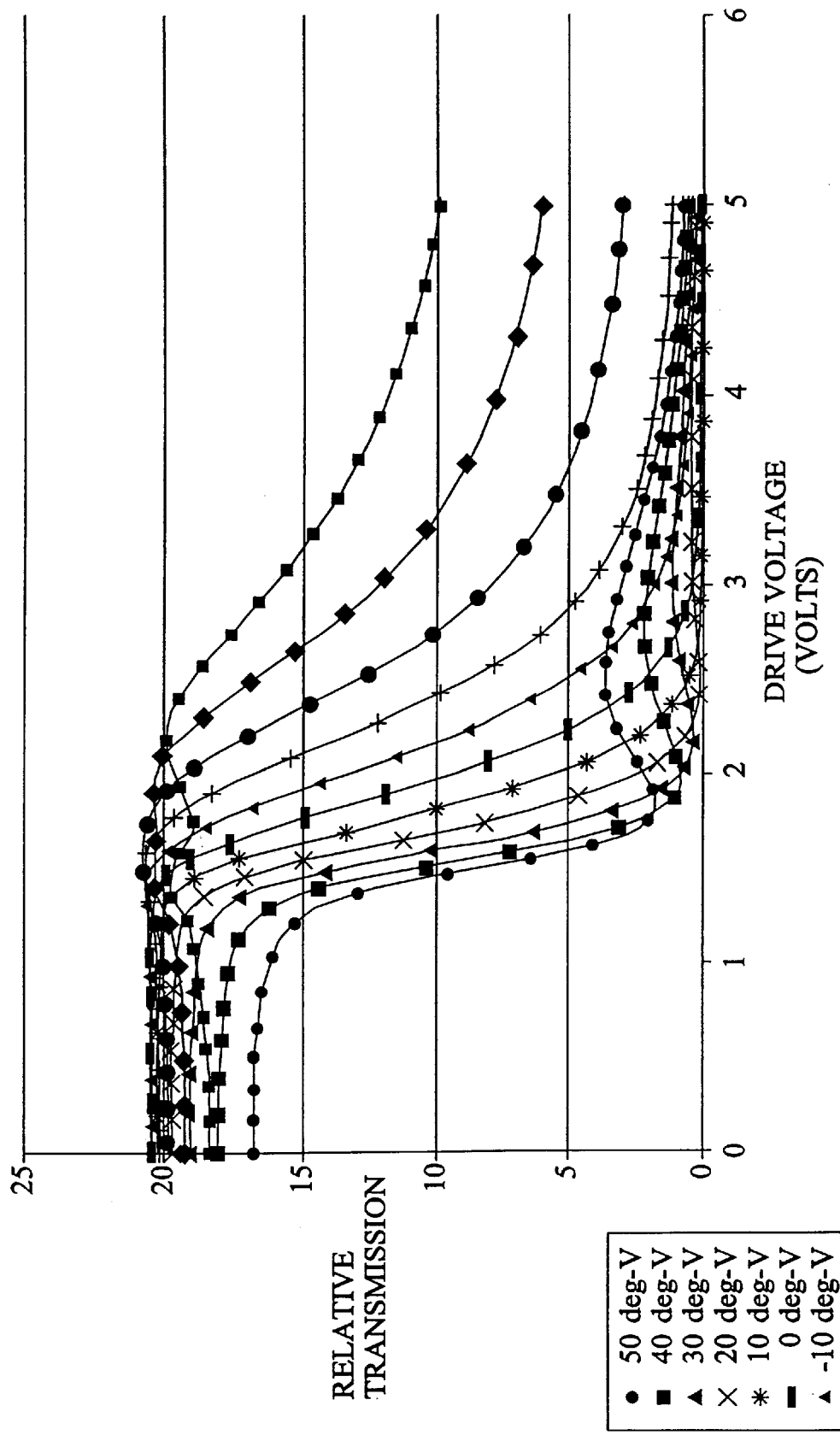
FIG. 3b is a transmission versus driving voltage plot of the light valve of FIG. 1, at vertical angles +50 degrees (up) to −50 degrees (down) along the horizontal zero degree.
Figure 4:
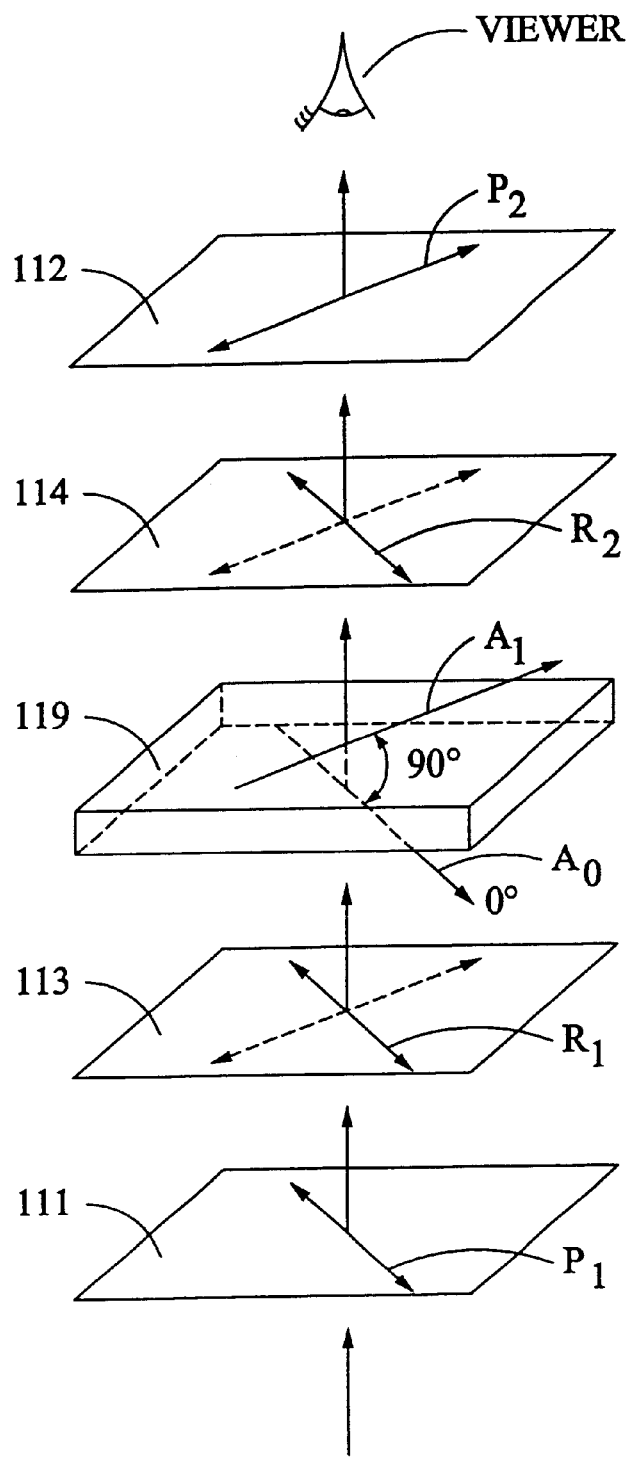
FIG. 4 is a schematic illustration of a normally white liquid crystal display device including uniaxial films.
Figure 6:
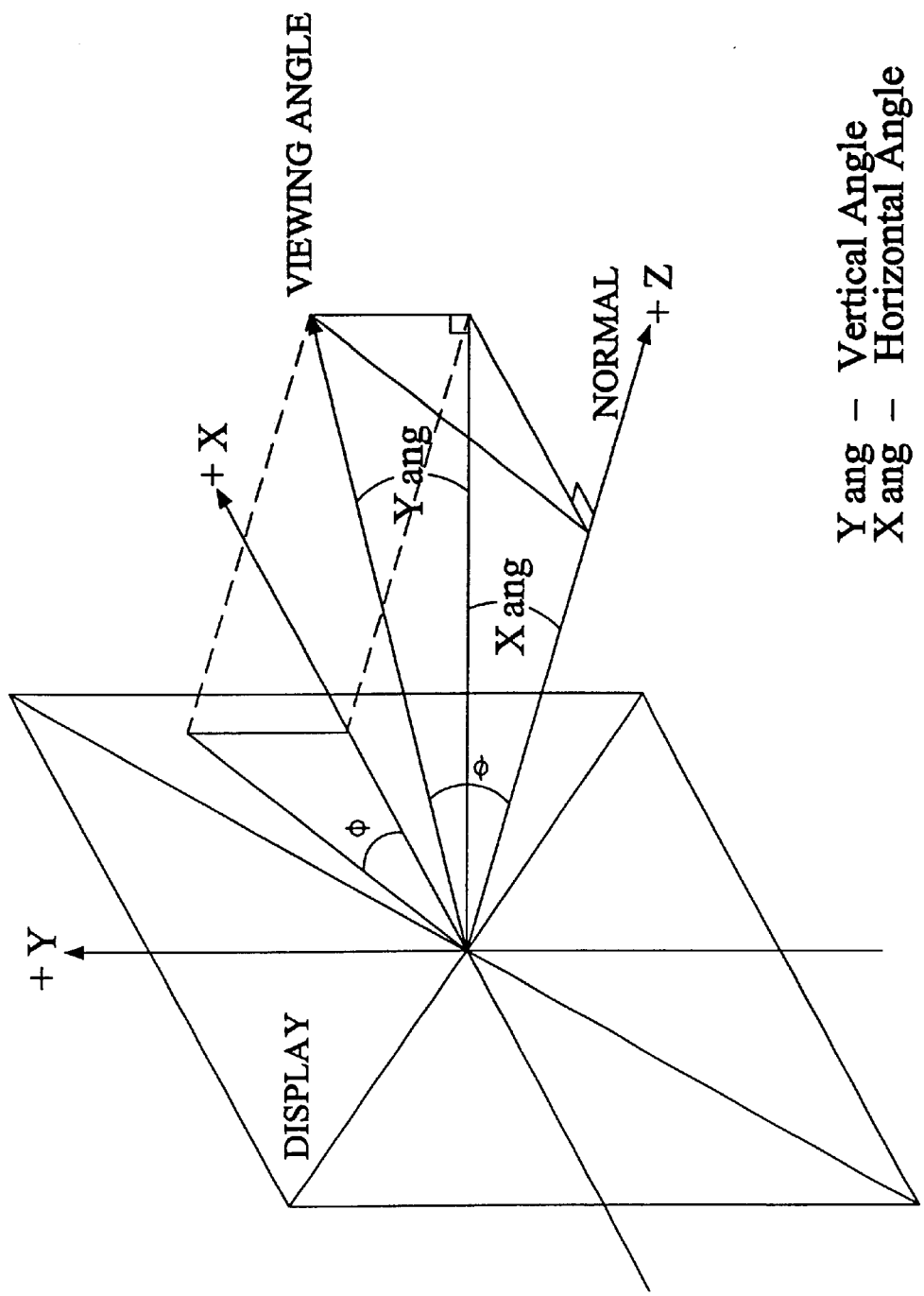
FIG. 6 illustrates the angular relationship between the horizontal ($X_{ang}$) and vertical ($Y_{ang}$) and vertical viewing axes and polar angles ($\theta,\phi$).
Figure 7:
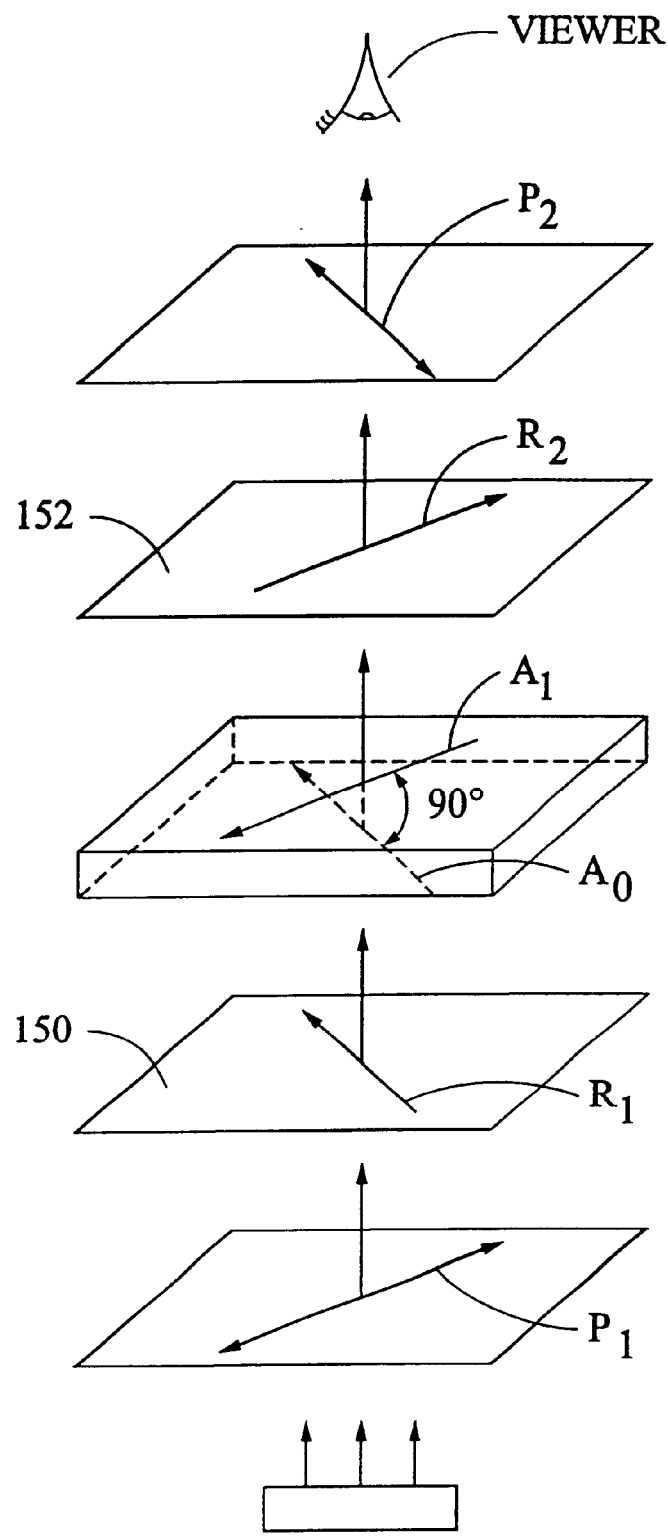
FIG. 7 is a schematic illustration of a normally white liquid crystal display device including non-uniform films.
Figure 8:
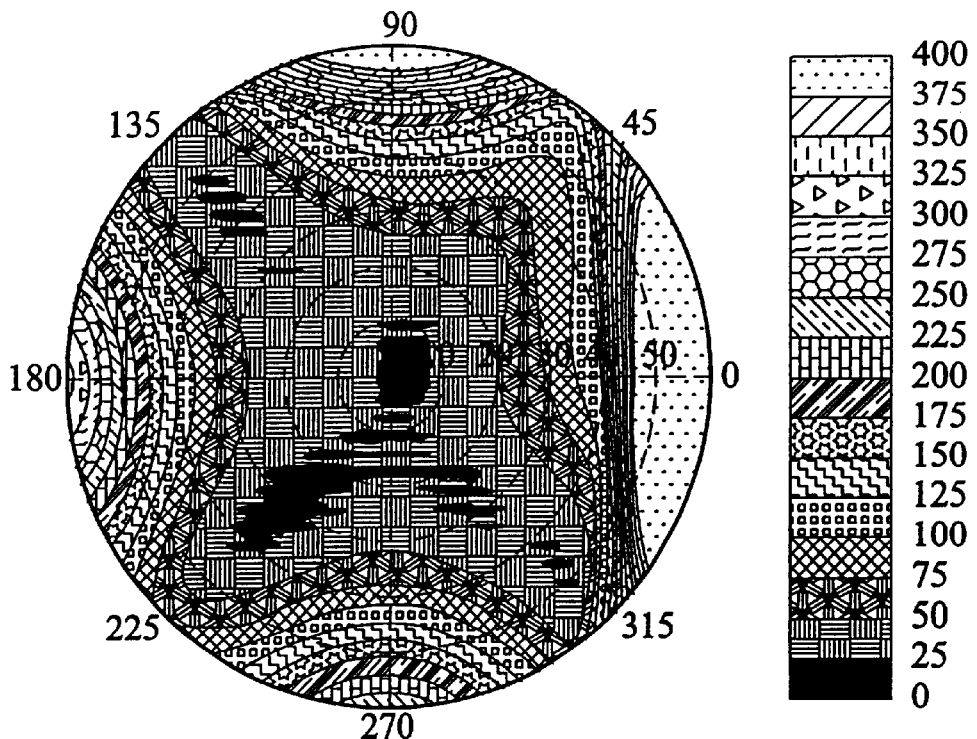
FIG. 8 illustrates the black mode of FIG. 7.
Figure 9:
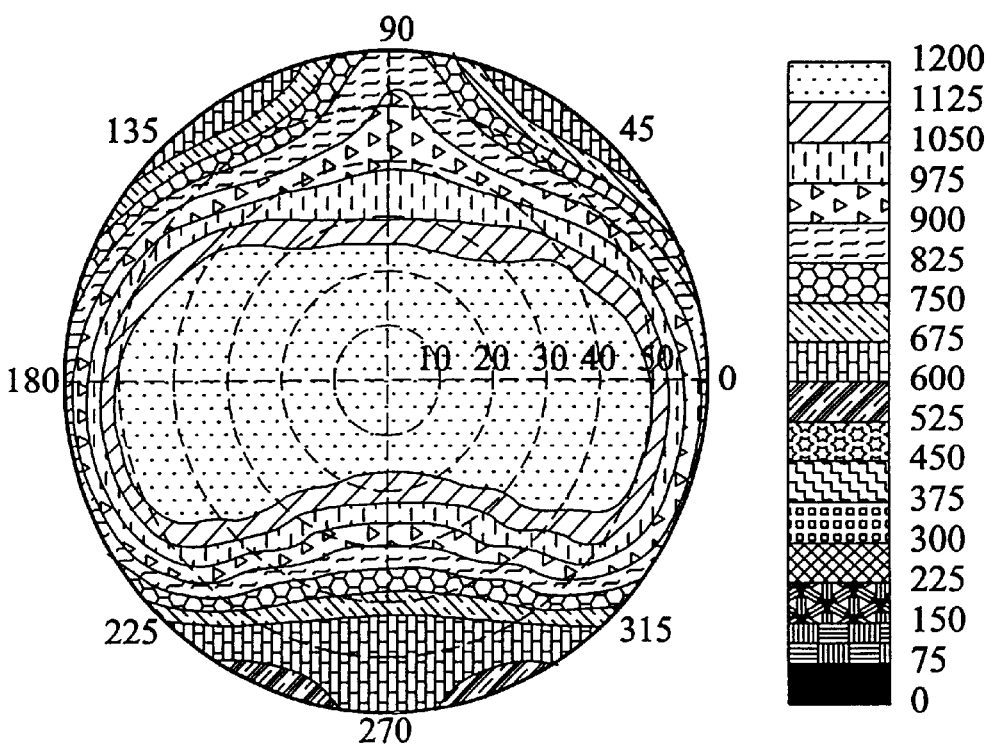
FIG. 9 illustrates the white mode of FIG. 7.
Figure 10:
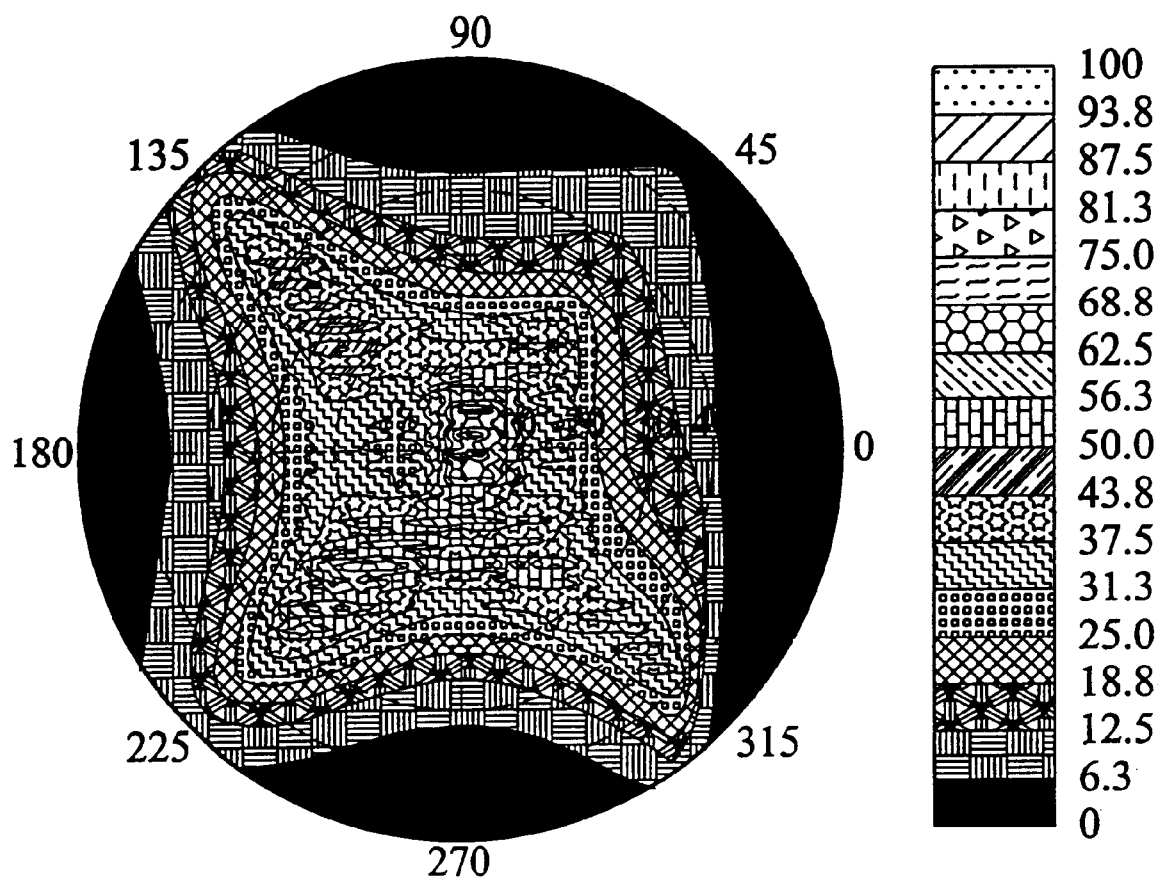
FIG. 10 illustrates the contrast ratio of FIG. 7.
Figure 11:
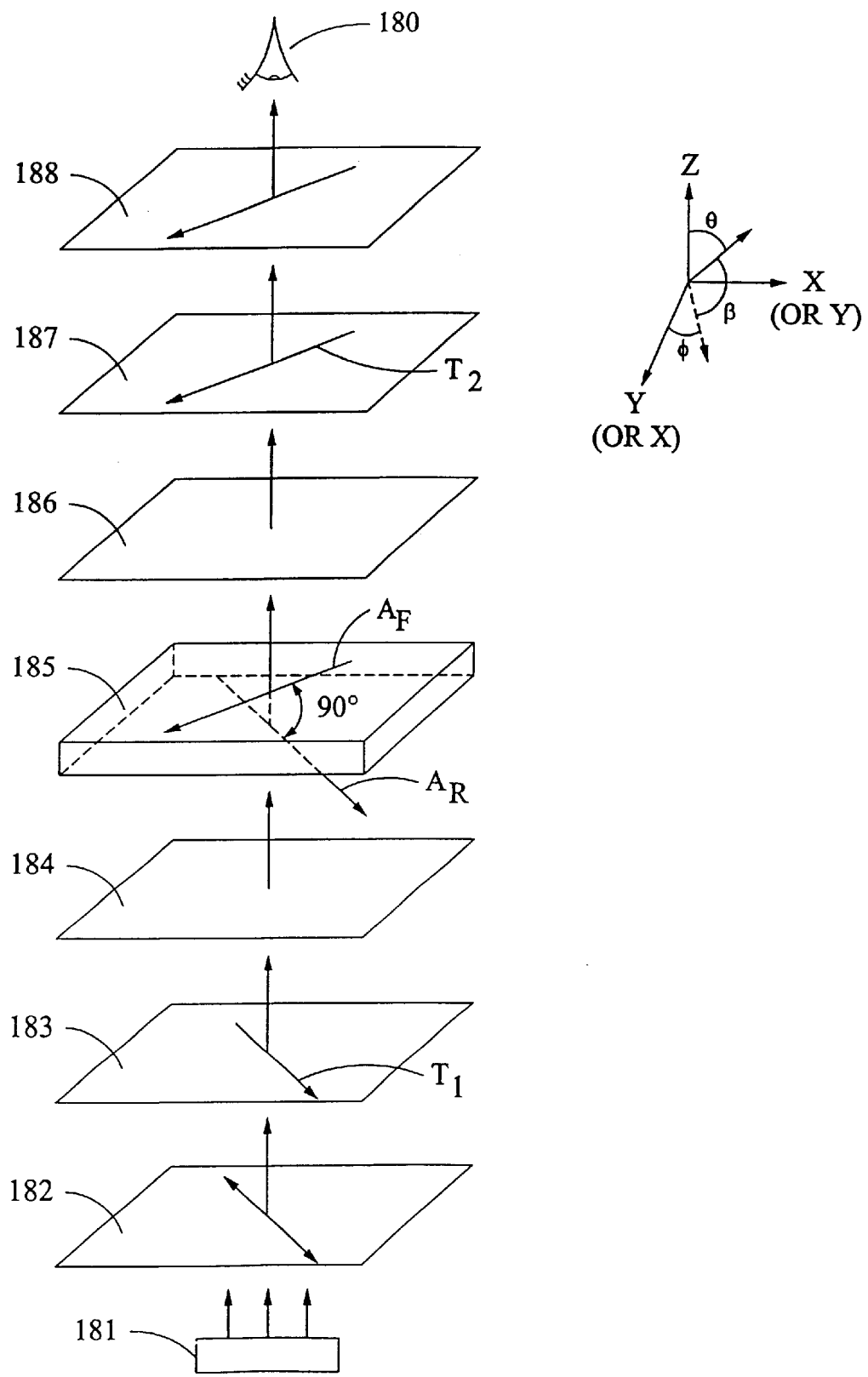
FIG. 11 is an exploded schematic view of the optical components and their respective azimuthal orientations of another existing normally white liquid crystal display device including non-uniform films.

FIG. 12(a) is an exploded schematic view of the optical components, and their respective azimuthal $\phi$ orientations of a twisted nematic (TN) NW LCD of the present invention, this LCD being either, for example, a light valve (LV) or an active matrix liquid crystal device (display) (AMLCD) having a matrix array of pixels and preferably having colored (e.g. RGB, RGBG, RGGB, or RGBW) sub-pixels therein. As shown, this display includes from the rear forward toward viewer 201, conventional backlight 203, rear or light-entrance linear polarizer 205, rear negative retarder 204 (which may be either uniaxial or biaxial, including indices of refraction $n_x$, $n_y$, and $n_z$,) rear tilted negative retarder 202, rear tilt sense or direction $A_R$ which shows the tilt sense of the liquid crystal molecules adjacent the rear LC orientation layer, twisted nematic (TN) liquid crystal (LC) layer 210 (preferably left-handed in this illustration), front tilt sense or direction $A_F$ which shows the tilt sense of the LC molecules of layer 210 adjacent the front LC orientation film, front tilted negative retarder 206, front negative retarder 207 which may be uniaxial or biaxial, and a front or light-exit linear polarizer (analyzer) 215. The LCD or LV of FIG. 12(a) is viewed by the viewer 201.

Substrates, such as glass or plastic, (discussed below) are normally located on opposite sides of nematic liquid crystal layer 210 as to be disposed, for example, between the respective orientation films and their adjacent polarizers. Driving electrodes are disposed on and between the substantially transparent substrates and their adjacent orientation layers.

A key to the present invention is the surprise finding that when negative tilted retarders 202 and 206 and negative retarders 204 and 207 (which may be tilted or non-tilted) are placed in particular orientations and locations with respect to the LC layer 210 and are preferably within a particular retardation value(s) range and/or ratio, have their tilt sense oriented in a certain manner, and/or are arranged in predetermined positions in the LCD, together with the orientation of the polarizers, improved viewing characteristics of the display result. For example, the resulting viewing characteristics of the LCD with respect to contrast ratio is wider/larger, while inversion is lessened, both in a particular viewing zone in some embodiments, such as the positive vertical zone which is so important to aircraft pilots.

Retarders 202, 204, 206, and 207 are said to be "negative" as refractive index $n_z$ in each of them is less than both indices $n_x$ and $n_y$ (i.e. negative birefringence). Indices of refraction $n_x$ and $n_y$, while being co-planar, are oriented at a 90° angle relative to one another in, for example, the plane(s) of the respective film(s) (or substantially perpendicular). Index of refraction $n_z$ is perpendicular (or substantially perpendicular) to the plane defined by the $n_x$ and $n_y$ directions (i.e. the $n_z$ direction in certain embodiments may be normal to the film plane(s) and in other embodiments may not). For negative uniaxial or slightly biaxial retarders 204 and 207, indices $n_x$ and $n_y$ typically define a plane co-planar with the retarder layers. However, for tilted retarders 202 and 206, the plane defined by $n_x$ and $n_y$ is usually tilted relative to the plane of the overall layer because, for example, the $n_x$, $n_y$ plane is parallel to or co-planar with the plane of the discotic molecules of the tilted retarder layers. Thus, in retarders 202 and 206, the $n_z$ optical axis or index is not perpendicular to the plane of the layer, but instead is tilted relative thereto.

Negative (when non-tilted) retarders 204 and 207 each have a retardation value $d \cdot (n_z - x_z)$ of from about −10 to −150 nm (preferably from about −10 to −80 nm), and a retardation value $d \cdot (n_x - n_y)$ of from about −20 to +20 nm [where "d" is the thickness of the retarder or compensator]. Thus, when $d \cdot (n_x - n_y) = 0$ nm (or approximately zero), these retarders 204 and 207 are negative uniaxial retarders and when refractive index $n_x$ is substantially greater or less than refractive index $n_y$ they are biaxial negative retarders (they are "negative" because $n_z$ is less than each of $n_x$ and $n_y$). Retarders 204 and 207 may be made, for example, of triacetyl cellulose (TAC) [i.e. cellulose tri-acetate film] having a thickness of about 70–250 μm (more preferably of from about 80–120 μm, and most preferably about 100 μm) or any other materials, such as those disclosed in U.S. Pat. No. 5,583,679, incorporated herein by reference. Each of these retarders may also include or be supplemented by a thin gelatin alignment layer thereon (0.1 μm) and/or a polyvinyl alcohol coating solution which is rubbed as discussed in U.S. Pat. No. 5,583,679. Alternatively, retarders 204 and 207 may be uniaxial C-plate made of a polyimide. This alignment layer is located between, for example, layers 202 and 204 and aligns molecules of the tilted retarder layer 202. It is also noted that the protective layer (e.g. TAC) of the polarizer typically includes a negative retardation value. Also, one of the protective layers of the polarizer may be the retarders 204 and 207 (e.g., regular TAC or TAC2 available from Fuji Film, Japan).

Figure 13A:
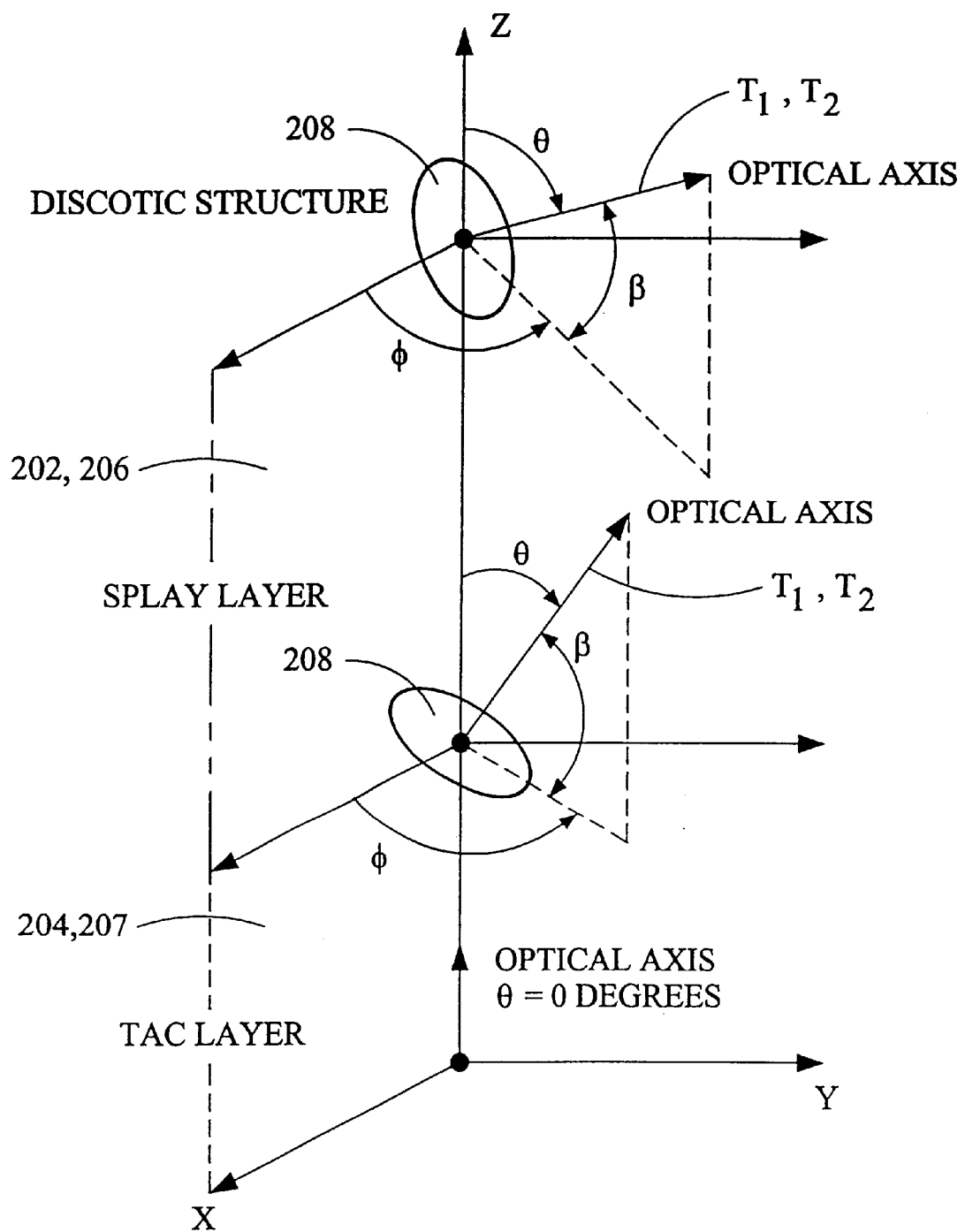
FIG. 13(a) illustrates an exemplary embodiment of a non-uniform film of the present invention.

Negative tilted anisotropic optical retarders or compensators 202 and 206 (e.g. made of a compound having a discotic structure unit in its molecule such as a discotic liquid crystalline compound having low molecular weight such as a monomer and a polymer obtained by polymerization of a polymeric discotic LC compound) have tilted optical axes T, and $T_2$, respectively (the azimuthal angles φ of optical axes $T_1$ and $T_2$, defined as the axes project in the plane of the respective films, are shown in FIG. 13(a)). $T_1$ and $T_2$ are sometimes referred to as the slow axis of the retainer. Each discotic negative retarder 202 and 206 is from about 1.5 to 3.0 μm thick (preferably about 2.0 μm thick) according to certain embodiments of this invention. Because each optical axes $T_1$ and $T_2$ are angled relative to both the vertical and horizontal, each defines both a polar angle (i.e. tilted or inclined angle θ) which is the angle defined between (i) the direction normal to the disc-like molecules of the retarder, and (ii) the direction normal to the display; and an azimuth angle φ which is the direction of axis $T_1$, $T_2$ of the optical axis of a retarder in the $n_x$, $n_y$, plane or the plane of the film, as viewed from the point of view of viewer 201, as shown, for example, in FIGS. 13(a) and 12(b). It is noted that because the plane defined by discotic molecules in the tilted retarders varies along with tilt angle θ, the $n_x$, $n_y$ plane also varies in tilted retarders herein. The polar angle θ of each of tilted retarders 202 and 206 varies (either continuously or intermittently in either direction) throughout the thickness of the film while the azimuthal angle φ remains substantially constant in the film. It is noted that, if desired, the discotic structure may include changing azimuthal angle φ. For example, the tilt angle θ of one or both of retarders 202 and 206 may vary continuously from about 5° to 65° through the thickness of the layer. The inclined or polar angle θ may vary within the range of from 5° to 85° (preferably from about 10 to 80°) while the minimum polar angle θ in the film (at the side of the film furthest from LC layer 210) is in the range of from about 0° to 85° (preferably from about 1 to 10°) and the maximum polar angle θ is (at the side of the film 202, 206 located closest to LC layer 210) from about 5° to 90° (preferably from about 45° to 70°). U.S. Pat. No. 5,583,679 (the disclosure of which is incorporated herein by reference) includes exemplary embodiments of tilted films 202 and 206. Preferably, tilted retarders 202 and 206 are oriented on opposite sides of LC layer 210, although that need not be the case in all embodiments.

In certain preferred embodiments of the invention, it has been found that improved results are obtained by orienting tilted retarders 202 and 206 so that the light from backlight 203 hits the low tilt angle θ side of rear tilted retarder 202 first, travels through =a retarder 202 and LC layer 210, exits the LC layer 210, and then first hits the high tilt angle θ side of front tilted retarder 206 and exits retarder 206 on the low tilt angle θ side thereof [see FIGS. 12(b)–12(e)].

It was discovered by the present inventor that the orientation of the front tilted retarder 206 in a direction parallel to $A_F$ and the rear tilted retarder 201 anti-parallel to $A_R$ (anti-parallel as defined herein means in an opposite direction, such as for example, substantially 180 degrees) resulted in a substantial improvement in the contrast ratios. In addition, preferably tilted retarder 206 is perpendicular to $P_F$ of the front polarizer 215, and tilted retarder 202 is perpendicular to $P_R$ of the rear polarizer 205.

A "negative" retarder means that $n_e < n_o$. As known in the art, refractive index $n_z$ (i.e. optical axis) in a negative uniaxial retarder is equal to refractive index $n_e$ in such a retarder. In slightly biaxial retarders when $r_x$ is proximate to but not exactly equal to $n_y$ (e.g. $n_x = 1.57$ and $n_y = 1.59$), then $n_o$ may be considered equal to either $n_x$ or $n_y$ as such retarders, although slightly biaxial, are essentially uniaxial in nature ($n_e$ is considered the $n_z$ index in such biaxial retarders also).

Tilted negative retarders 202 and 206 each include refractive indices $n_x$, $n_y$, and $n_z$, and thus extraordinary refractive index $n_e$ for the optical axis of symmetry of the discotic molecule structure, and ordinary refractive index or axis $n_o$ which is perpendicular to $n_e$ as known in the art. According to certain embodiments of this invention, each of retarders 202 and 206 has an $n_e$ (and $n_z$) of from about 1.40 to 1.65, preferably from about 1.45 to 1.60, most preferably about 1.54, and an $n_o$ (and $n_x$ and/or $n_y$) of from about 1.45 to 1.70, preferably from about 1.5 to 1.6, and most preferably from about 1.57 to 1.58. Also, each of retarders 202 and 206 has a thickness of from about 1.5 to 3.0 μm (preferably about 2.0 μm), and a Δ (i.e. $n_e$ $n_o$) value of from about −0.30 to +0.20, preferably from about −0.20 to +0.10, and most preferably from about −0.10 to 0.0.

Rear retarders 202 and 204 may be laminated or otherwise formed together as one unit as discussed in the '679 patent (previously referred to), as may front retarders 206 and 207. An orientation or alignment layer may be provided between layers 202 and 204 (and between layers 206 and 207) to align the discotic molecules of the tilted retarders.

Retarders 202, 204, and 206, 207 may be obtained from Fuji Photo Film Co., Ltd., Japan, generally known as WV-film.

Backlight 203 is conventional in nature and emits substantially collimated, or alternatively diffused (in the embodiments shown herein), light toward the display panel. Backlight 203 may be, for example, the backlighting assembly disclosed in U.S. Pat. No. 5,161,041, the disclosure of which is hereby incorporated herein by reference. Other conventional high intensity substantially collimated or diffuse backlight assemblies may also be used.

Rear and front polarizers, 205 and 215 respectively, may be iodine based absorption and linear in nature according to certain embodiments of this invention, and their respective linear transmission axes $P_R$ and $P_F$ are oriented perpendicular to one another (i.e. about 90° from one another ± about 15° (substantially perpendicular) in either direction) so that LCDs and LVs of the different embodiments of this invention are of the normally white (NW) twisted nematic (TN) type. In general, the polarizers are normally attached to the outside of the retainers with respect to the liquid crystal material. Therefore, when a driving voltage (e.g. 0.0 or 0.1 V) below the threshold voltage $V_{th}$ is applied by the opposing electrodes across liquid crystal (LC) layer 210, transmission axes $P_R$ and $P_F$ of polarizers 205 and 215, respectively, are oriented such that the light emitted from backlight 203 proceeds through and is linearly polarized in direction $P_R$ by rear polarizer 205, is then twisted (e.g. from about 80° to 100°, preferably about 90°) by twisted nematic LC layer 210, and finally exits front polarizer or analyzer 215 via transmission axis $P_F$ thus reaching viewer 201 with an image. The light reaches viewer 201 because its polarization direction upon reaching front polarizer 215 is similar to the direction defined by transmission axis $P_F$. Thus, a NW display or pixel to which a voltage less than $V_{th}$ is applied is said to be in the "off-state" and appears white (or colored if color filters are present) to the viewer. These conventional polarizers 205 and 215 are commercially available from, for example, Nitto Denko America, as #NPF-HEG-1425-DU.

However, when a substantial driving voltage (i.e. gray level voltage or full voltage greater than the threshold voltage $V_{th}$) is applied across the LC of selected NW pixels of the LCD matrix array, the light transmitted through rear polarizer 205 is not twisted as much by LC layer 210 and thus is at least partially blocked by front polarizer 215 due to the fact that the polarization direction of light reaching the interior surface of front polarizer 215 is substantially perpendicular (or otherwise non-aligned) to transmission axis $P_F$, thereby resulting in substantially none, or a lessor amount of, light reaching viewer 201 by way of the selected pixel(s) to which the substantial driving voltage (e.g. from about 3.0–6.5 volts) is applied. Thus, driven pixels in the LCD appear darkened to viewer 201, these pixels said to be in the "on-state."

Figure 13B:
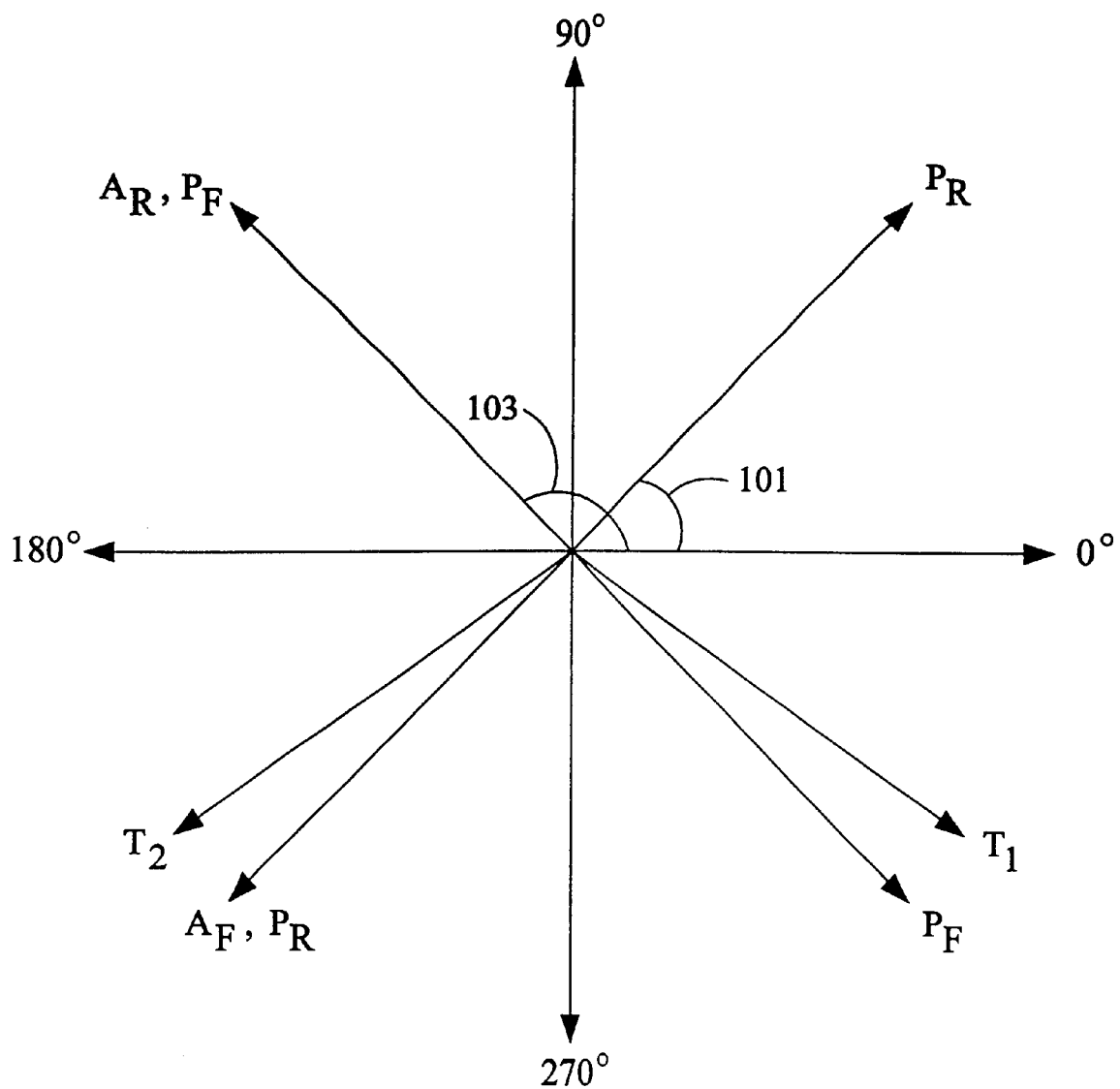
FIG. 13(b) illustrates an exemplary embodiment of the optical axes of the device of FIG. 12(a).

Important aspects of this invention which result in the improved viewing characteristics (better contrast and less inversion) disclosed herein include one or more of the following factors (i) the substantially parallel orientation (i.e. within about ±10° from parallel in either direction) of the azimuthal angle φ aspect of optical axis $T_2$ of tilted retarder 206 relative to the transmission axis $P_F$ of the front polarizer; (ii) the orientation of the rear and front polarizers 205 and 215 having its transmission axis aligned parallel or perpendicular about ±10° (i.e. substantially parallel/perpendicular) to the tilt sense alignment direction ($A_R$ or $A_F$) on the same side of the LC layer 10; (iii) the tilted retarders 202 and 206 orientation to the LC layer 210; (iv) the substantially perpendicular orientation of optical axes $T_1$ and $T_2$ (with respect to azimuthal angle φ); (v) the substantially parallel (±about 10° from parallel in either direction) orientation of the azimuthal angle aspect of $T_1$ and rear LC tilt sense direction $A_R$ as shown in FIGS. 12(a) and 13(b); (vi) direction $A_F$ being substantially parallel to the azimuthal φ angle aspect of optical axis $T_2$ of retarder 206 as shown in FIGS. 12(a) and 13(b); (vii) the orientation of the film with respect to the LC material and buffing directions; (viii) whether the retarders are both located on one side or both sides of the LC material; and (ix) whether the tilted retarders 202, 206 are oriented closer to or further away from the LC material than the retarders 204, 207, respectively.

The rear and front orientation or buffing films are preferably each from about 250–500 Å thick, and may be made of a substantially transparent polyimide material as is known in the art. Directions $A_R$ and $A_F$ are oriented substantially perpendicular to one another so as to allow the molecules of nematic liquid crystal layer 210, when in the OFF or non-driven state, to be twisted from about 80° to 100°, preferably about 90° as known in the art. Also, it is pointed out that the tilted retarders of the instant invention may be used in conjunction with multi-domain [e.g. two-domain] alignment applications [the retarders may be patterned or otherwise provided in such embodiments]. The patterning may be within the film or aligned (proximate) to the LC material, or any other suitable technique. It is to be noted that any angles other than 80 degree to 100 degree twists may be used, such as for example, 180 degrees to 270 degrees, within the spirit of the invention.

Liquid crystal layer 210 preferably has a thickness "d" of from about 3.0 to 6.5 μm according to certain embodiments, more preferably from about 3.5 to 5.0 μm. LC layer 210 preferably has a birefringent value Δn of from about 0.08 to 0.20, more preferably from about 0.102 to 0.106 at room temperature.

Negative retarders 204 and 207 are preferably non-tilted and defined by either the characteristic $n_x > n_y > n_z$, or alternatively $n_x = n_y$, where $n_x$, $n_y$, and $n_z$ are respective indices of refraction, and the "z" direction is substantially perpendicular to the plane defined by the "x" and "y" index directions. Negative retarders 204 and 207 are preferably either of the C-plate type (approximately $n_x = n_y > n_z$) or of the biaxial type (e.g. $n_x > n_y > n_z$, or $n_y > n_x > n_z$), and may be obtained from Nitto Denko America or Nitto Corporation (Japan), or alternatively from Fuji Photo Film Co., Ltd., Industrials and Products Division, Japan.

According to certain embodiments, the retarders and polarizers herein may all be separate sheets, although they alternatively may be all integrally formed or laminated together (or even deposited onto one another) with a known laminating material or deposition process according to certain embodiments. Thus, films 202, 204, and 205, for example, may be laminated or otherwise formed together to form a single sheet having negative tilted retarder 202, negative uniaxial or biaxial retarder 204, and rear polarizer 205. Likewise, films 206, 207, and 215 may be formed together as one unit or separately.

FIG. 13(a) is an optical diagram illustrating different angles associated with tilted retarders 202 and 206 herein. As illustrated, the x and y axes define a plane, and the z axis is perpendicular to that plane. FIG. 13(a) illustrates the embodiment herein where the non-tilted retarders 204 and 207 are laminated to or otherwise integrally formed immediately adjacent to tilted retarders 202 and 206. As shown in FIG. 13(a), TAC layer 204 (or 207) is immediately adjacent a corresponding tilted retarder 202 (or 206). The optical axis ($T_1$ or $T_2$) [and thus the $n_z$ direction] associated with each retarder 202, 206 extends substantially perpendicularly outward from a plane defined by the discotic molecular structure of each molecule within tilted retarders 202 and 206. As shown in FIG. 13(a), the $n_z$ direction for uniaxial TAC retarders may be in the normal direction, while in tilted retarders 202, 206 the $n_z$ direction (the same as the optical axis $T_1$ or $T_2$ direction) is tilted from the normal direction. Optical axes $T_1$ and $T_2$ point in the $n_z$ or $n_e$ index direction, and indices $n_x$ and $n_y$ define the plane of disc-like discotic molecules 208 in tilted retarders 202 and 206. Because the tilt angle of the molecules 208 within retarders 202 and 206 varies throughout the thickness of retarders 202 and 206, the incline θ of optical axes $T_1$ and $T_2$ also vary through the thicknesses of layers 202 and 206.

FIG. 13(a) defines azimuthal angle φ as well as tilt angles θ and β as used herein with regard to tilted retarders 202 and 206. Azimuthal angle φ defines the orientation of optical axis $T_1$ or $T_2$ in the film plane when viewed by a hypothetical viewer located normal to the plane of the film (note that the plane of the film is not the same as the $n_x$, $n_y$ plane for tilted retarders 202 and 206, although these planes are effectively the same for non-titled uniaxial retarders 204 and 207). Meanwhile, angles θ and β illustrate the varying tilt of the optical axis of a tilted retarder through its thickness. Tilt angle θ defines the tilt angle between the optical axis ($T_1$ or $T_2$) and the axis normal to the display, which is perpendicular to the plane of the film. Meanwhile, tilt angle β defines the tilt angle defined between the optical axis ($T_1$ or $T_2$) and the plane of the film or retarder. In all embodiments herein, tilt angles β and θ should add up to be 90° (or substantially 90 degrees), because the axis normal to the display is perpendicular to the plane of the retarder film.

Still referring to FIG. 13(a), in this embodiment tilt angle θ in tilted retarder layer 202 (or 206) is smallest adjacent non-tilted retarder TAC layer 204 (or 207) [see also FIGS. 12(b) to 12(e)]. Tilt angle θ increases throughout the thickness of the tilted retarder as the molecules therein move further away from the adjacent TAC layer 204. Thus, tilt angle θ is largest on the surface of the tilted retarder 202 (or 206) furthest from TAC layer 204 (or 207). As will be appreciated by those of skill in the art, tilt angle β is largest adjacent the adjacent TAC layer, and is smallest on the side of the tilted retarder furthest from the TAC layer and continually decreases therebetween through the thickness of the tilted retarder layer.

FIG. 13(b) illustrates the relationship between the FIG. 12(a) azimuthal axis directions parallel to the film planes, from the point of view of viewer 201. As shown in FIG. 13(b), transmission axis $P_F$ of front polarizer 215 is substantially perpendicular to axis $P_R$ of rear polarizer 205. Still referring to FIG. 13(b), direction $A_F$ is approximately (substantially) perpendicular to direction $AR_1$. It is to be understood that merely different directions is sufficient for the embodiments described herein.

With regard to tilted retarders 202 and 206, the azimuthal angle aspect φ of axis $T_1$ of retarder 202 is substantially perpendicular to the azimuthal angle aspect φ of axis $T_2$ of retarder 206. According to the FIG. 13(b) embodiment, $P_R$, $A_F$, and $T_2$ (azimuthal) are substantially parallel to one another, while $P_F$, $A_R$, and $T_1$ (azimuthal) are also parallel to one another, ±approximately 10° (i.e. substantially parallel). It should be understood that these angles are exemplary only, and that the axes may be aligned at different angles according to other embodiments of this invention, provided that the display is of the normally white type.

Figure 14:
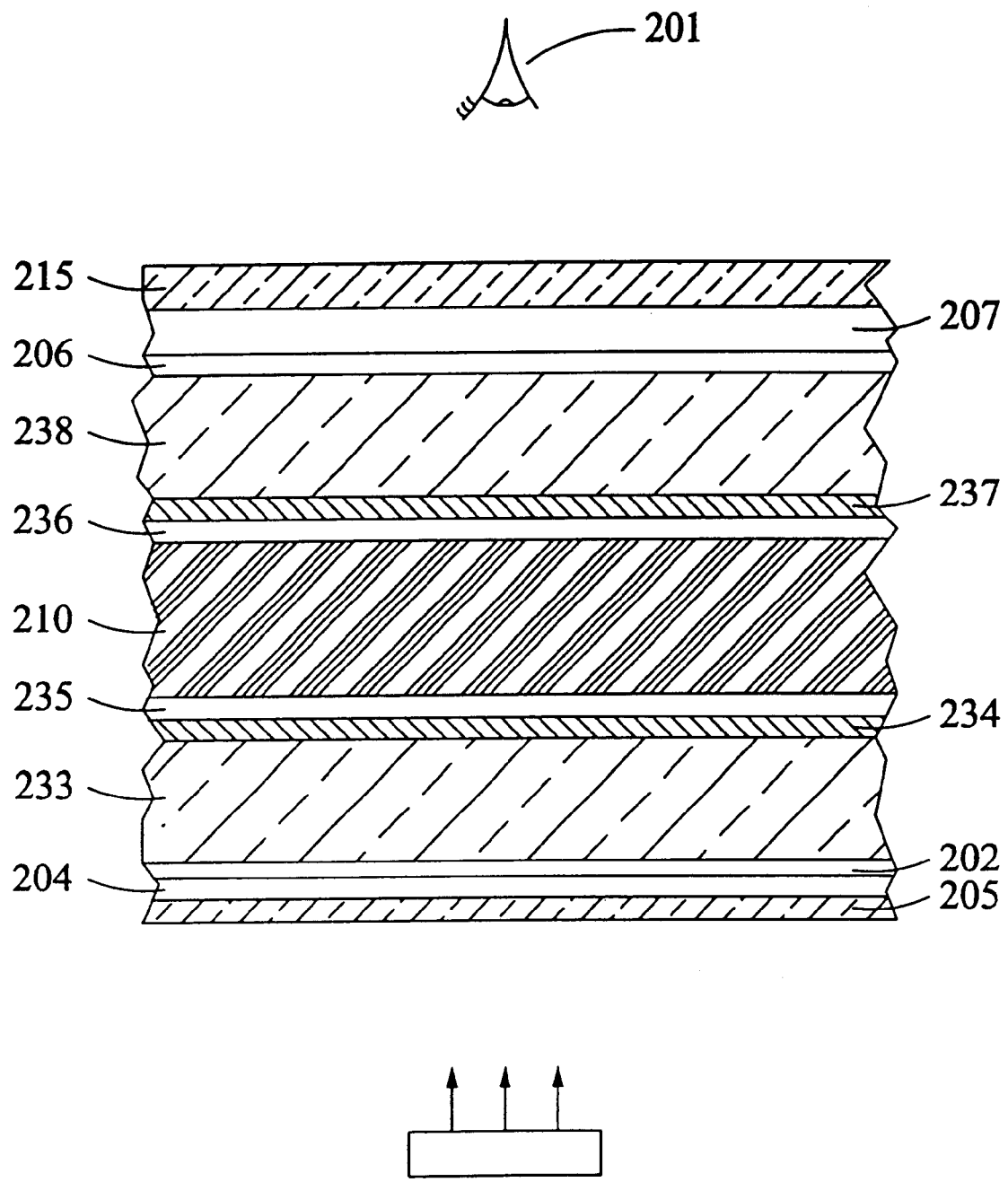
FIG. 14 is a side cross sectional view of an exemplary embodiment of a twisted nematic liquid crystal display device.

FIG. 14 is a side cross-sectional view of an exemplary NW twisted nematic LCD or LV. From the backlight forward, the display includes rear polarizer 205, tilted or non-tilted negative retarder 204 (either uniaxial or biaxial), negative tilted retarder 202, substantially transparent glass or plastic substrate 233, conductive transparent electrode(s) 234, rear buffing or orientation film 235, twisted nematic liquid crystal (LC) layer 210, front orientation or buffing film 236, front transparent conductive electrode(s) 237 which functions in conjunction with rear electrode(s) 234 in order to apply voltage across LC layer 210 and/or individual pixels or sub-pixels defined therein, front substantially transparent glass or plastic substrate 238, front tilted negative retarder 206, front tilted or non-tilted negative retarder 207 (either uniaxial or biaxial), and a front polarizer 215. Thus, the incline or polar angle θ of the optical axis $T_1$ of retarder 202 may, for example continuously vary, from a maximum of 65° in the area of film 202 adjacent substrate 233, to 5° adjacent retarder layer 204. Thus, in this particular example, the plane of the discotic structure in negative tilted retarder 202 has a planar incline angle that is continuously reduced from a tilt of 60° or 65° to one of 5°, from the interior side of layer 202 to the exterior side of layer 202. The other negative tilted retarder 206 has its polar or incline angle θ vary (continuously or intermittently) relative to LC layer 210 as shown in FIGS. 12(a)–12(e).

Exemplary variations of polar angles θ for each of tilted retarders 202 and 206 are: (i) from 65° to 5° going away from LC layer 210; (ii) from 50° to 20° going away from LC layer 210; (iii) from 70° to 20° going away from LC layer 210; and (iv) from 40° to 20° going away from LC layer 210. In certain preferred embodiments, the azimuthal angles φ of optical axes $T_1$ and $T_2$ remain substantially constant while the incline angles θ and β vary either continuously or intermittently as discussed above.

According to certain embodiments of this invention, the retardation value $d \cdot (n_e - n_o)$ of each of the two tilted negative retarders 202 and 206 is from about −20 to −200 nm, preferably about −50 nm to −150 nm, and most preferably from about −70 nm to −100 nm, and where $n_e < n_o$. In certain embodiments, $n_e$ is equal to $n_z$, and $n_o$ is equal to $n_x$ or $n_y$ because $n_x$ and $n_y$ are either equal to one another or differ from one another by less than about 0.5% (e.g. when $n_x$=1.57 and $n_y$=1.58) so that the retarders 202 and 206 are effectively uniaxial. Also, for each of tilted retarders 202 and 206, retardation values $d \cdot (n_z - n_x)$ and $d \cdot (n_z - n_y)$ are each from about −20 to −200 nm, preferably from about −50 to −150 nm, and most preferably from about −70 to −100 nm.

Figure 15:
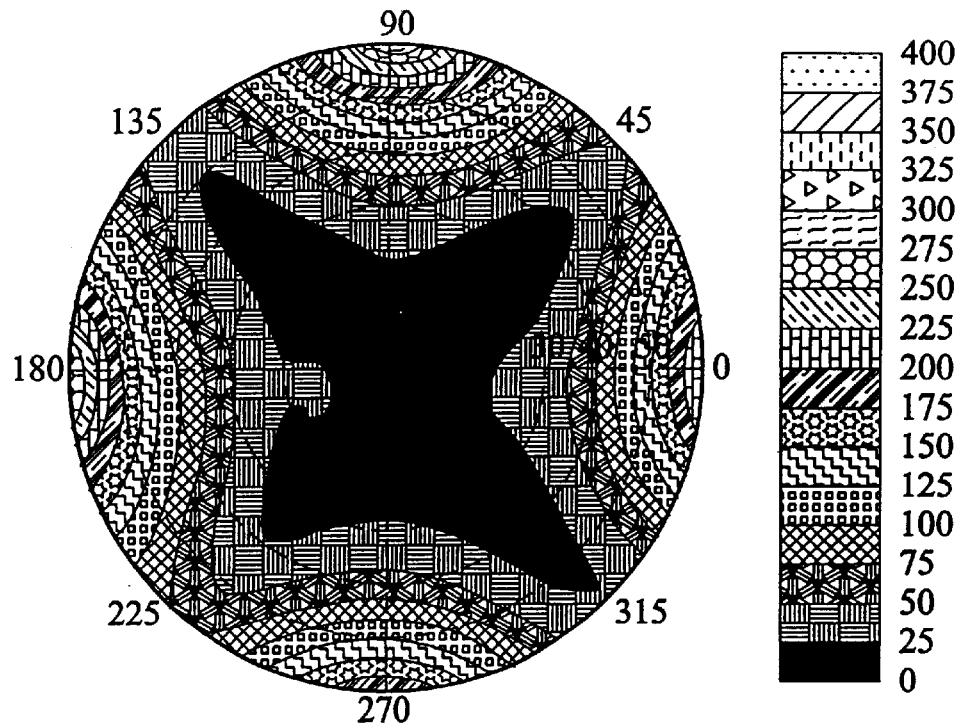
FIG. 15 illustrates the black mode of FIG. 12(a).
Figure 16:
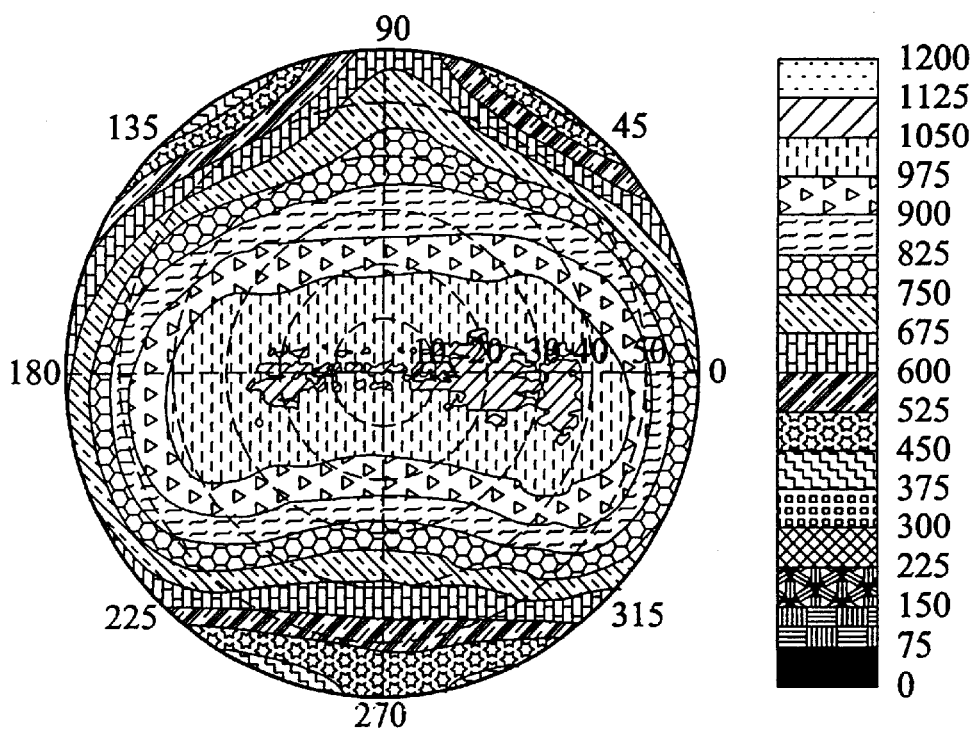
FIG. 16 illustrates the white mode of FIG. 12(a).
Figure 17:
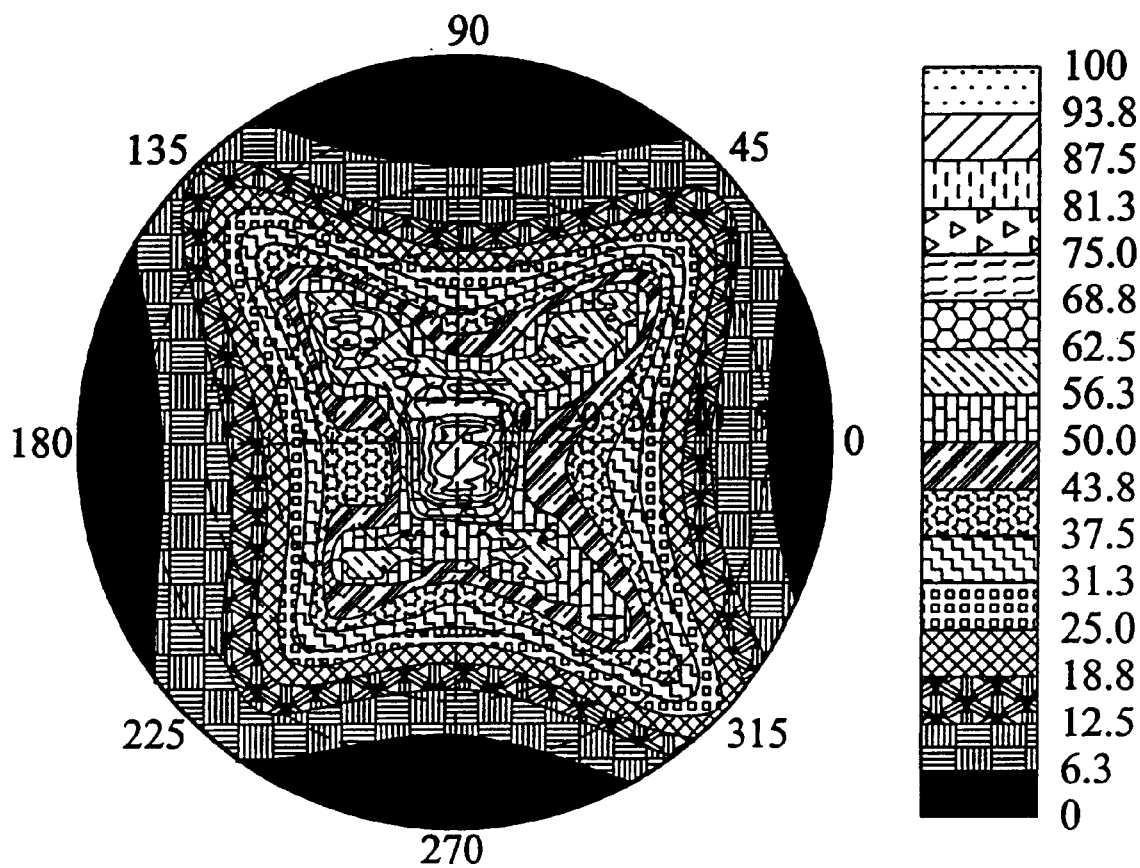
FIG. 17 illustrates the contrast ratio of FIG. 12(a).
Figure 18:
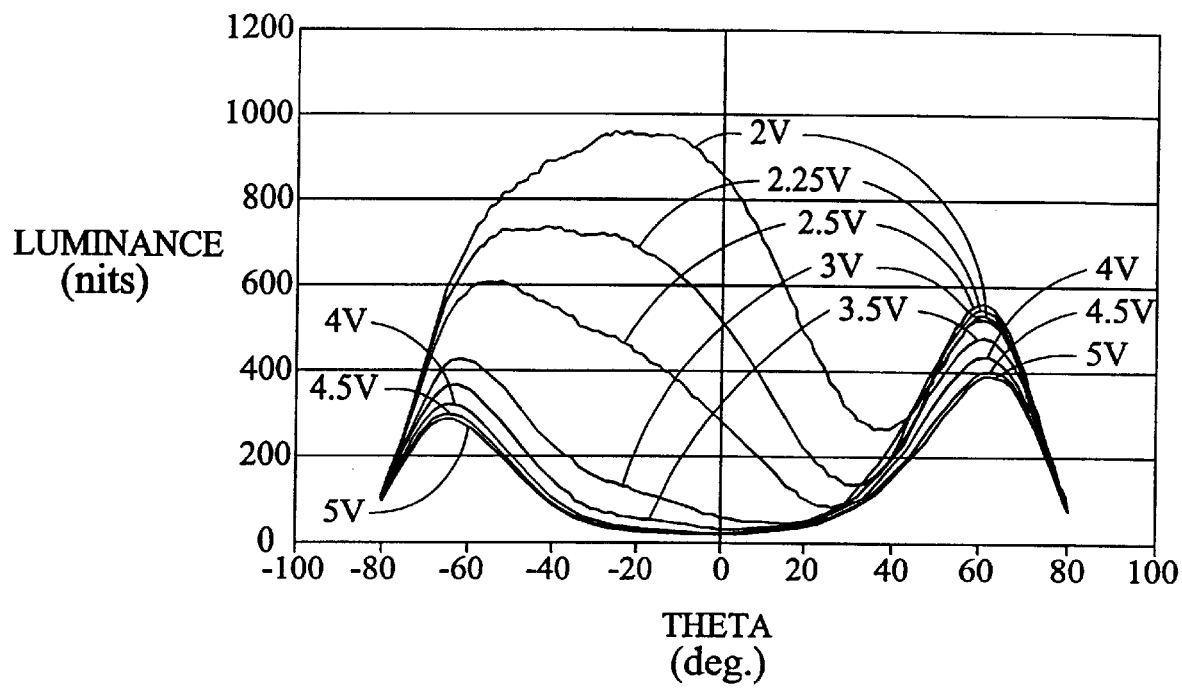
FIG. 18 illustrates the vertical grey level separation of FIG. 12(a).
Figure 19:
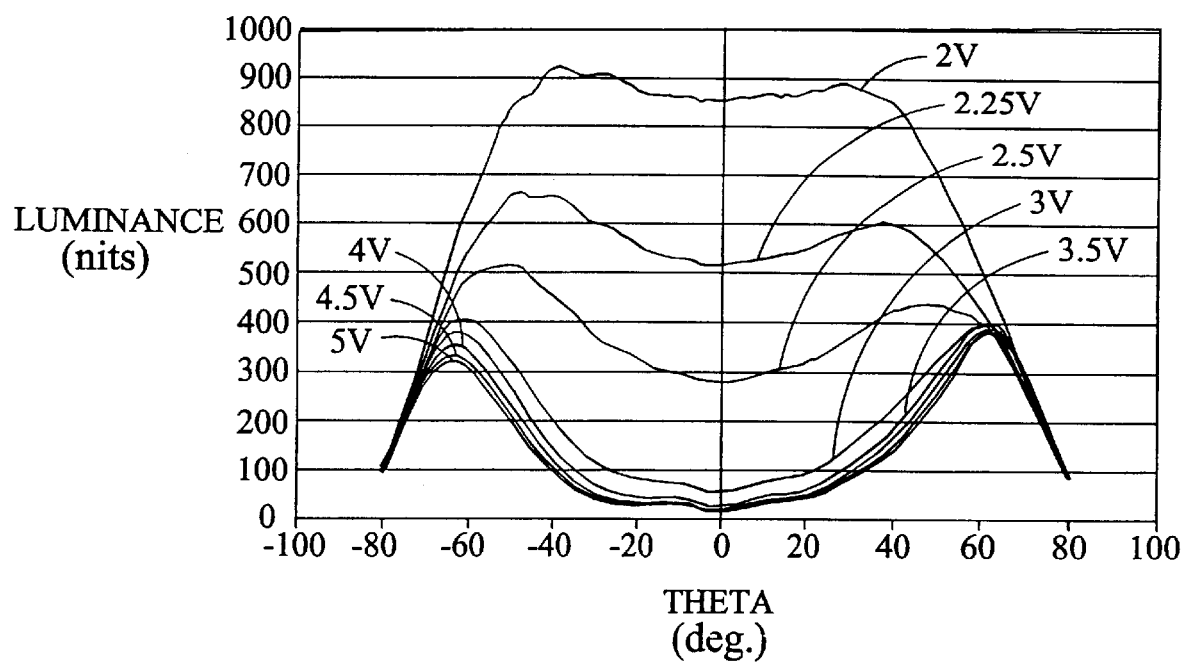
FIG. 19 illustrates the horizontal grey level separation of FIG. 12(a).

Referring to FIGS. 15–17, it may be observed that the resulting black mode is relatively symmetric (FIG. 15), the resulting white mode is relatively symmetric (FIG. 16), and that the contrast (FIG. 17) is likewise symmetric, but somewhat limited in contrast ratios at extreme widths, for the structure shown in FIG. 12(a). Referring to FIG. 18 it may be observed that the grey level separation of the embodiment shown in FIG. 12(a) is adequate for vertical angles between −40 degrees to +20 degrees. In addition, referring to FIG. 19 the grey level separation of the embodiment shown in FIG. 12(a) is adequate for horizontal angles between −50 degrees and +50 degrees. To the present inventor's surprise the embodiment shown in FIG. 12(a) does not undergo any significant horizontal inversion nor vertical inversion, which is especially important for some applications.

Figure 20:
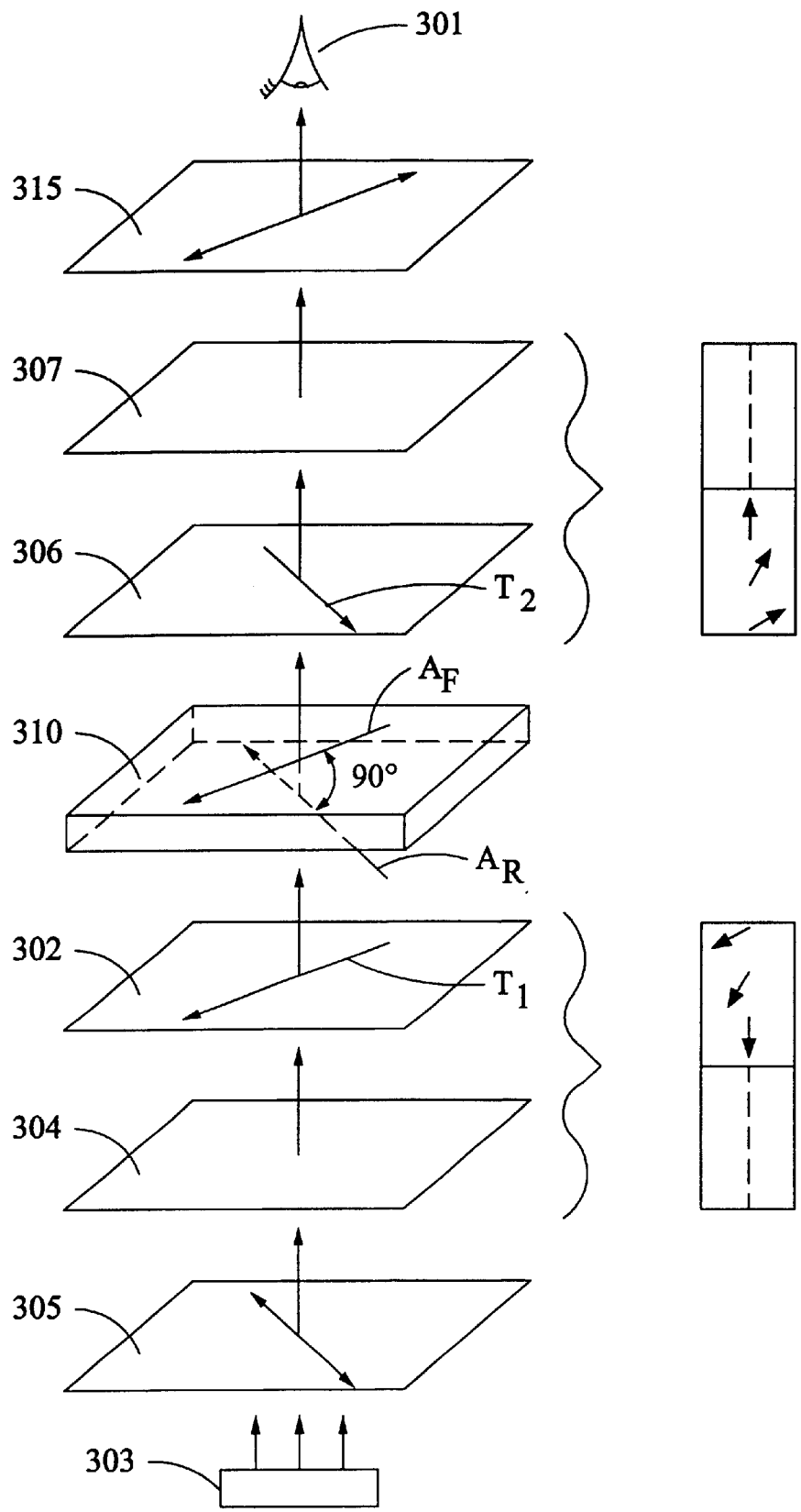
FIG. 20 is an exploded schematic view of another exemplary embodiment of the optical components and their respective azimuthal orientation of a liquid crystal display device having non-uniform films.

The present inventor considered the configuration shown in FIG. 12(a) and desired to increase the width of the high contrast region. After further development, the present inventor was surprised to determine that the configuration shown in FIG. 20 provides such an increased horizontal contrast region. FIG. 20 is an exploded schematic view of the optical components of a LCD device that includes from the rear forward toward viewer 301, conventional backlight 303, rear or light-entrance linear polarizer 305, rear negative retarder 304 (which may be either uniaxial or biaxial, including indices of refraction $n_x$, $n_y$, and $n_z$), rear tilted negative retarder 302, rear tilt sense or direction $A_R$ which shows the tilt sense of the liquid crystal molecules adjacent the rear LC orientation layer, twisted nematic (TN) liquid crystal (LC) layer 310, front tilt sense or direction $A_F$ which shows the tilt sense of the LC molecules of layer 310 adjacent the front LC orientation film, front tilted negative retarder 306, front negative retarder 307 which may be uniaxial or biaxial, and a front or light-exit linear polarizer (analyzer) 315. The LCD or LV of FIG. 20 is viewed by viewer 301. It is noted that the optical axes of the tilted negative retarders 302 and 306 are perpendicular to the respective tilt sense $A_R$ and $A_F$ of the LC layer 310. In addition, the polarizers 305 and 315 are preferably parallel to the respective tilt sense $A_R$ and $A_F$ of the LC layer 310. Preferably, the tilted negative retarders 302 and 304 are closer to the LC layer 310 than the respective front and rear negative retarder 307, 304.

Figure 21:
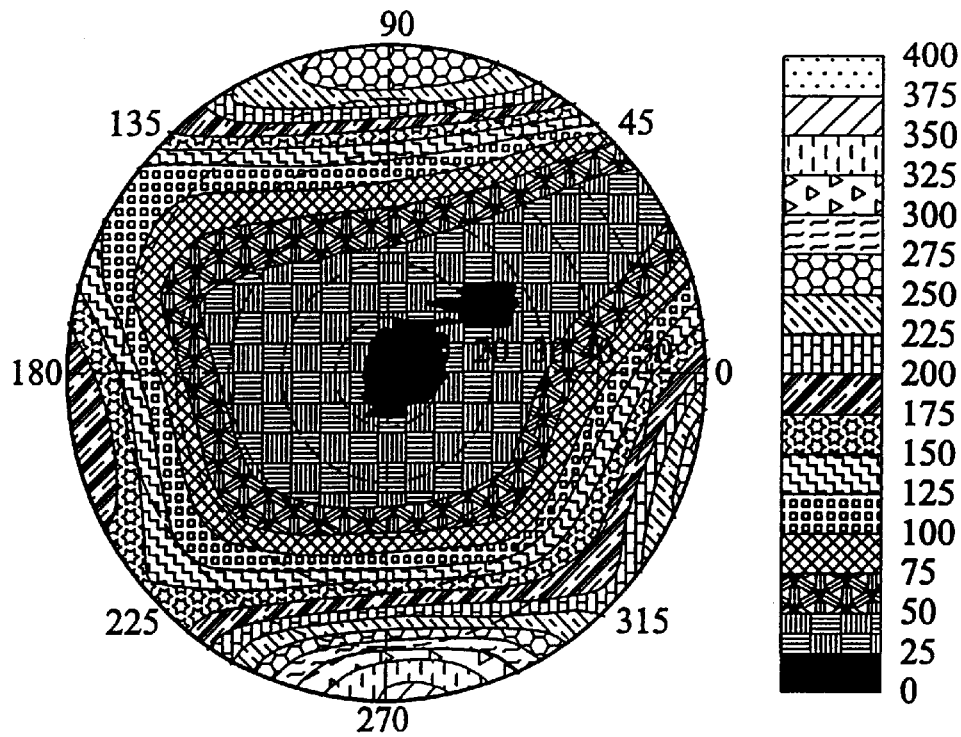
FIG. 21 illustrates the black mode of FIG. 20.
Figure 22:
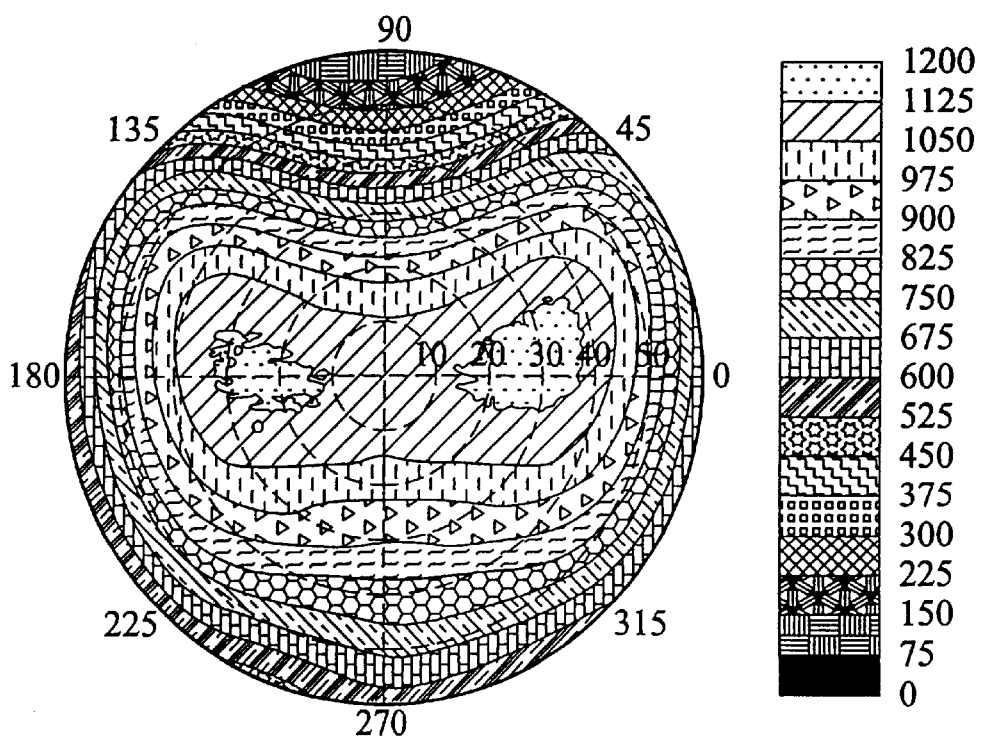
FIG. 22 illustrates the white mode of FIG. 20.
Figure 23:
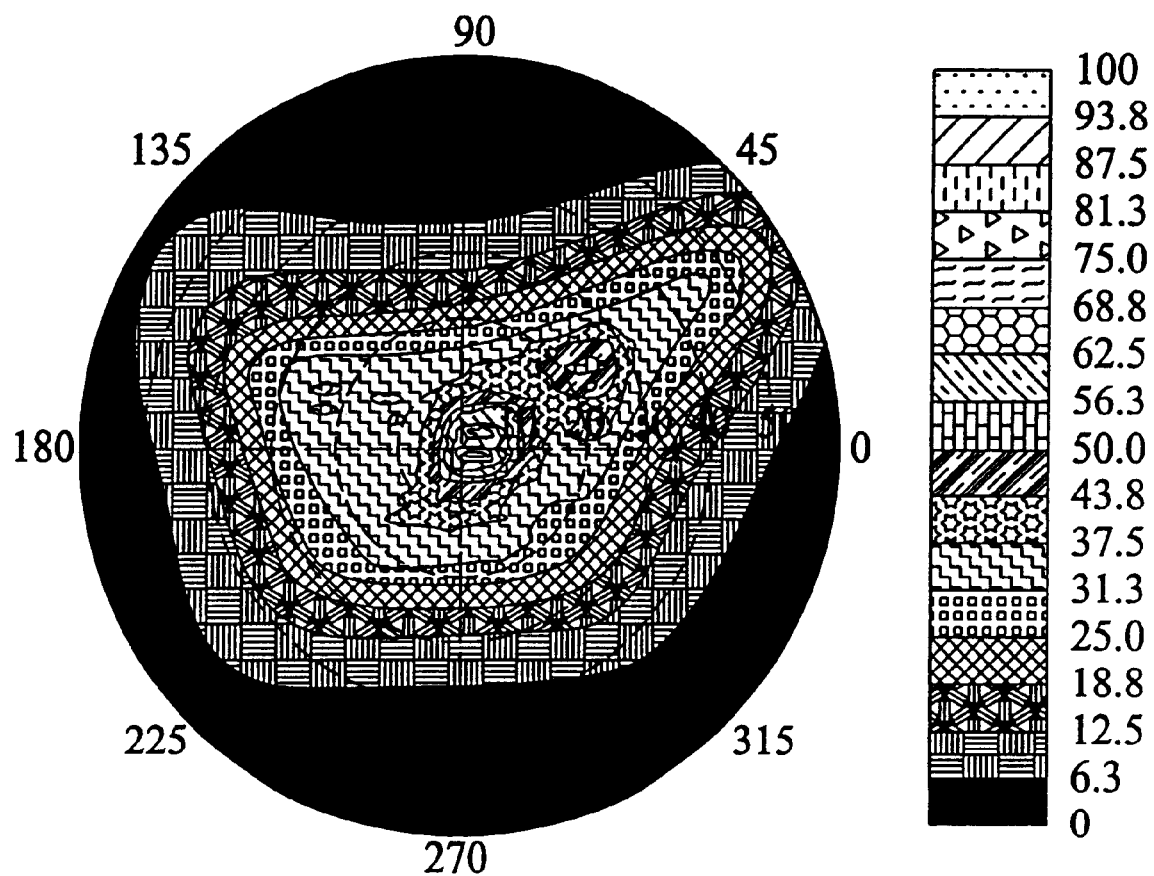
FIG. 23 illustrates the contrast ratio of FIG. 20.

Referring to FIGS. 21–23, it may be observed that the resulting black mode is slightly non-symmetric (FIG. 21), the resulting white mode is relatively symmetric (FIG. 22), and that the contrast (FIG. 23) is somewhat non-symmetric in accordance with the black mode (FIG. 21), for the structure shown in FIG. 20. The result is a slightly larger region having greater contrast. While an improvement, in several respects, over the embodiment shown FIG. 12(a), a greater vertical high contrast region is desirable for many applications.

Figure 24:
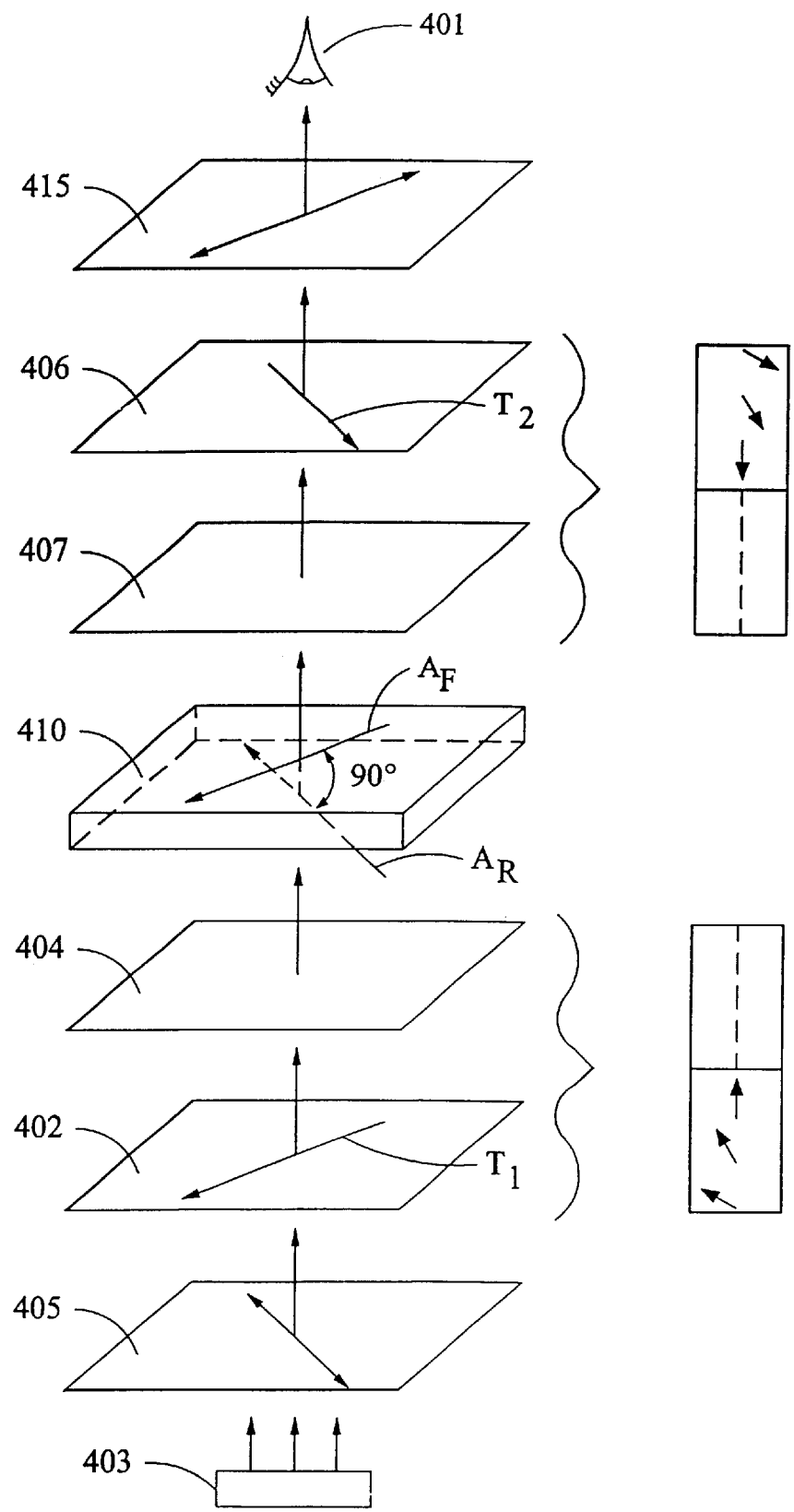
FIG. 24 is an exploded schematic view of yet another exemplary embodiment of the optical components and their respective azimuthal orientation of a liquid crystal display device having non-uniform films.

The present inventor considered the configurations shown in FIG. 12(a) and 20, and desired to further increase the width of the high contrast region. After further development, the present inventor was surprised to determine that the configuration shown in FIG. 24 provides such an increased horizontal contrast region. FIG. 24 is an exploded schematic view of the optical components of a LCD device that includes from the rear forward toward viewer 401, conventional backlight 403, rear or light-entrance linear polarizer 405, rear tilted negative retarder 402, rear negative retarder 404 (which may be either uniaxial or biaxial, including indices of refraction $n_x$, $n_y$, and $n_z$), rear tilt sense or direction $A_R$ which shows the tilt sense of the liquid crystal molecules adjacent the rear LC orientation layer, twisted nematic (TN) liquid crystal (LC) layer 410, front tilt sense or direction $A_F$ which shows the tilt sense of the LC molecules of layer 410 adjacent the front LC orientation film, front negative retarder 407 which may be uniaxial or biaxial, front tilted negative retarder 406, and a front or light-exit linear polarizer (analyzer) 415. The LCD or LV of FIG. 24 is viewed by viewer 401. It is noted that the orientation of the polarization of the tilted negative retarders 402 and 406 are perpendicular to the respective tilt sense $A_R$ and $A_F$ of the LC layer 410. In addition, the tilted negative retarders 402 and 406 are positioned farther from the LC layer 410 than the respective negative retarders 404 and 407. Also, the polarizers 405 and 415 are preferably parallel to the respective tilt sense $A_R$ and $A_F$ of the LC layer 410.

Figure 25:
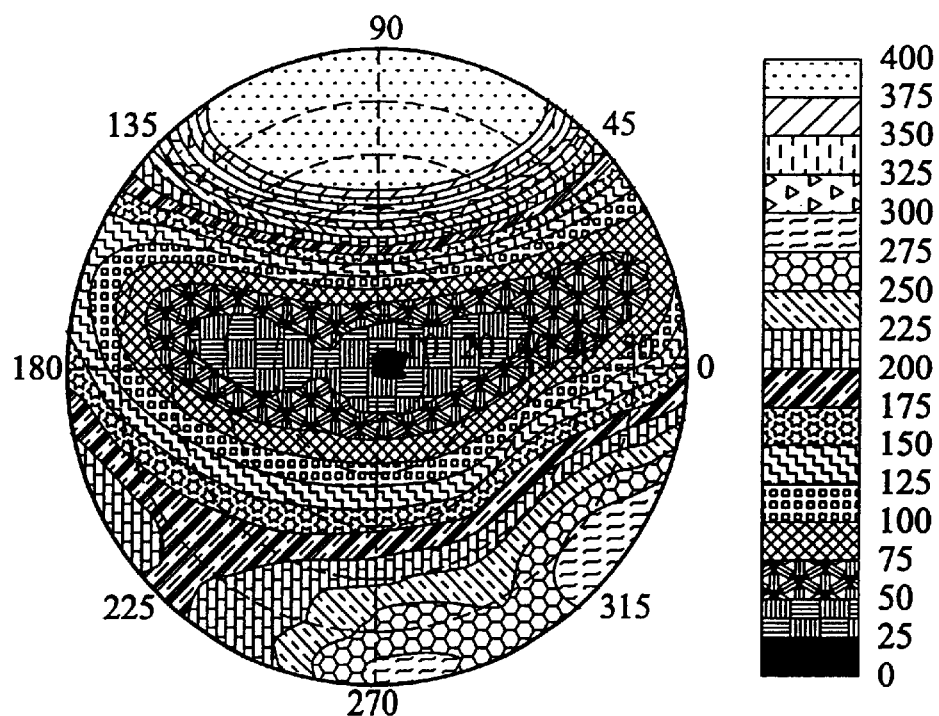
FIG. 25 illustrates the black mode of FIG. 24.
Figure 26:
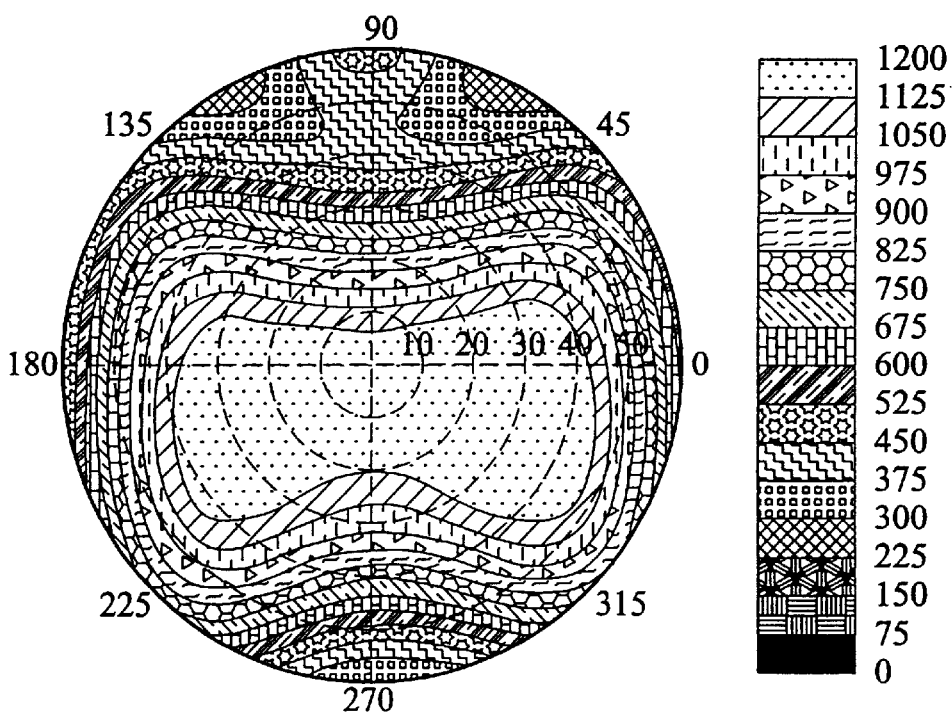
FIG. 26 illustrates the white mode of FIG. 24.
Figure 27:
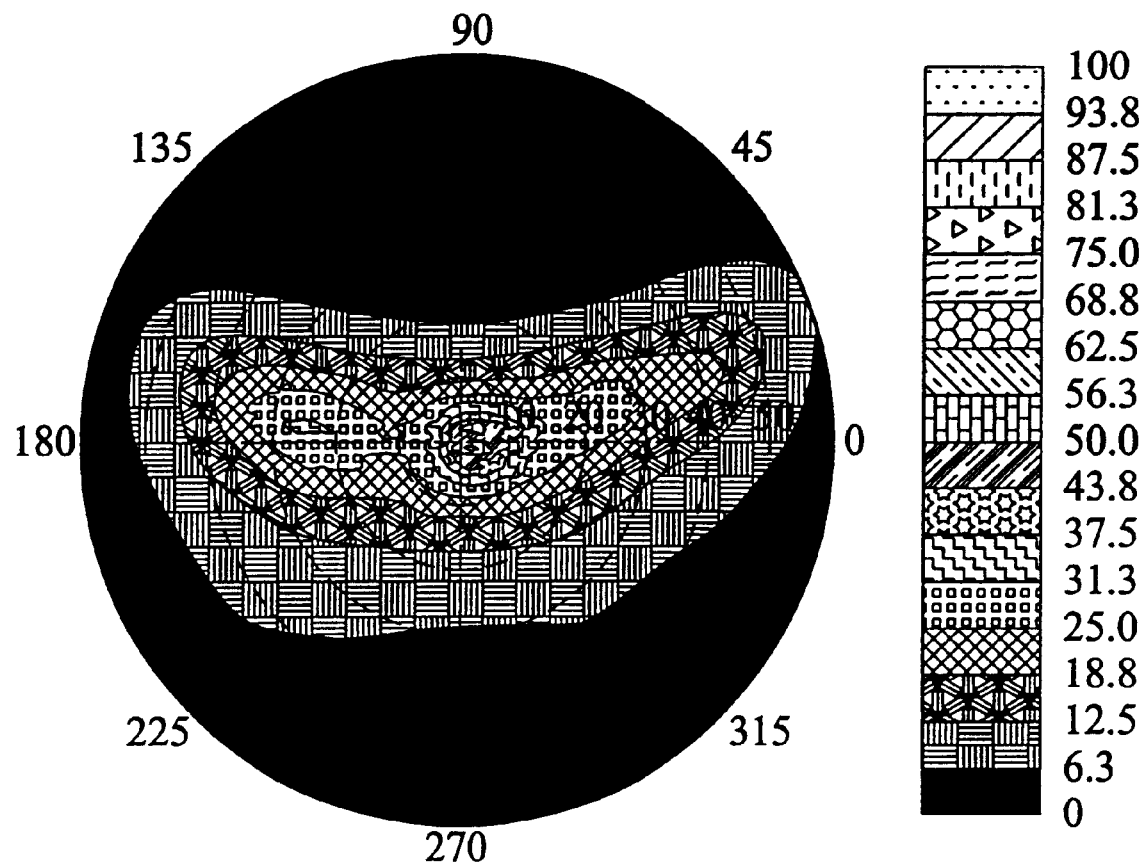
FIG. 27 illustrates the contrast ratio of FIG. 24.

Referring to FIGS. 25–27, it may be observed that the resulting black mode is relatively symmetric (FIG. 25), the resulting white mode is relatively symmetric (FIG. 26), and that the contrast (FIG. 27) is relatively symmetric for the device of FIG. 24 with a wider high contrast region than the configurations shown in FIGS. 12(a) and 20. The result is a slightly larger region having greater contrast. While an improvement, in several respects, over the embodiment shown FIGS. 12(a) and 20, a greater vertical high contrast region is desirable for many applications.

Figure 28:
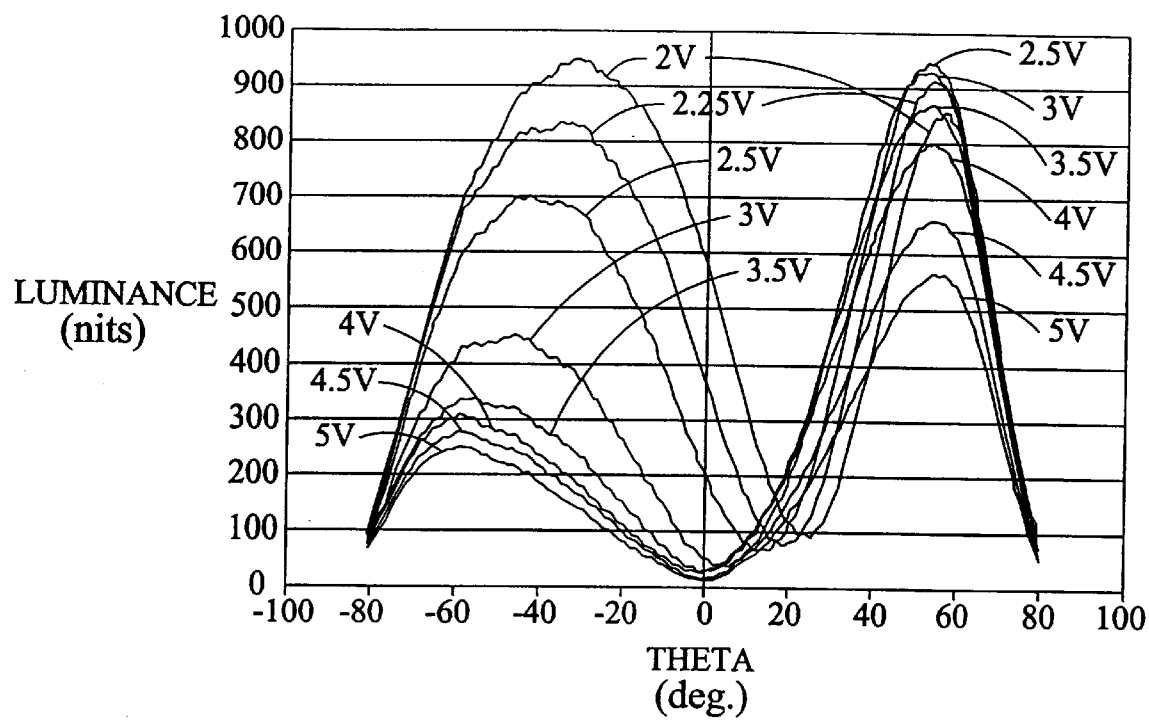
FIG. 28 illustrates the vertical grey level separation of FIG. 24.
Figure 29:
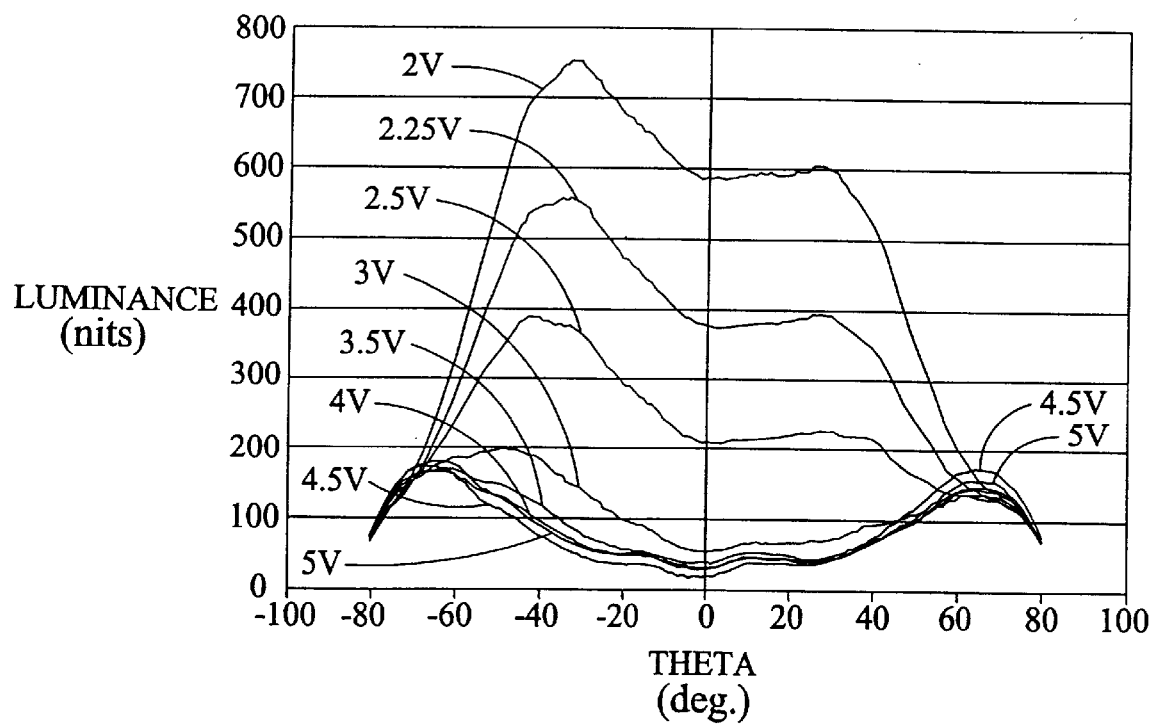
FIG. 29 illustrates the horizontal grey level separation of FIG. 24.

Referring to FIG. 28 is may be observed that the grey level separation of the embodiment shown in FIG. 24 is adequate for vertical angles between −70 degrees to +10 degrees. In addition, referring to FIG. 29 the grey level separation of the embodiment shown in FIG. 24 to the inventor's surprise does not undergo any significant horizontal inversion between −70 and +10 degrees nor vertical inversion between −60 and +60 degrees, which is especially important for some applications. In addition, the horizontal grey level separation, as shown in FIG. 29, is good from about −50 degrees to +50 degrees.

Figure 30:
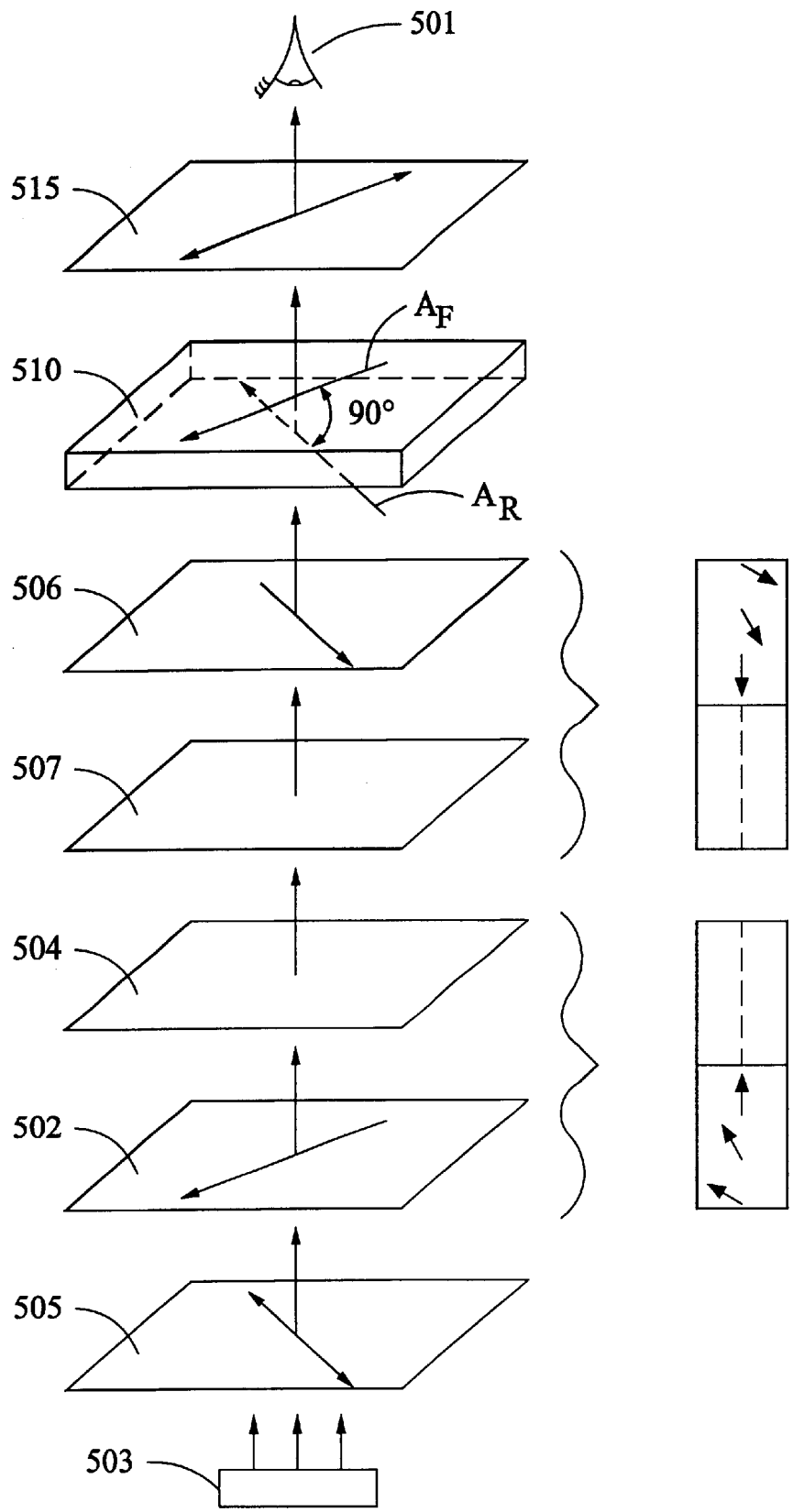
FIG. 30 is an exploded schematic view of yet another exemplary embodiment of the optical components and their respective azimuthal orientation of a liquid crystal display device having non-uniform films.

The present inventor considered the configuration shown in FIGS. 12(a), 20, and 24 and desired to increase the vertical high contrast region. After further development, the present inventor was further surprised to determine that the configuration shown in FIG. 30 provides such an increased vertical contrast region. FIG. 30 is an exploded schematic view of the optical components of a LCD device that includes from the rear forward toward viewer 501, conventional backlight 503, rear or light-entrance linear polarizer 505, first rear tilted negative retarder 502, first rear negative retarder 504 (which may be either uniaxial or biaxial, including indices of refraction $n_x$, $n_y$, and $n_z$), second rear negative retarder 507 which may be uniaxial or biaxial, second rear tilted negative retarder 506, rear tilt sense or direction $A_R$ which shows the tilt sense of the liquid crystal molecules adjacent the rear LC orientation layer, twisted nematic (TN) liquid crystal (LC) layer 510, front tilt sense or direction $A_F$ which shows the tilt sense of the LC molecules of layer 510 adjacent the front LC orientation film, and a front or light-exit linear polarizer (analyzer) 515. The LCD or LV of FIG. 30 is viewed by the viewer 501. It is noted that the orientation of the polarization of the tilted negative retarders 502 and 506 are perpendicular to each other and tilted negative retarder 506 is opposite to the tilt sense $A_R$ of the LC layer 510. In addition, the polarizers 505 and 515 are preferably parallel to the respective tilt sense $A_R$ and $A_F$ of the LC layer 510. It is noted that Din any of the embodiments, the retarders may be on the front and/or the rear of the LC layer.

Figure 31:
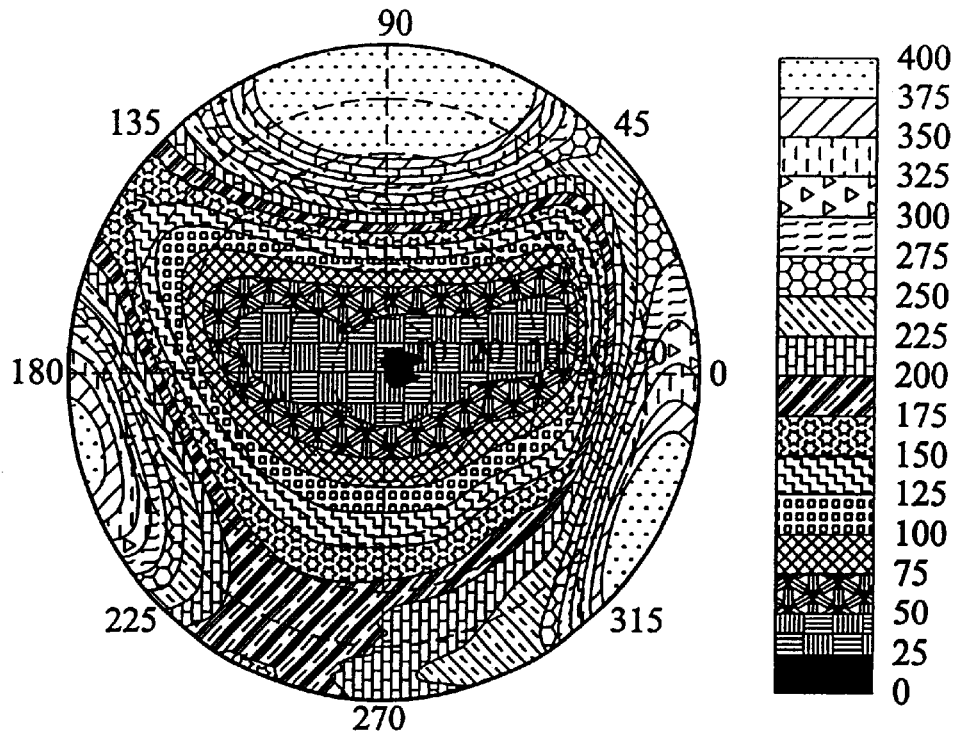
FIG. 31 illustrates the black mode of FIG. 30.
Figure 32:
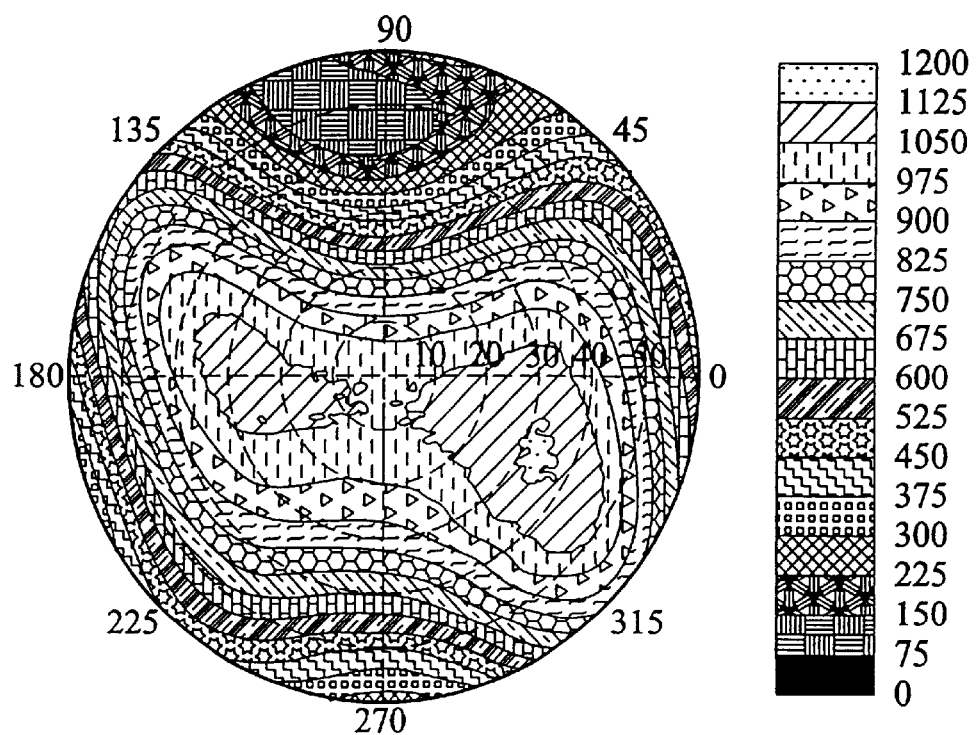
FIG. 32 illustrates the white mode of FIG. 30.
Figure 33:
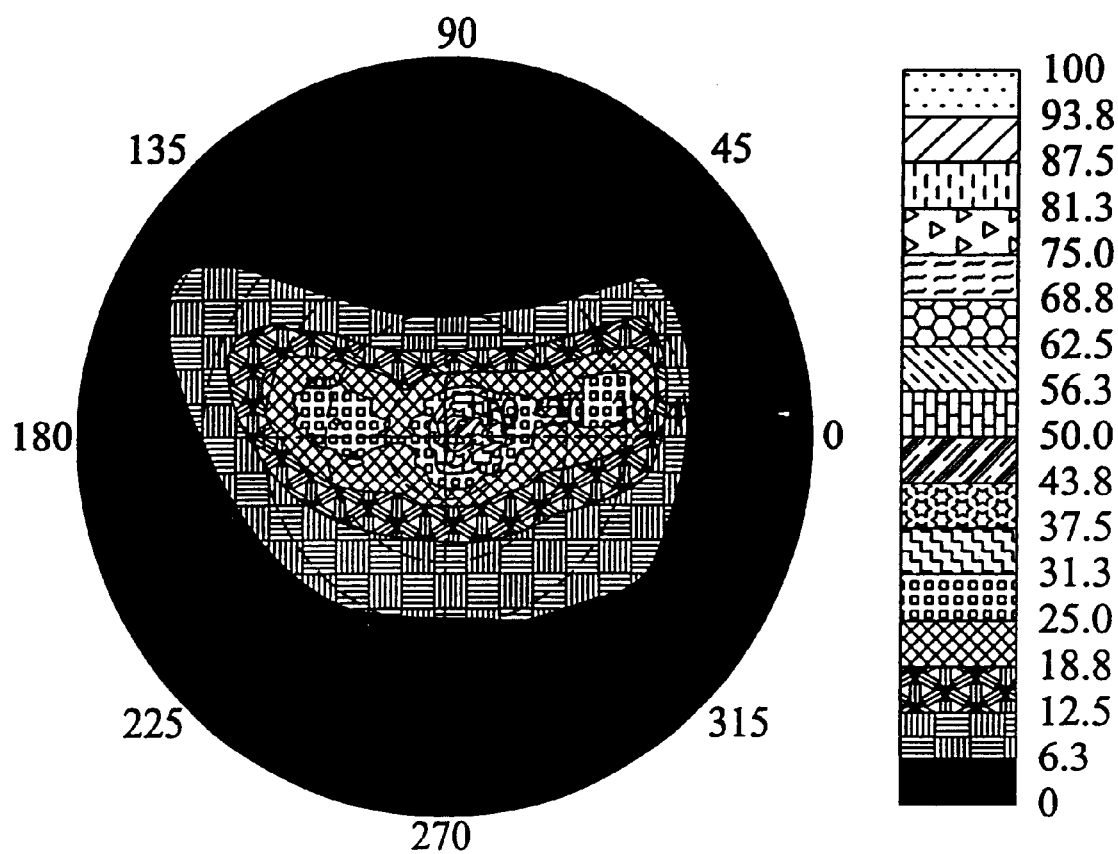
FIG. 33 illustrates the contrast ratio of FIG. 30.

Referring to FIGS. 31–33, it may be observed that the resulting black mode is relatively symmetric (FIG. 31), the resulting white mode is relatively symmetric (FIG. 32), and that the contrast (FIG. 33) is relatively symmetric with a greater vertical contrast region than that shown in FIGS. 12(a), 20, and 24. The result is a slightly larger vertical region having greater contrast. Unfortunately, the width of the high horizontal contrast region is less than desirable for many applications.

The present inventor came to the realization that one of the important aspects of the improved performance is that the optical axis of one of the tilted retarders is anti-parallel (or substantially anti-parallel) to the rear tilt direction AR. The remaining optical axis may be selected, as desired. The optical axis of the other retarder is preferably parallel to the front tilted direction $A_F$ (but may be anti-parallel or perpendicular if desired). In addition, the retarder closer to the rear of the LC material is preferably anti-parallel to the tilt direction $A_R$, but need not necessarily be the case.

Figure 34:
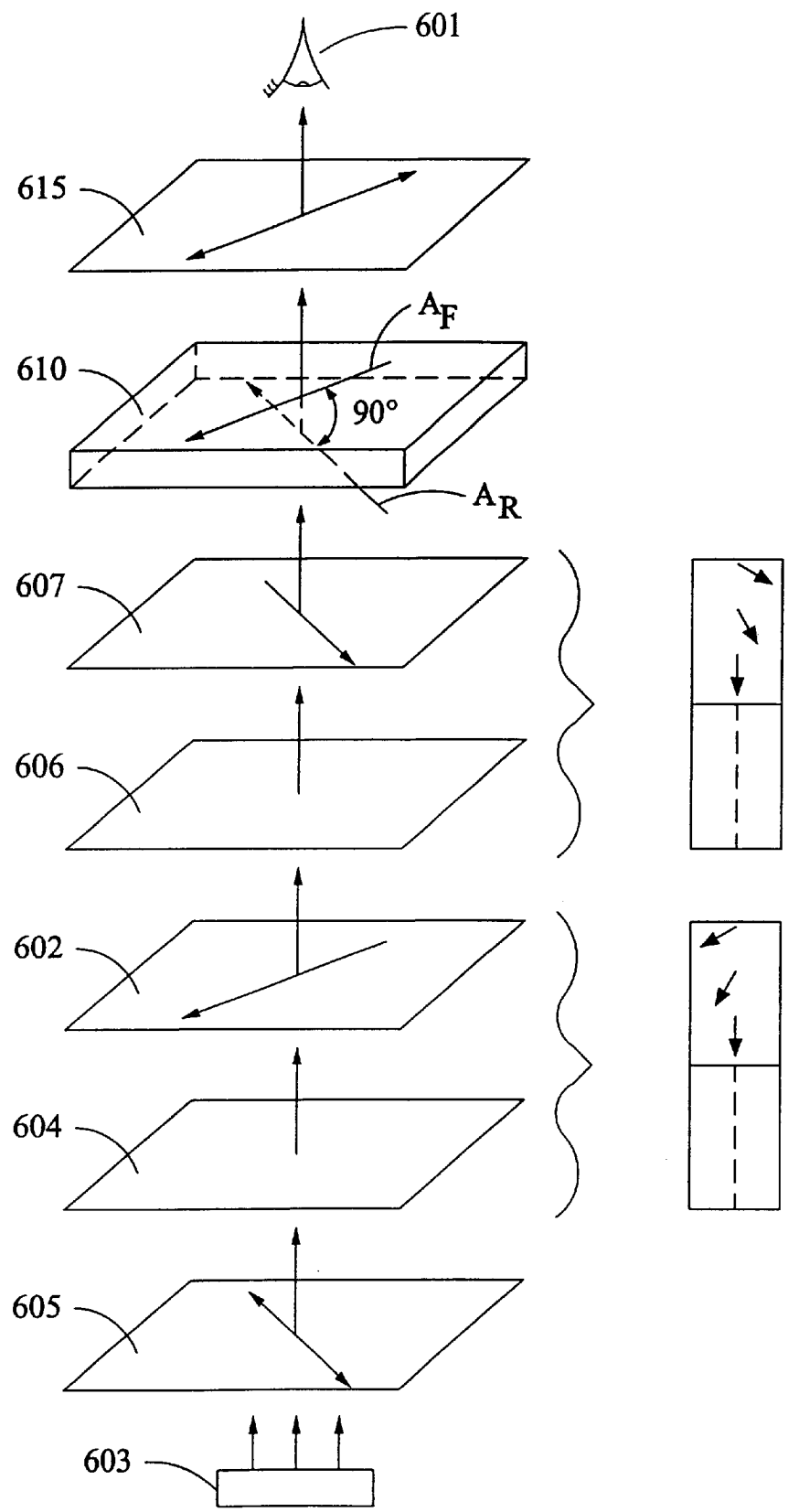
FIG. 34 is an exploded schematic view of still another exemplary embodiment of the optical components and their respective azimuthal orientation of a liquid crystal display device having non-uniform films.

The present inventor considered the configurations shown in FIGS. 12(a), 20, 24, and 30 and desired to further increase the vertical high contrast region. After further development, the present inventor was again surprised to determine that the configuration shown in FIG. 34 provides such an increased vertical contrast region. FIG. 34 is an exploded schematic view of the optical components of a LCD device that includes from the rear forward toward viewer 601, conventional backlight 603, rear or light-entrance linear polarizer 605, first rear negative retarder 604 (which may be either uniaxial or biaxial, including indices of refraction $n_x$, $n_y$, and $n_z$), first rear tilted negative retarder 602, second rear negative retarder 606 which may be uniaxial or biaxial, second rear tilted negative retarder 607, rear tilt sense or direction $A_R$ which shows the tilt sense of the liquid crystal molecules adjacent the rear LC orientation layer, twisted nematic (TN) liquid crystal (LC) layer 610, front tilt sense or direction $A_F$ which shows the tilt sense of the LC molecules of layer 610 adjacent the front LC orientation film, and a front or light-exit linear polarizer (analyzer) 615. The LCD or LV of FIG. 34 is viewed by the viewer 601. It is noted that the orientation of the polarization of the tilted negative retarders 602 and 606 are perpendicular to each other and tilted negative retarder 606 is opposite to the tilt sense $A_R$ of the LC layer 610. In addition, the polarizers 605 and 615 are preferably parallel to the respective tilt sense $A_R$ and $A_F$ of the LC layer 610.

Figure 35:
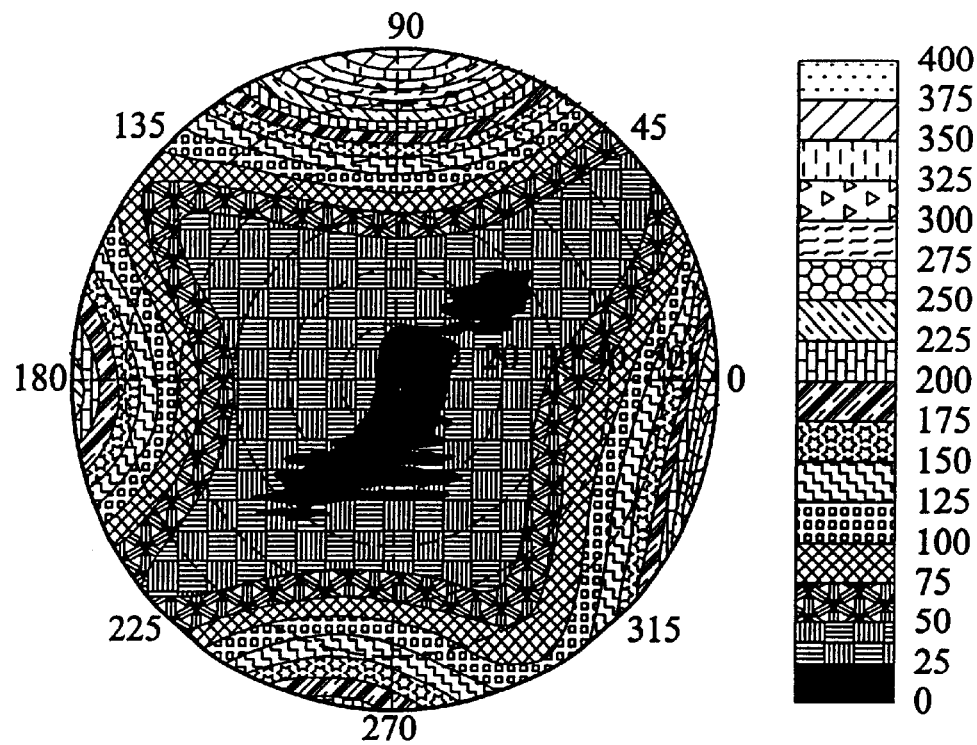
FIG. 35 illustrates the black mode of FIG. 34.
Figure 36:
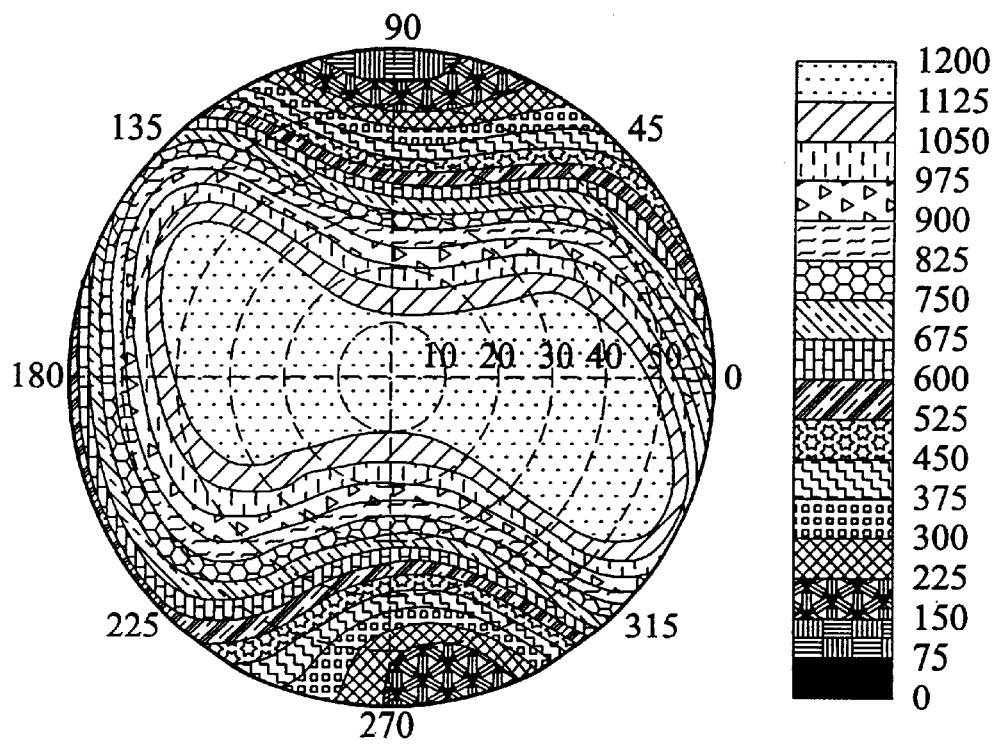
FIG. 36 illustrates the white mode of FIG. 34.
Figure 37:
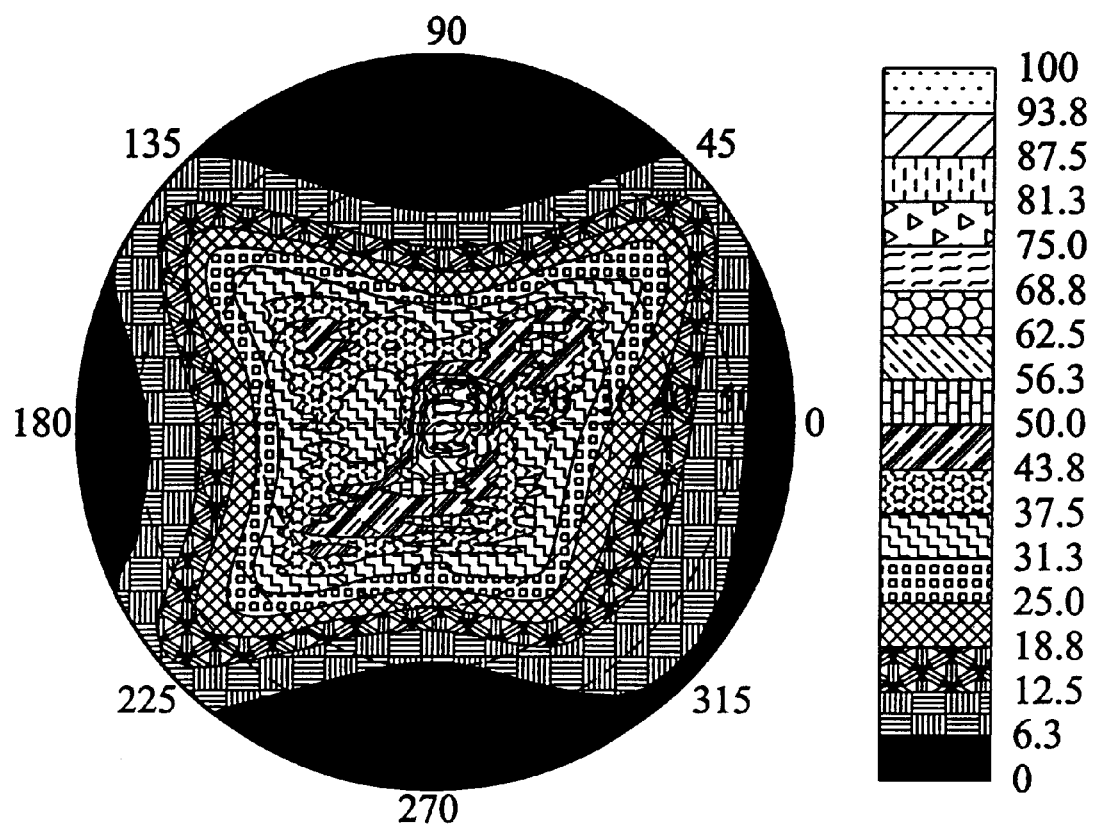
FIG. 37 illustrates the contrast ratio of FIG. 34.

Referring to FIGS. 35–37, it may be observed that the resulting black mode is relatively symmetric (FIG. 35), the resulting white mode is relatively symmetric (FIG. 36), and that the contrast (FIG. 37) is relatively symmetric with a greater vertical contrast region than that shown in FIGS. 12(a), 20, 24, and 30. The result is a slightly larger vertical region having greater contrast. In addition, with the removal of the front retarders the reflectivity characteristics of the display are improved which is important for some applications, such as avionics.

Figure 38:
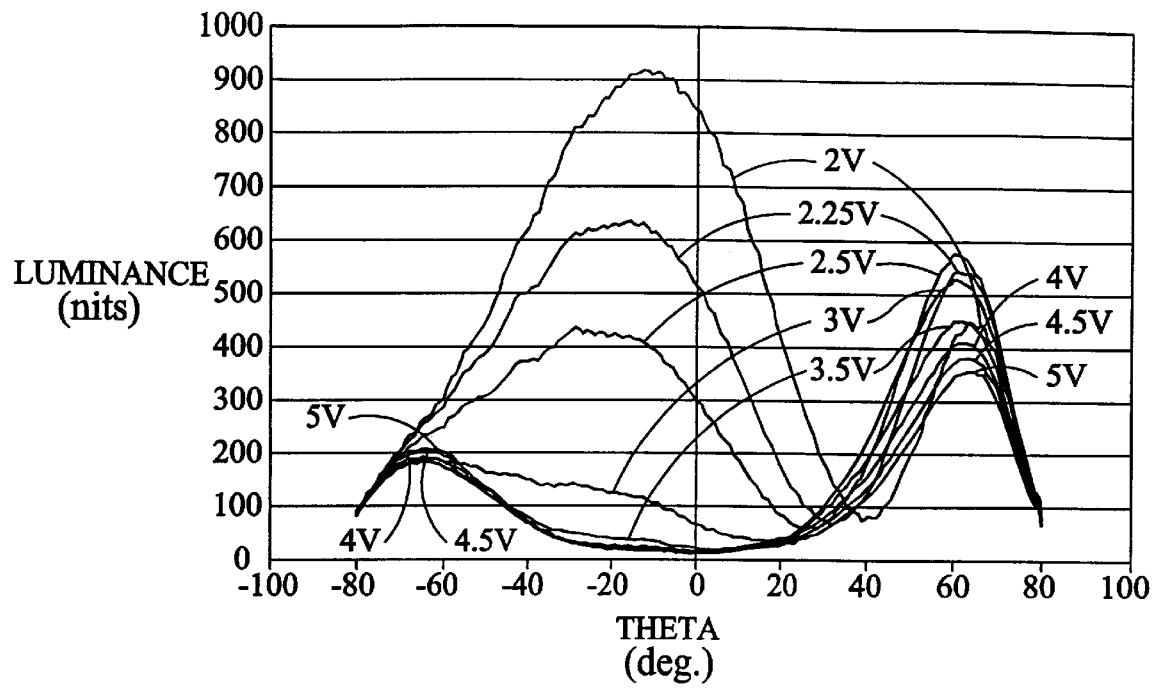
FIG. 38 illustrates the vertical grey level separation of FIG. 34.

Referring to FIG. 38 is may be observed that the grey level separation of the embodiment shown in FIG. 34 is good for vertical angles between −40 degrees to +20 degrees.

Figure 39:
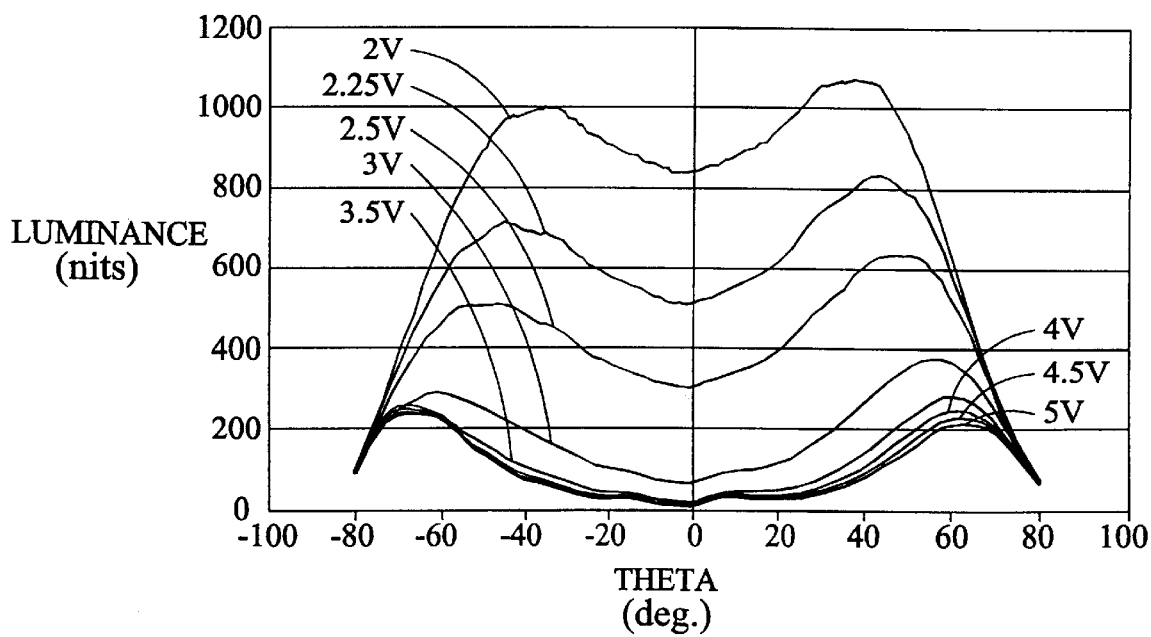
FIG. 39 illustrates the horizontal grey level separation of FIG. 34.
Figure 40:
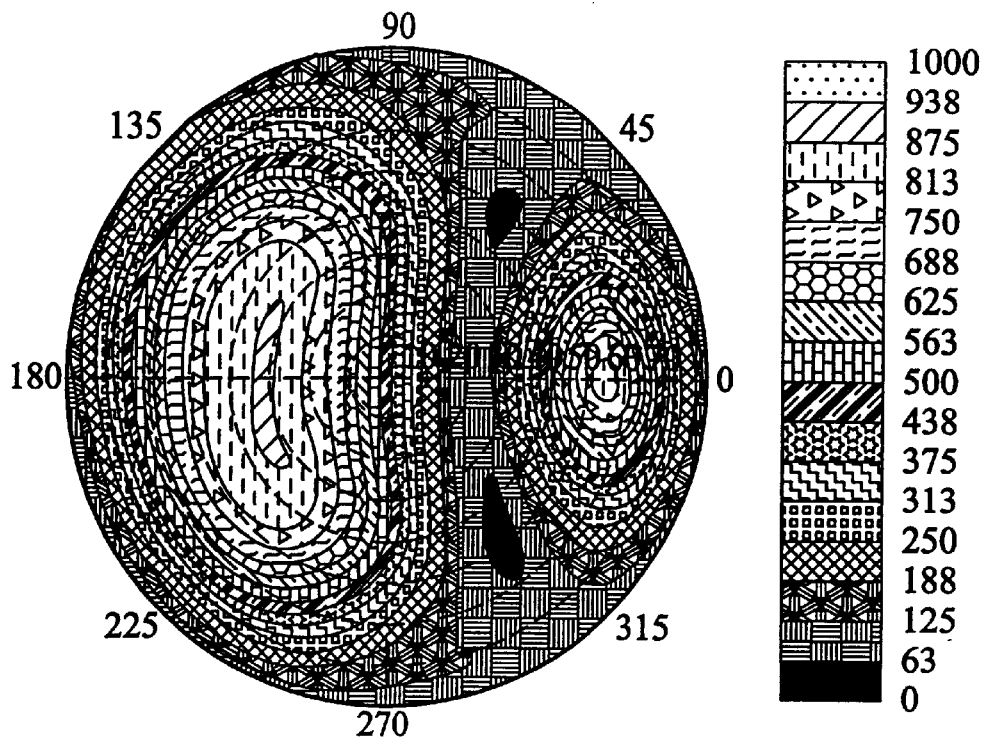
FIGS. 40–47 illustrate the black mode of the device shown in FIG. 24 at different voltages.
Figure 41:
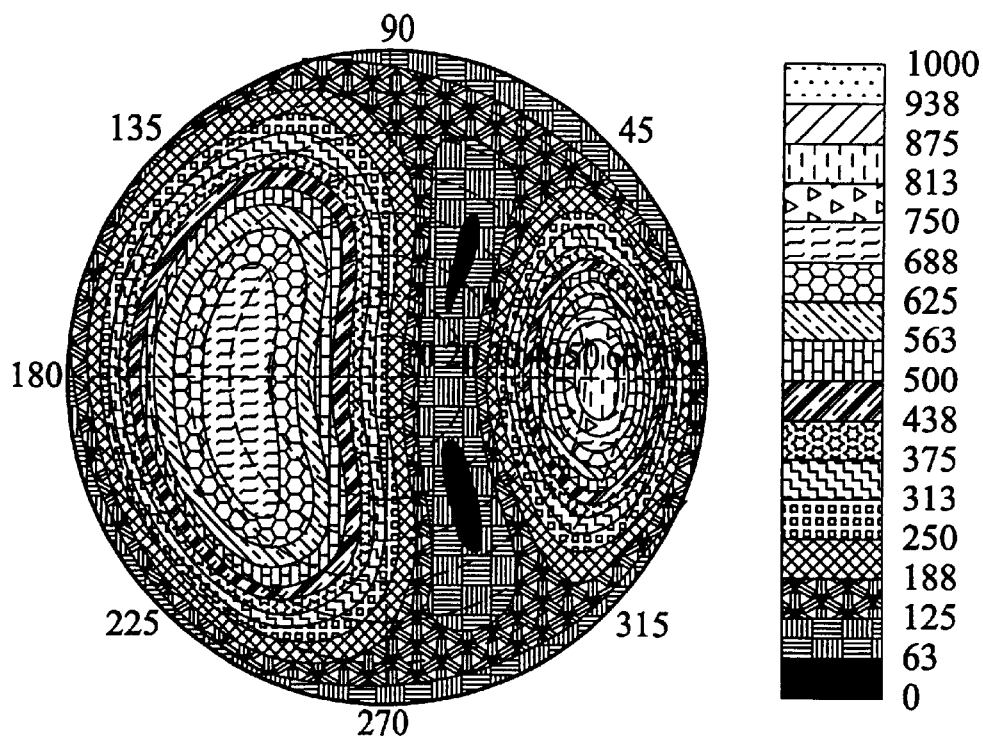
Figure 42:
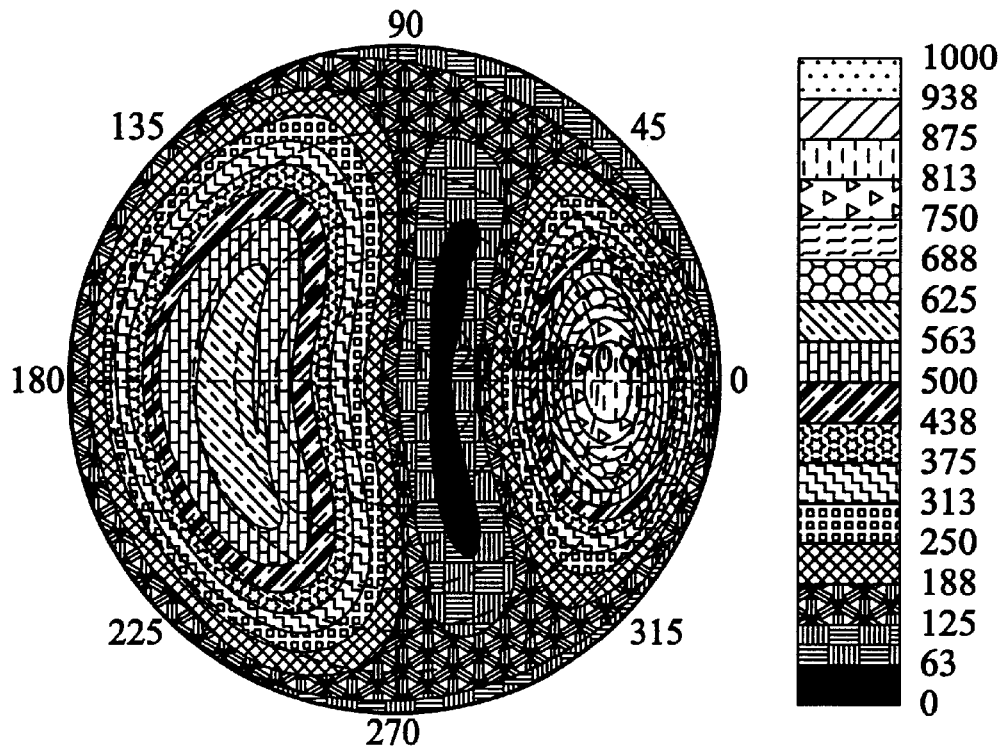
Figure 43:
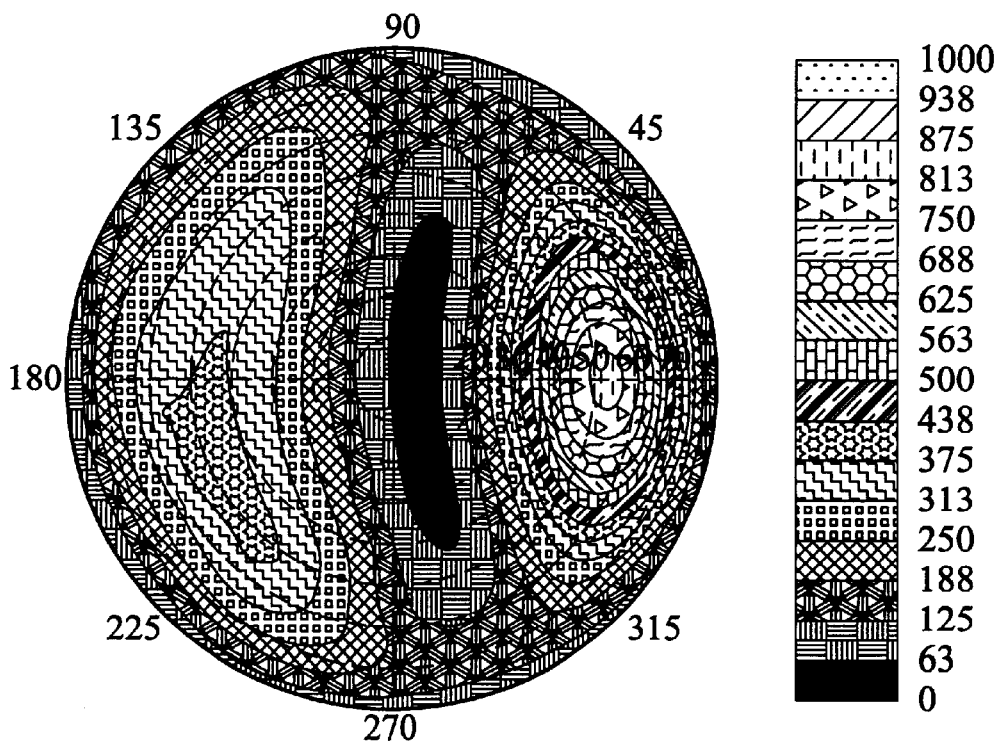
Figure 44:
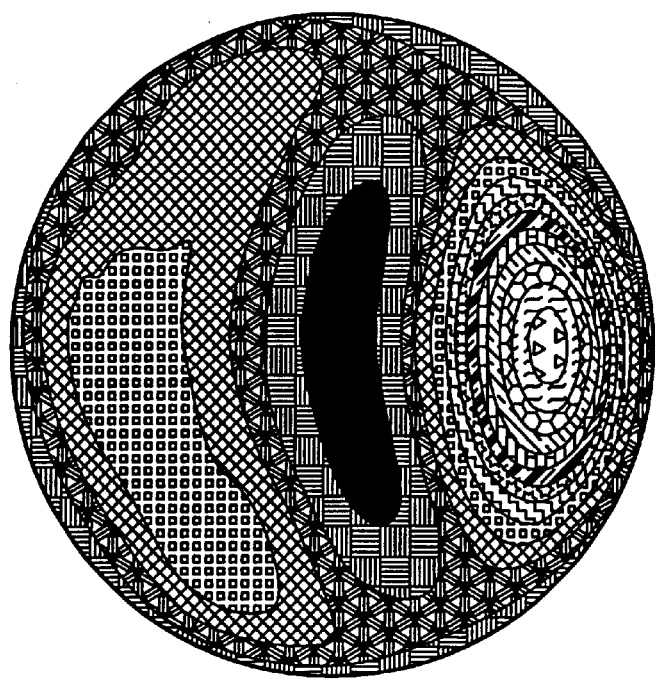
Figure 45:
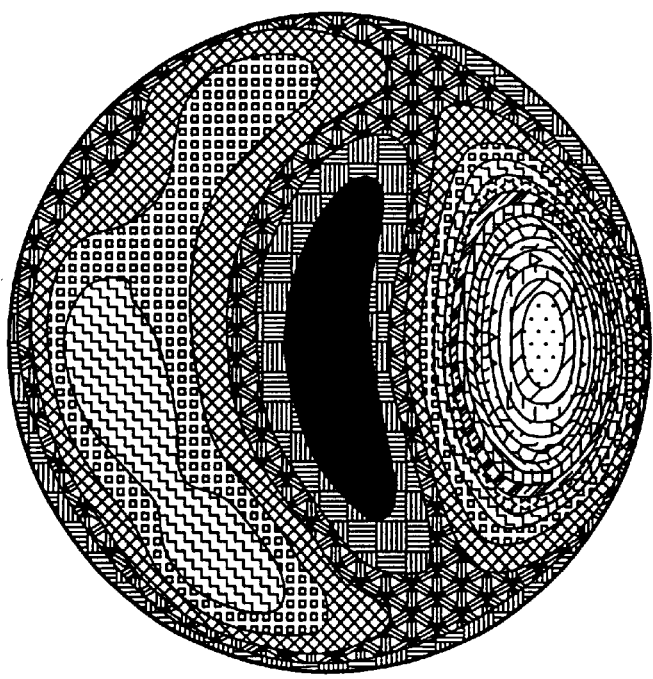
Figure 46:
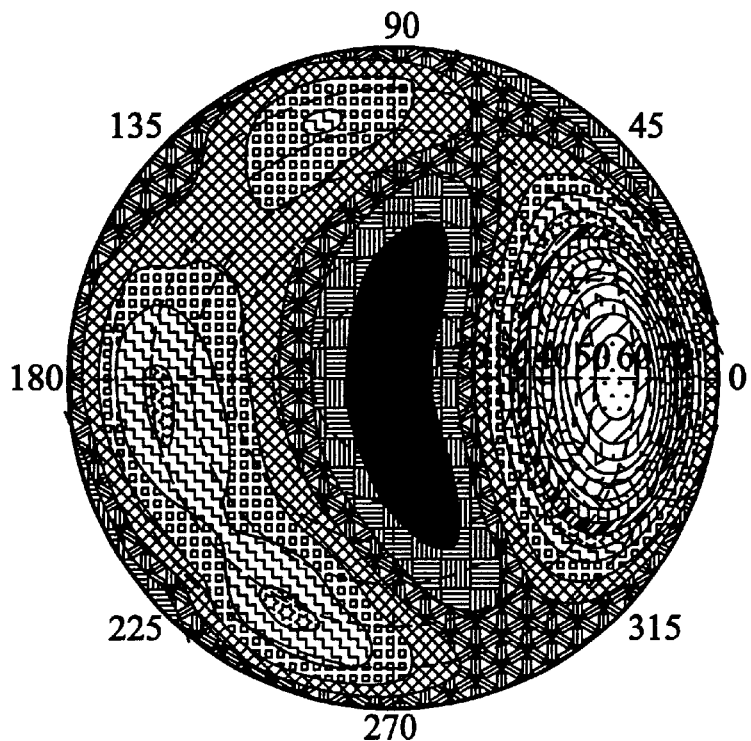
Figure 46:
Figure 47:
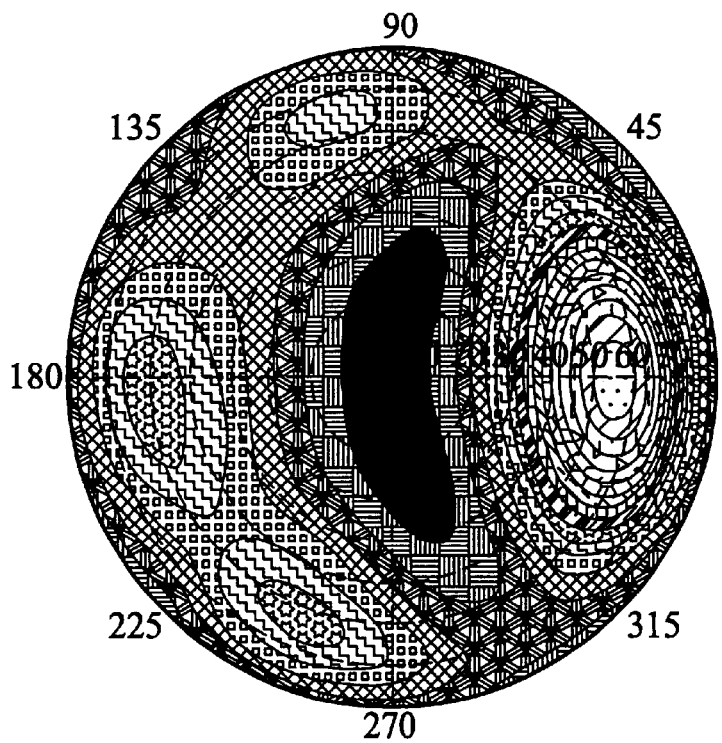
Figure 47:
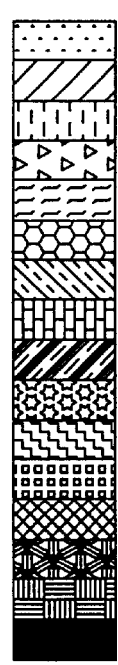
Figure 48:
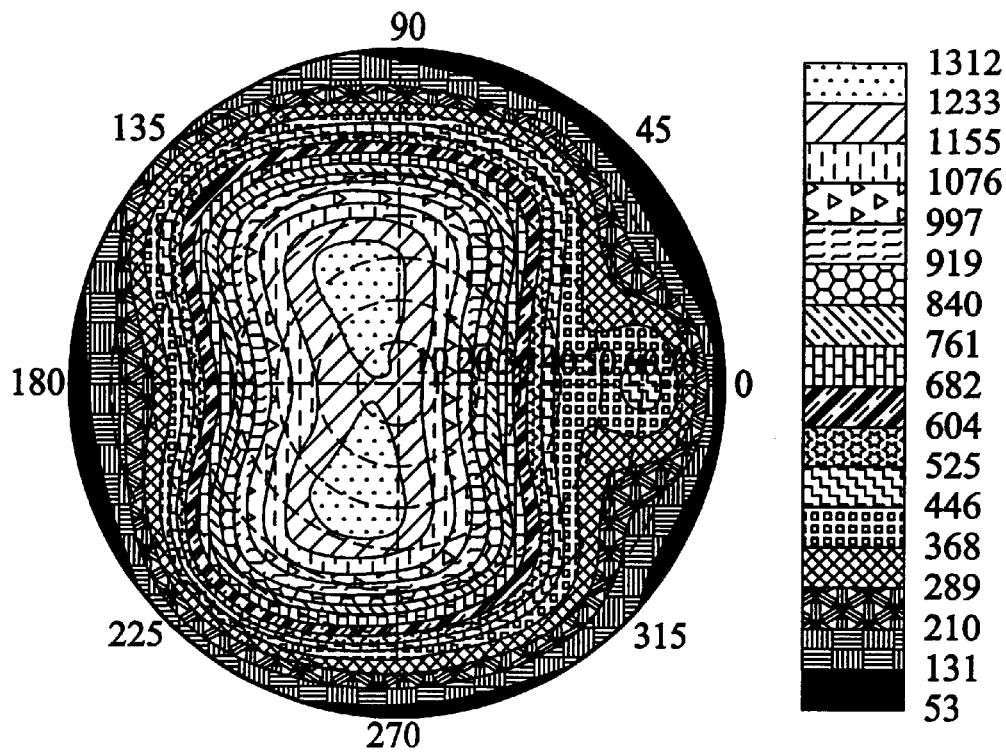
FIGS. 48–55 illustrate the white mode of the device shown in FIG. 24 at different voltages.
Figure 49:
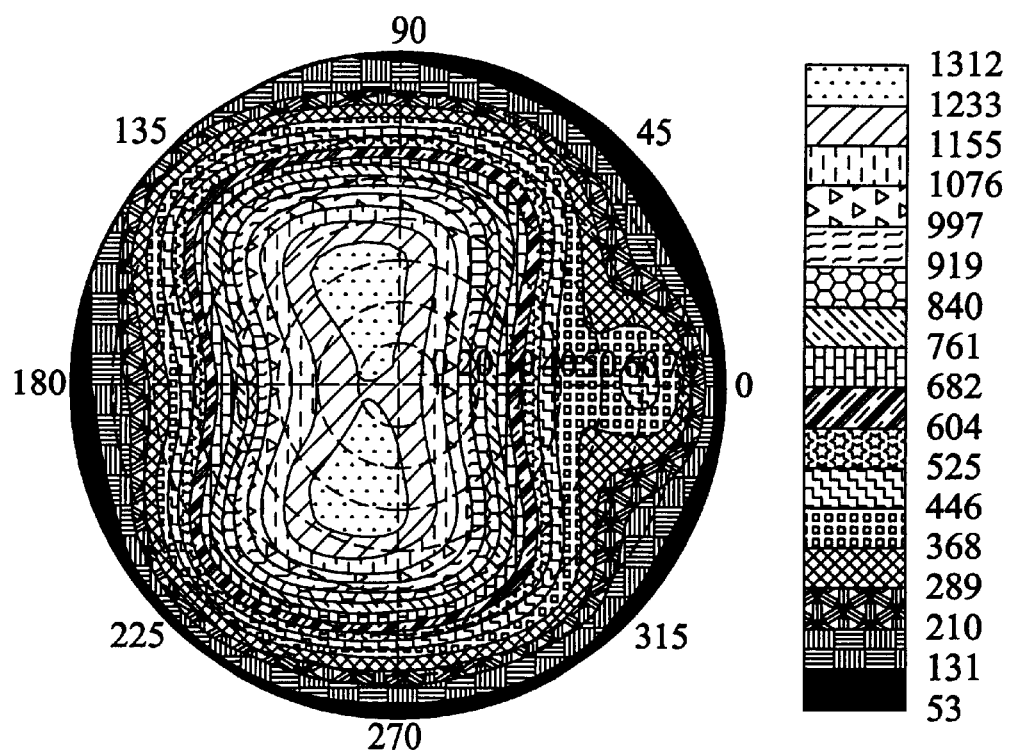
Figure 50:
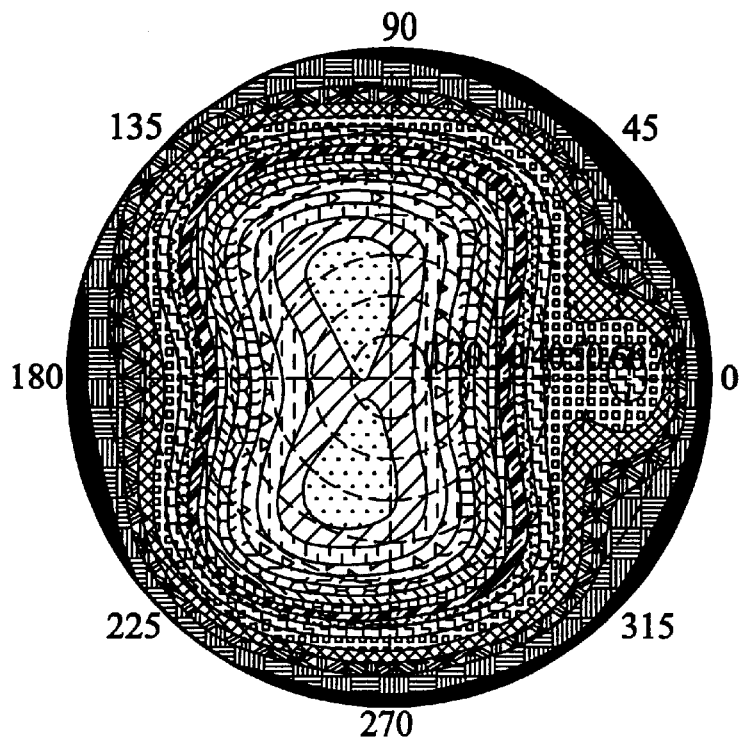
Figure 51:
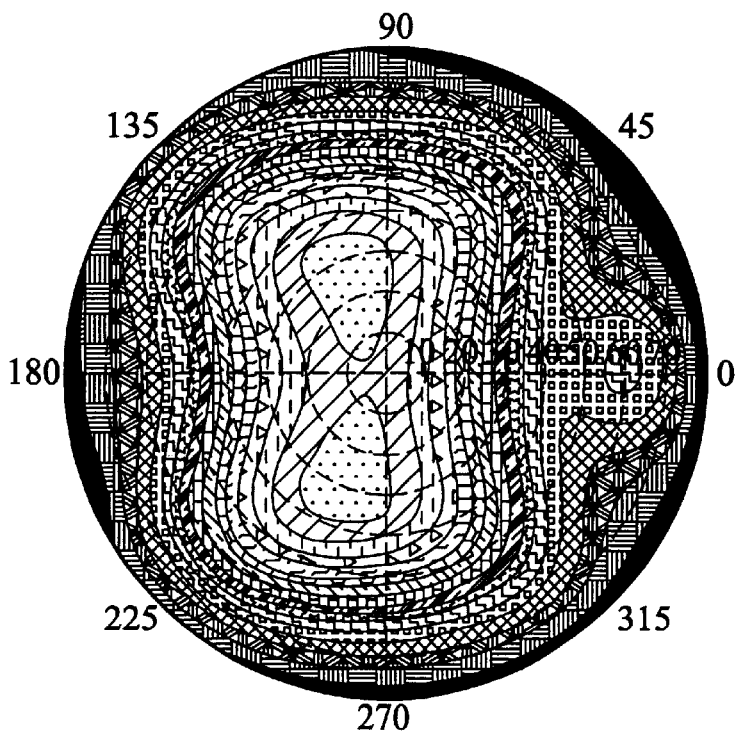
Figure 52:
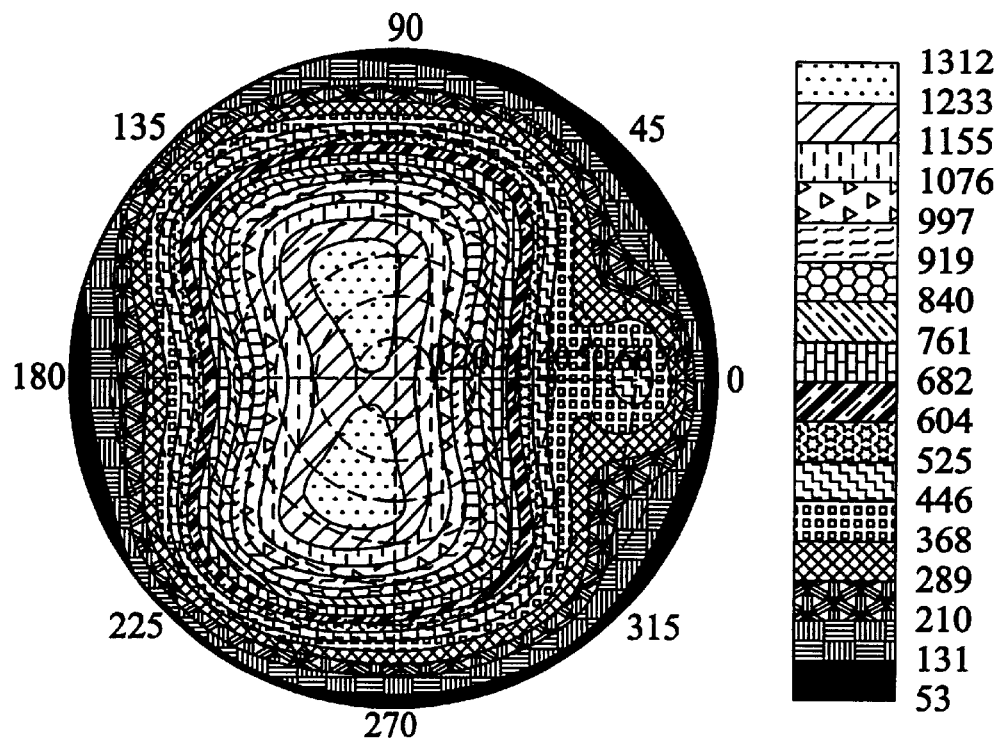
Figure 53:
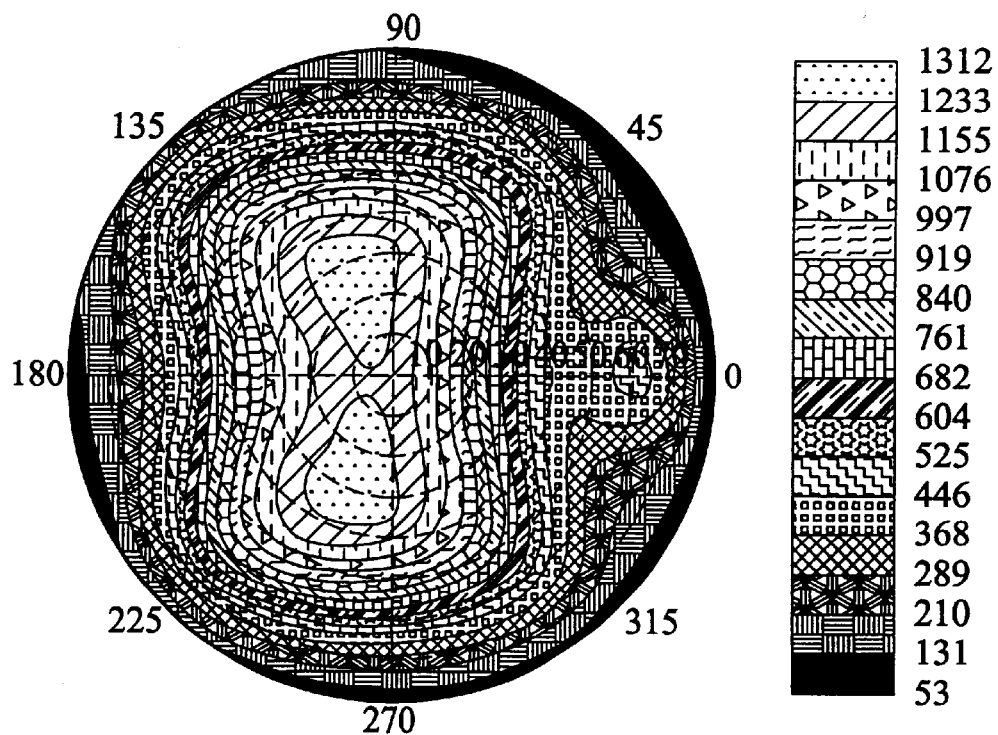
Figure 54:
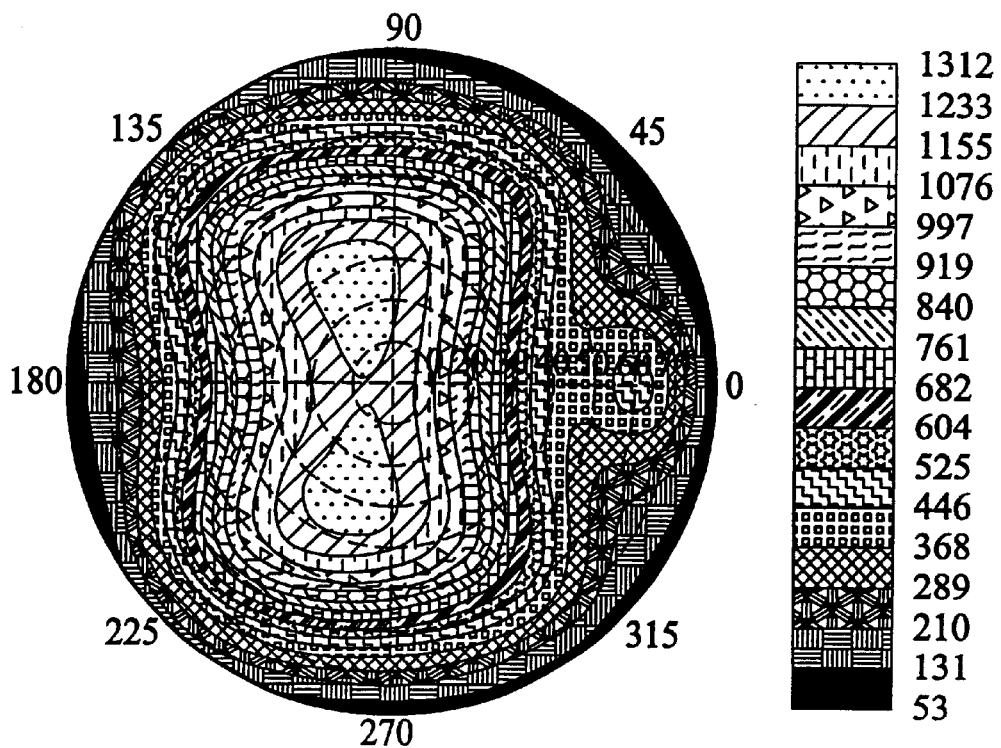
Figure 55:
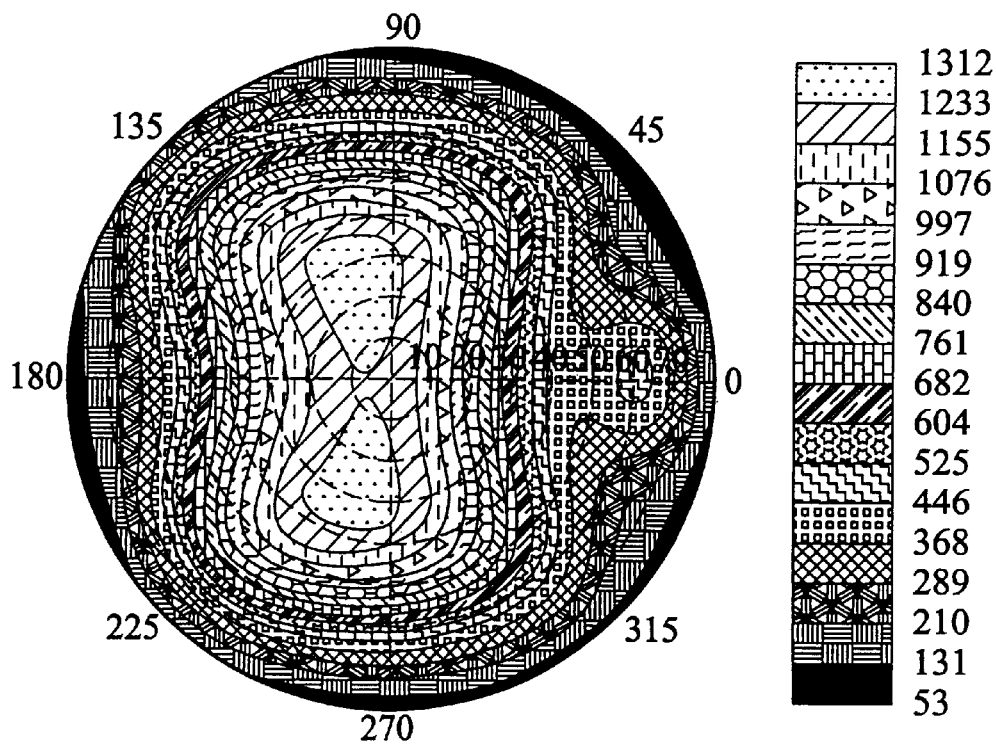
Figure 56:
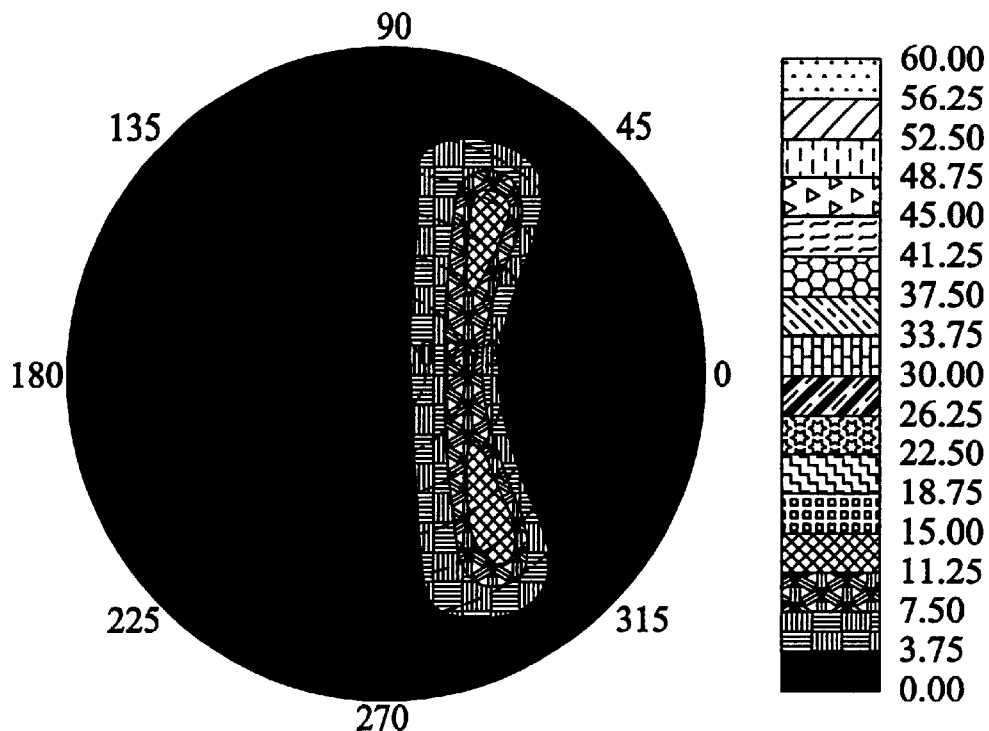
FIGS. 56–63 illustrate the contrast ratio of the device shown in FIG. 24 at different voltages.
Figure 57:
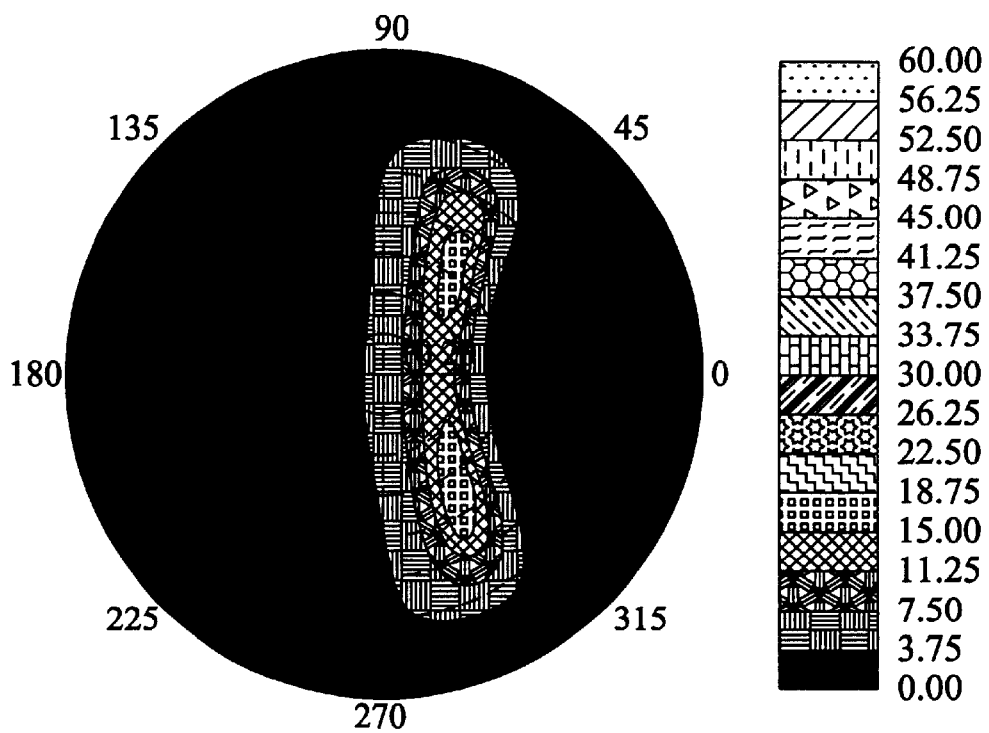
Figure 58:
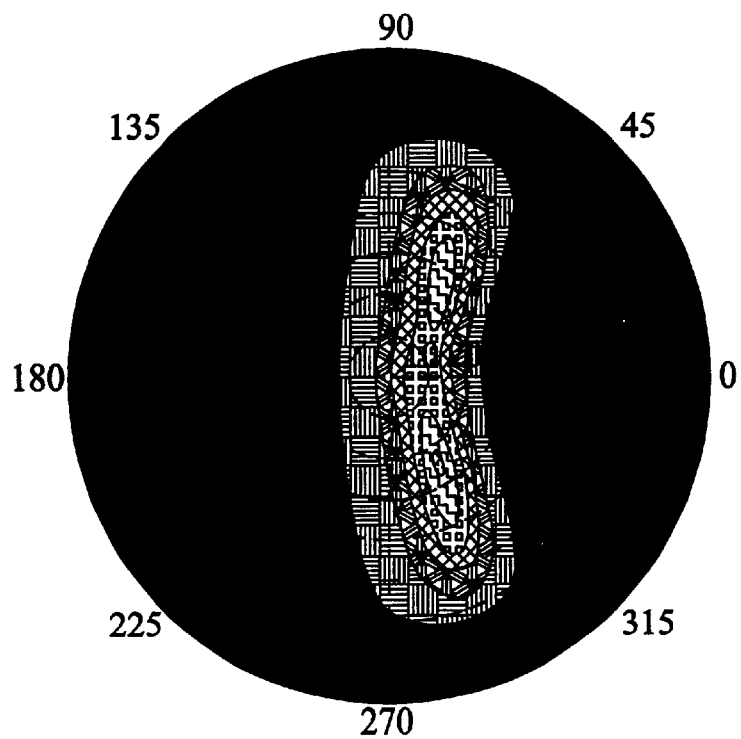
Figure 58:
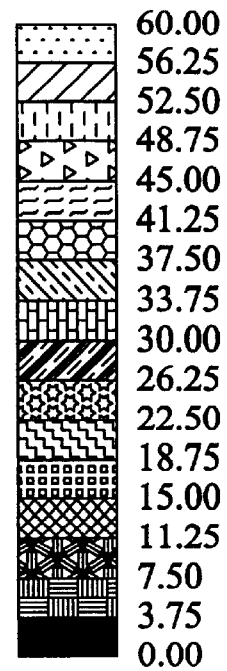
Figure 59:
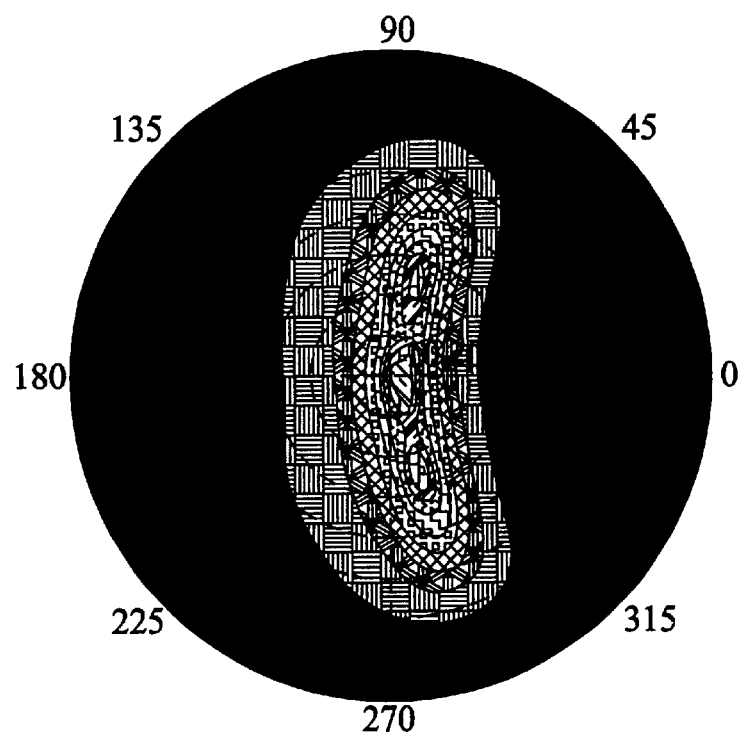
Figure 59:
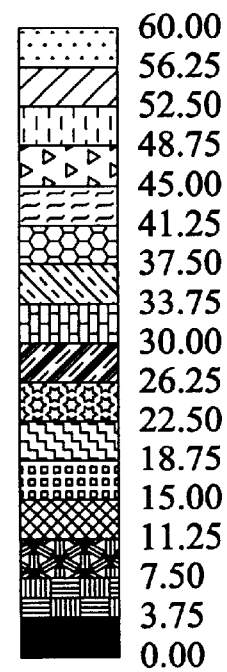
Figure 60:
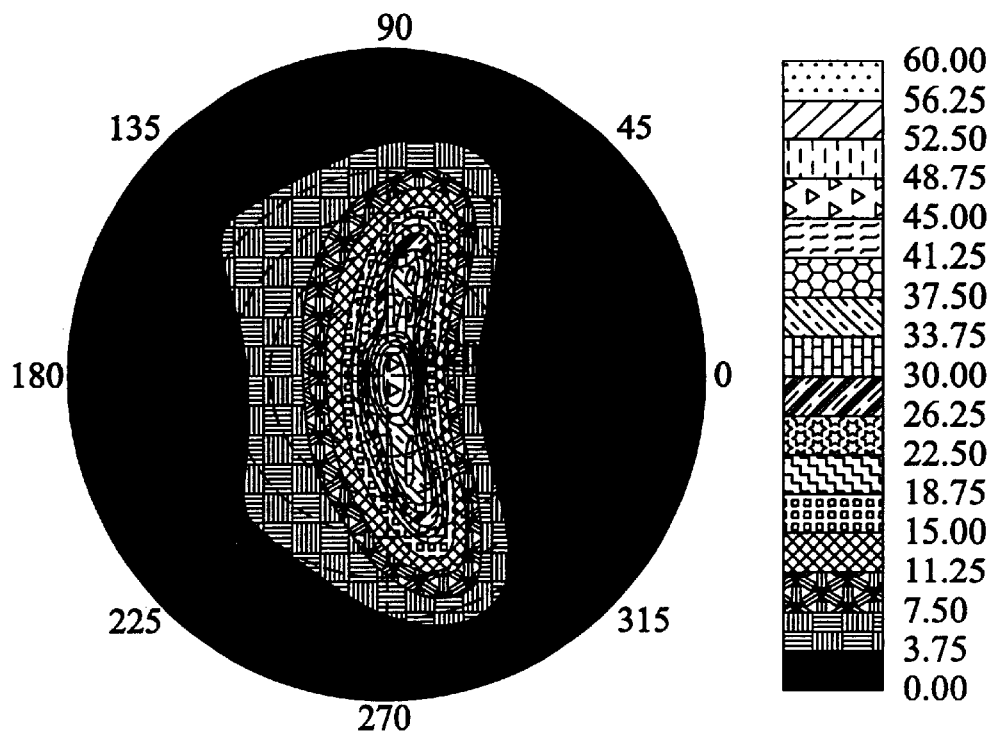
Figure 61:
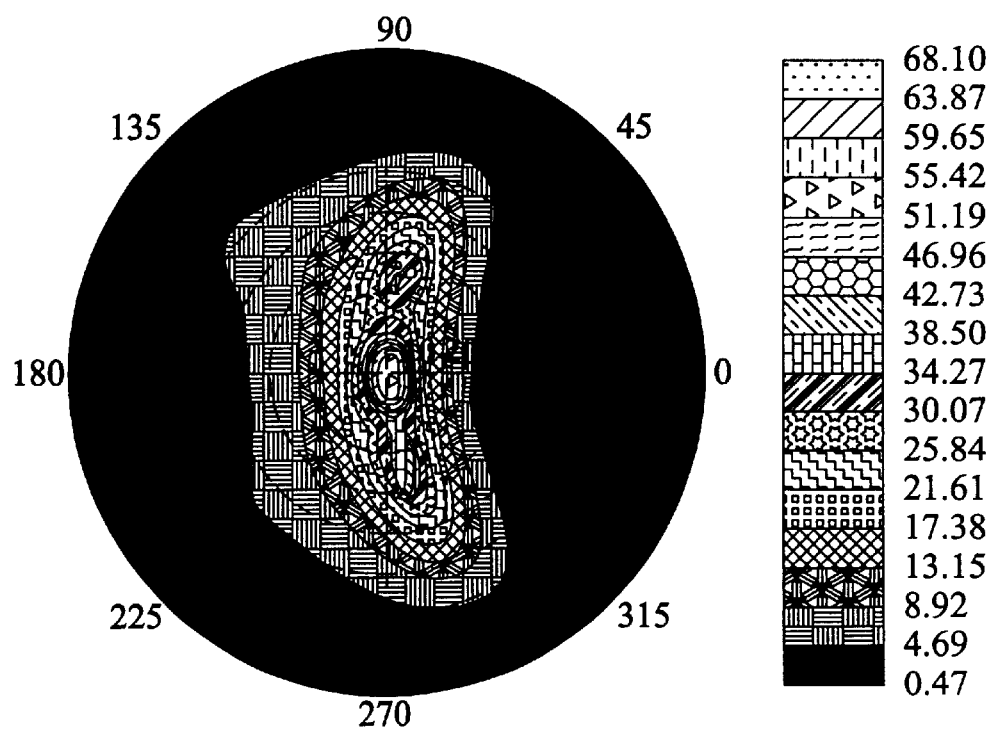
Figure 62:
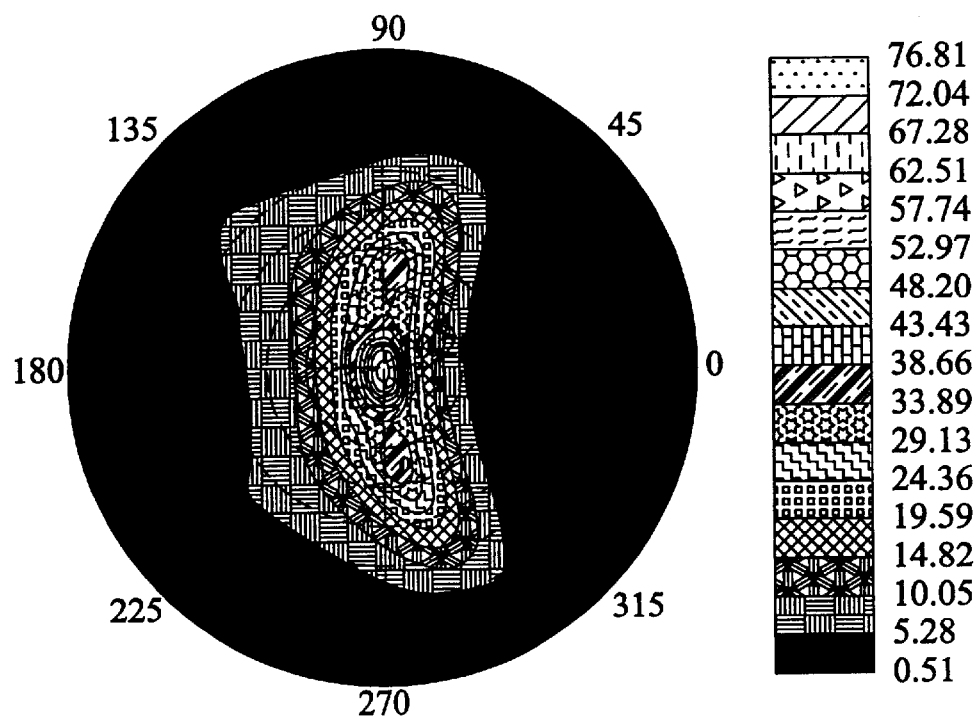
Figure 63:
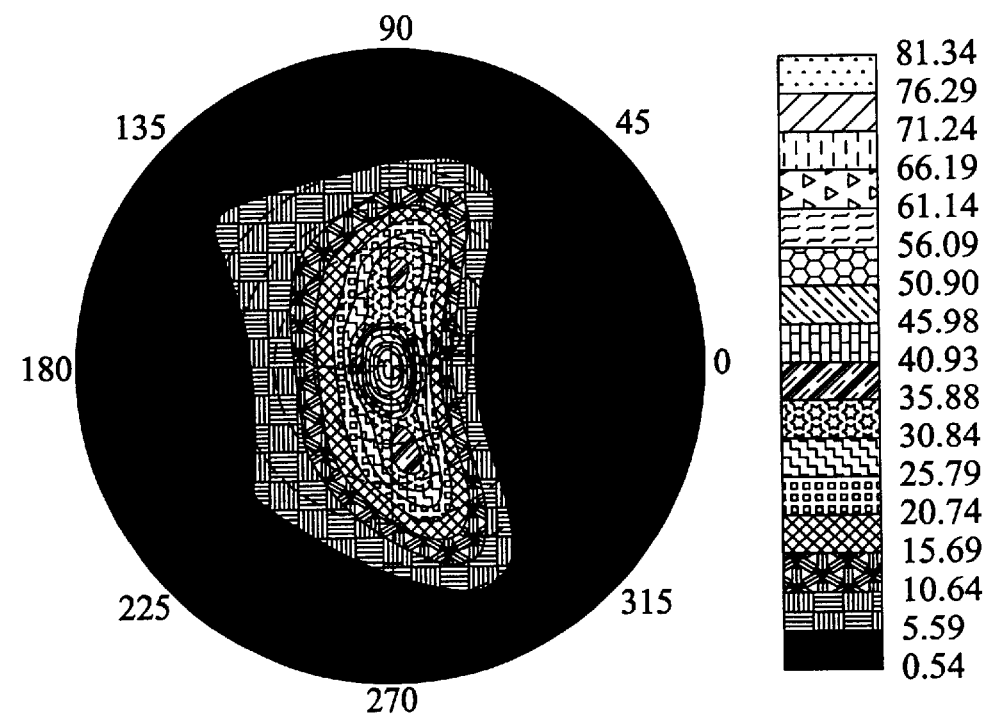

In addition, referring to FIG. 39 the grey level separation of the embodiment shown in FIG. 34 to the inventor's surprise does not undergo any significant horizontal inversion, which is especially important for some applications. In addition, the horizontal grey level separation, as shown in FIG. 39, is good from about −60 degrees to +60 degrees, while simultaneously maintaining good contrast.

Referring again to FIG. 24, the grey level separation for this configuration at different voltages is exceptionally good with no severe inversions. To illustrate the performance, FIGS. 40–47 show the black mode at different voltages (e.g. 2.0 volts to 5.0 volts). More particularly, the central region of each figure illustrating black mode shows that the middle island shrinks gradually so one would expect no severe grey level inversions. FIGS. 48–55 show the white mode at different voltages (e.g. 2.0 volts to 5.0 volts). More particularly, the central region of each figure illustrating the white mode shows that the central region is substantially constant, so one would expect no severe grey level inversions. FIGS. 56–63 show the contrast at different voltages (e.g. 2.0 volts to 5.0 volts), showing that the contrast is shrinking gradually for the different driving voltages, which, in combination with no (or little) inversion is important for avionic applications.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A normally white twisted nematic liquid crystal display (LCD) comprising:
   (a) a liquid crystal layer for twisting at least one normally incident wavelength of visible light when in the off-state;
   (b) first and second orientation layers sandwiching said liquid crystal layer therebetween, said first orientation layer causing a first liquid crystal tilt sense direction $A_{First}$ and said second orientation layer causing a second liquid crystal tilt sense direction $A_{Second}$ different than said direction $A_{First}$;
   (c) second and first tilted retardation layers located on opposite sides of said liquid crystal layer;
   (d) each of said second and first tilted retardation layers having an optical axis defining at least one azimuthal angle $\phi$, and at least one tilt angle $\theta$, where at least said tilt angle $\theta$ varies through the thickness of the layer;
   (e) said azimuthal angle aspect $\phi$ of an optical axis of said second tilted retardation layer is oriented substantially anti-parallel relative to said second tilt sense direction $A_{Second}$ of liquid crystal molecules proximate said second orientation layer, and said azimuthal angle aspect $\phi$ of an optical axis of said first tilted retardation layer is oriented substantially parallel relative to said first tilt sense direction $A_{First}$ liquid crystal molecules proximate said first orientation layer; and
   (f) at least one of said second and first tilted retardation layers includes a tilt angle $\theta$ which is substantially greater on the side of the tilted retardation layer closest to said liquid crystal layer than on the side furthest from said liquid crystal layer.

2. The LCD of claim 1 further comprising second and first polarizing elements, each of which has an optical axis, located on opposite sides of said liquid crystal layer, and said optical axes of said second and first polarizing elements being substantially perpendicular to one another.

3. The LCD of claim 2 wherein said optical axis of said second polarizing element being aligned in a substantially perpendicular orientation to said second tilt sense direction $A_{Second}$.

4. The LCD of claim 1 wherein both of said second and first tilted retardation layers includes said tilt angle $\theta$ which is substantially greater on the side of the tilted retardation layer closest to said liquid crystal layer than on the side furthest from said liquid crystal layer.

5. The LCD of claim 4 further comprising second and first polarizing elements, each of which has an optical axis, located on opposite sides of said liquid crystal layer, and said optical axes of said second and first polarizing elements being substantially perpendicular to one another.

6. The LCD of claim 5 wherein said optical axis of said second polarizing element being aligned in a substantially perpendicular orientation to said second tilt sense direction $A_{Second}$.

7. The LCD of claim 1, further comprising first and second negative non-tilted retardation layers on opposite sides of said liquid crystal layer, each of said first and second negative non-tilted retardation layers being defined by one of: (i) $n_x > n_y > n_z$; and (ii) $n_x = n_y > n_z$.

8. The LCD of claim 7 wherein each of said negative non-tilted retardation layers has a retardation value $d \cdot (n_x - n_z)$ of from about −10 to −150 nm.

9. The LCD of claim 8, wherein each of said second and first tilted retardation layers has a negative birefringence and a retardation value $d \cdot (n_e - n_o)$ of from about −20 to −200 nm, and for each of said tilted retardation layers, $n_x$ and $n_y$ differ from one another by less than about 0.5%.

10. The LCD of claim 7 wherein at least one of said first and second negative non-tilted retardation layers is closer to said liquid crystal layer than a respective one of said first and second tilted retardation layers.

11. The LCD of claim 10 wherein both said first and second negative non-tilted retardation layers are further from said liquid crystal layer than said respective ones of said first and second tilted retardation layers.

12. The LCD of claim 11 wherein both of said second and first tilted retardation layers includes said tilt angle θ which is substantially greater on the side of the tilted retardation layer closest to said liquid crystal layer than on the side furthest from said liquid crystal layer.

13. The LCD of claim 12 further comprising second and first polarizing elements, each of which has an optical axis, located on opposite sides of said liquid crystal layer, and said optical axes of said second and first polarizing elements being substantially perpendicular to one another.

14. The LCD of claim 13 wherein said optical axis of said second polarizing element being aligned in a substantially perpendicular orientation to said second tilt sense direction $A_{Second}$.

15. A normally white twisted nematic liquid crystal display (LCD) comprising:
    (a) a liquid crystal layer for twisting at least one normally incident wavelength of visible light when in the off-state;
    (b) first and second orientation layers sandwiching said liquid crystal layer therebetween, said first orientation layer causing a first liquid crystal tilt sense direction $A_{First}$ and said second orientation layer causing a second liquid crystal tilt sense direction $A_{Second}$ different than said direction $A_{First}$;
    (c) second and first tilted retardation layers located on opposite sides of said liquid crystal layer;
    (d) each of said second and first tilted retardation layers having an optical axis defining azimuthal angle φ and at least one tilt angle θ, where at least said tilt angle θ varies through the thickness of the layer; and
    (e) at least one of said azimuthal angle aspect φ of an optical axis of said second tilted retardation layer is oriented substantially perpendicular relative to said second tilt sense direction $A_{Second}$ of liquid crystal molecules proximate said second orientation layer, and said azimuthal angle aspect φ of an optical axis of said first tilted retardation layer is oriented substantially perpendicular relative to said first tilt sense direction $A_{First}$ of liquid crystal molecules proximate said first orientation layer, wherein said second tilted retardation layer is on said side of said liquid crystal layer proximate said second orientation layer.

16. The LCD of claim 15 wherein both said azimuthal angle aspect φ of an optical axis of said second tilted retardation layer is oriented substantially perpendicular relative to said second tilt sense direction $A_{Second}$ of liquid crystal molecules proximate said second orientation layer, and said azimuthal angle aspect φ of an optical axis of said first tilted retardation layer is oriented substantially perpendicular relative to said first tilt sense direction $A_{First}$ of liquid crystal molecules proximate said first orientation layer.

17. The LCD of claim 15 further comprising second and first polarizing elements, each of which has an optical axis, located on opposite sides of said liquid crystal layer, and said optical axes of said second and first polarizing elements being substantially perpendicular to one another.

18. The LCD of claim 17 wherein said optical axis of said second polarizing element being aligned in a substantially parallel orientation to said second tilt sense direction $A_{Second}$.

19. The LCD of claim 15 wherein both of said second and first tilted retardation layers includes said tilt angle θ which is substantially greater on the side of the tilted retardation layer closest to said liquid crystal layer than on the side furthest from said liquid crystal layer.

20. The LCD of claim 19 further comprising second and first polarizing elements, each of which has an optical axis, located on opposite sides of said liquid crystal layer, and said optical axes of said second and first polarizing elements being substantially perpendicular to one another.

21. The LCD of claim 20 wherein said optical axis of said second polarizing element being aligned in a substantially parallel orientation to said second tilt sense direction $A_{Second}$.

22. The LCD of claim 15, further comprising first and second negative non-tilted retardation layers on opposite sides of said liquid crystal layer, each of said first and second negative non-tilted retardation layers being defined by one of: (i) $n_x > n_y > n_z$; and (ii) $n_x = n_y > n_z$.

23. The LCD of claim 22 wherein each of said negative non-tilted retardation layers has a retardation value $d \cdot (n_x - n_z)$ of from about −10 to −150 nm.

24. The LCD of claim 23, wherein each of said second and first tilted retardation layers has a negative birefringence and a retardation value $d \cdot (n_e - n_o)$ of from about −20 to −200 nm, and for each of said tilted retardation layers, $n_x$ and $n_y$ differ from one another by less than about 0.5%.

25. The LCD of claim 22 wherein at least one of said first and second negative non-tilted retardation layers is further from said liquid crystal layer than a respective one of said first and second tilted retardation layers.

26. The LCD of claim 25 wherein both said first and second negative non-tilted retardation layers are further from said liquid crystal layer than said respective ones of said first and second tilted retardation layers.

27. The LCD of claim 26 wherein both of said second and first tilted retardation layers includes said tilt angle θ which is substantially greater on the side of the tilted retardation layer closest to said liquid crystal layer than on the side furthest from said liquid crystal layer.

28. The LCD of claim 27 further comprising second and first polarizing elements, each of which has an optical axis, located on opposite sides of said liquid crystal layer, and said optical axes of said second and first polarizing elements being substantially perpendicular to one another.

29. The LCD of claim 28 wherein said optical axis of said second polarizing element being aligned in a substantially parallel orientation to said second tilt sense direction $A_{Second}$.

30. The LCD of claim 16, further comprising first and second negative non-tilted retardation layers on opposite sides of said liquid crystal layer, each of said first and second negative non-tilted retardation layers being defined by one of: (i) $n_x > n_y > n_z$; and (ii) $n_{x=ny} > n_z$.

31. The LCD of claim 30 wherein at least one of said first and second negative non-tilted retardation layers is further from said liquid crystal layer than a respective one of said first and second tilted retardation layers.

32. The LCD of claim 31 wherein both said first and second negative non-tilted retardation layers are further from said liquid crystal layer than said respective ones of said first and second tilted retardation layers.

33. The LCD of claim 32 wherein both of said second and first tilted retardation layers includes said tilt angle θ which is substantially greater on the side of the tilted retardation layer closest to said liquid crystal layer than on the side furthest from said liquid crystal layer.

34. The LCD of claim 33 further comprising second and first polarizing elements, each of which has an optical axis, located on opposite sides of said liquid crystal layer, and said optical axes of said second and first polarizing elements being substantially perpendicular to one another.

35. The LCD of claim 34 wherein said optical axis of said second polarizing element being aligned in a substantially parallel orientation to said second tilt sense direction $A_{Second}$.

36. The LCD of claim 15 wherein both of said second and first tilted retardation layers includes said tilt angle θ which is substantially greater on the side of the tilted retardation layer further from said liquid crystal layer than on the side closest to said liquid crystal layer.

37. The LCD of claim 36 further comprising second and first polarizing elements, each of which has an optical axis, located on opposite sides of said liquid crystal layer, and said optical axes of said second and first polarizing elements being substantially perpendicular to one another.

38. The LCD of claim 37 wherein said optical axis of said second polarizing element being aligned in a substantially parallel orientation to said second tilt sense direction $A_{Second}$.

39. The LCD of claim 38 wherein at least one of said first and second negative non-tilted retardation layers is closer to said liquid crystal layer than a respective one of said first and second tilted retardation layers.

40. The LCD of claim 39 wherein both said first and second negative non-tilted retardation layers are closer to said liquid crystal layer than said respective ones of said first and second tilted retardation layers.

41. The LCD of claim 40 wherein both of said second and first tilted retardation layers includes said tilt angle θ which is substantially greater on the side of the tilted retardation layer further from said liquid crystal layer than on the side closest to said liquid crystal layer.

42. The LCD of claim 41 further comprising second and first polarizing elements, each of which has an optical axis, located on opposite sides of said liquid crystal layer, and said optical axes of said second and first polarizing elements being substantially perpendicular to one another.

43. The LCD of claim 42 wherein said optical axis of said second polarizing element being aligned in a substantially parallel orientation to said second tilt sense direction $A_{Second}$.

44. The LCD of claim 43 wherein at least one of said first and second negative non-tilted retardation layers is closer to said liquid crystal layer than a respective one of said first and second tilted retardation layers.

45. The LCD of claim 44 wherein both said first and second negative non-tilted retardation layers are closer to said liquid crystal layer than said respective ones of said first and second tilted retardation layers.

46. The LCD of claim 45 wherein both of said second and first tilted retardation layers includes said tilt angle θ which is substantially greater on the side of the tilted retardation layer further from said liquid crystal layer than on the side closest to said liquid crystal layer.

47. The LCD of claim 46 further comprising second and first polarizing elements, each of which has an optical axis, located on opposite sides of said liquid crystal layer, and said optical axes of said second and first polarizing elements being substantially perpendicular to one another.

48. The LCD of claim 47 wherein said optical axis of said second polarizing element being aligned in a substantially parallel orientation to said second tilt sense direction $A_{Second}$.

49. A normally white twisted nematic liquid crystal display (LCD) comprising:
(a) a liquid crystal layer for twisting at least one normally incident wavelength of visible light when in the off-state;
(b) first and second orientation layers sandwiching said liquid crystal layer therebetween, said first orientation layer causing a first liquid crystal tilt sense direction $A_{First}$ and said second orientation layer causing a second liquid crystal tilt sense direction $A_{Second}$ different than said direction $A_{First}$;
(c) first and second tilted retardation layers located on the same side of said liquid crystal layer;
(d) each of said first and second tilted retardation layers having an optical axis defining at least one azimuthal angle φ, and at least one tilt angle θ, where at least said tilt angle θ varies through the thickness of the layer; and
(e) said at least one said azimuthal angle aspect φ of an optical axis of said first tilted retardation layer is oriented substantially anti-parallel relative to said second tilt sense direction $A_{Second}$ of liquid crystal molecules proximate said second orientation layer.

50. The LCD device of claim 49 wherein said azimuthal angle aspect φ of an optical axis of said second tilted retardation layer is oriented substantially parallel relative to said first tilt sense direction $A_{First}$ of liquid crystal molecules proximate said first orientation layer.

51. The LCD device of claim 50 said first tilted retardation layer includes a tilt angle θ which is substantially greater on the side of the first tilted retardation layer closest to said liquid crystal layer than on the side furthest from said liquid crystal layer and said second tilted retardation layer includes a tilt angle θ which is substantially greater on the side of the second tilted retardation layer furthest from said liquid crystal layer than on the side closest to said liquid crystal layer.

52. The LCD of claim 51 further comprising second and first polarizing elements, each of which has an optical axis, located on opposite sides of said liquid crystal layer, and said optical axes of said second and first polarizing elements being substantially perpendicular to one another.

53. The LCD of claim 52 wherein said optical axis of said second polarizing element being aligned in a substantially parallel orientation to said second tilt sense direction $A_{Second}$.

54. The LCD of claim 50, further comprising first and second negative non-tilted retardation layers on the same side of said liquid crystal layer, each of said first and second negative non-tilted retardation layers being defined by one of: (i) $n_x>n_y>n_z$; and (ii) $n_x=n_y>n_z$.

55. The LCD of claim 54 wherein each of said negative non-tilted retardation layers has a retardation value $d \cdot (n_x - n_z)$ of from about −10 to −150 nm.

56. The LCD of claim 55, wherein each of said first and second tilted retardation layers has a negative birefringence and a retardation value $d \cdot (n_e - n_o)$ of from about −20 to −200 nm, and for each of said tilted retardation layers, $n_x$ and $n_y$ differ from one another by less than about 0.5%.

57. The LCD of claim 54 wherein said first and second negative non-tilted retardation layers are between first and second tilted retardation layers.

58. The LCD device of claim 54 wherein said first tilted retardation layer includes a tilt angle θ which is substantially greater on the side of the first tilted retardation layer closest to said liquid crystal layer than on the side furthest from said liquid crystal layer 1and said second tilted retardation layer includes a tilt angle θ which is substantially greater on the side of the second tilted retardation layer furthest from said liquid crystal layer than on the side closest to said liquid crystal layer.

59. The LCD of claim 58 further comprising second and first polarizing elements, each of which has an optical axis, located on opposite sides of said liquid crystal layer, and said optical axes of said second and first polarizing elements being substantially perpendicular to one another.

60. The LCD of claim 59 wherein said optical axis of said second polarizing element being aligned in a substantially parallel orientation to said second tilt sense direction $A_{Second}$.

61. The LCD device of claim 50 wherein said first tilted retardation layer includes a tilt angle θ which is substantially greater on the side of the first tilted retardation layer closest to said liquid crystal layer than on the side furthest from said liquid crystal layer and said second tilted retardation layer includes a tilt angle θ which is substantially greater on the side of the second tilted retardation layer closest to said liquid crystal layer than on the side furthest from said liquid crystal layer.

62. The LCD of claim 61 further comprising second and first polarizing elements, each of which has an optical axis, located on opposite sides of said liquid crystal layer, and said optical axes of said second and first polarizing elements being substantially perpendicular to one another.

63. The LCD of claim 62 wherein said optical axis of said second polarizing element being aligned in a substantially parallel orientation to said second tilt sense direction $A_{Second}$.

64. The LCD of claim 50, further comprising first and second negative non-tilted retardation layers on the same side of said liquid crystal layer, each of said first and second negative non-tilted retardation layers being defined by one of: (i) $n_x>n_y>n_z$; and (ii) $n_x=n_y>n_z$, and said first tilted retardation layer includes a tilt angle θ which is substantially greater on the side of the first tilted retardation layer closest to said liquid crystal layer than on the side furthest from said liquid crystal layer and said second tilted retardation layer includes a tilt angle θ which is substantially greater on the side of the second tilted retardation layer closest to said liquid crystal layer than on the side furthest from said liquid crystal layer.

65. The LCD of claim 64 further comprising second and first polarizing elements, each of which has an optical axis, located on opposite sides of said liquid crystal layer, and said optical axes of said second and first polarizing elements being substantially perpendicular to one another.

66. The LCD of claim 65 wherein said optical axis of said second polarizing element being aligned in a substantially parallel orientation to said second tilt sense direction $A_{Second}$.

* * * * *

UNITED STATES PATENT AND TRADEMARK OFFICE
CERTIFICATE OF CORRECTION

PATENT NO. : 6,359,671 B1
DATED : March 19, 2002
INVENTOR(S) : Adiel Abileah

It is certified that error appears in the above-identified patent and that said Letters Patent is hereby corrected as shown below:

Column 13,
Line 61, change "T, and $T_2$" to -- $T_1$ and $T_2$ --.

Column 14,
Line 53, change "$r_x$" to -- $n_x$ --.

Column 17,
Line 65, change "$AR_1$." to -- AR. --.

Column 20,
Line 54, change "that Din any" to -- that in any --.

Column 27,
Line 19, change "layer 1and said" to -- layer and said --.

Signed and Sealed this

Twenty-eighth Day of March, 2006

JON W. DUDAS
*Director of the United States Patent and Trademark Office*